United States Patent
Poe et al.

(10) Patent No.: US 12,269,575 B2
(45) Date of Patent: Apr. 8, 2025

(54) DEVICES AND METHODS FOR EXTENDING AIRCRAFT CARGO BAYS WITH REPLACEMENT TAILCONES

(71) Applicant: ZSM HOLDINGS LLC, Dover, DE (US)

(72) Inventors: Blake Poe, Longmont, CO (US); Mathew James Isler, Sammamish, WA (US)

(73) Assignee: ZSM Holdings, LLC, Dover, DE (US)

( * ) Notice: Subject to any disclaimer, the term of this patent is extended or adjusted under 35 U.S.C. 154(b) by 131 days.

(21) Appl. No.: 17/839,376

(22) Filed: Jun. 13, 2022

(65) Prior Publication Data
US 2022/0306267 A1    Sep. 29, 2022

Related U.S. Application Data

(60) Division of application No. 17/461,434, filed on Aug. 30, 2021, now Pat. No. 11,358,700, which is a
(Continued)

(51) Int. Cl.
*B64C 1/06* (2006.01)
*B64C 1/22* (2006.01)
(Continued)

(52) U.S. Cl.
CPC ............ *B64C 1/0685* (2020.01); *B64C 1/069* (2013.01); *B64C 1/22* (2013.01); *F03D 13/40* (2016.05);
(Continued)

(58) Field of Classification Search
CPC ......... B64C 1/0685; B64C 1/069; B64C 1/22; B64C 2211/00; F03D 13/40; B64D 2009/006; B64D 9/003; B64F 5/10
See application file for complete search history.

(56) References Cited

U.S. PATENT DOCUMENTS 2,134,260 A    10/1938  Nickerson
2,998,948 A     9/1961  Sisk
(Continued)

FOREIGN PATENT DOCUMENTS

| EP | 2439134 A2 * | 4/2012 | ............. A21D 13/41 |
| FR | 2906785 A1 * | 4/2008 | ............. B64C 1/068 |
| WO | WO-2008000286 A1 * | 1/2008 | ............. B64C 1/061 |

OTHER PUBLICATIONS

Boeing Pelican Cargo Aircraft Pictures Facts History from Boeing Phantom Works, Aviation Explorer, archieved in Dec. 18, 2018 at Internet Archives, http://web.archive.org/web/20181218154546/http://www.aviationexplorer.com/boeing_pelican_facts.htm (Year: 2018).
(Continued)

*Primary Examiner* — Assres H Woldemaryam
(74) *Attorney, Agent, or Firm* — Barnes & Thornburg LLP

(57) ABSTRACT

Systems and methods for extending the interior cargo bay of fixed-wing cargo aircraft into a replaceable tailcone bay are disclosed. The system includes an aircraft and a removable tailcone configured couple to the aft end of the fuselage. The aircraft fuselage includes a cargo bay and an aft end opening into the cargo bay. The tailcone, when attached, encloses the aft end opening the cargo bay. The tailcone can include an interior volume configured to extend the fuselage cargo bay such that the interior volume defines an aft end of a cargo bay of the cargo aircraft. In some examples, the tailcone includes a plurality of segments, which can be configured to extend from the aft end of the aircraft to adjust a length of the cargo extension provided by the tailcone.

12 Claims, 32 Drawing Sheets

Related U.S. Application Data continuation of application No. PCT/US2021/016366, filed on Feb. 3, 2021.

(51) Int. Cl.
*F03D 13/40* (2016.01)
*B64D 9/00* (2006.01)

(52) U.S. Cl.
CPC .... *B64C 2211/00* (2013.01); *B64D 2009/006* (2013.01)

(56) References Cited

U.S. PATENT DOCUMENTS

| | | | |
|---|---|---|---|
| 3,055,620 A | 9/1962 | Weiland | |
| 3,374,972 A | 3/1968 | Webb, Sr. | |
| 3,412,962 A * | 11/1968 | Killian | F42B 10/44 244/130 |
| 3,481,567 A | 12/1969 | Stearman | |
| 4,449,679 A | 5/1984 | McComas | |
| 4,736,910 A | 4/1988 | Russell | |
| 6,237,210 B1 * | 5/2001 | Stoewer | B64C 1/00 29/430 |
| 7,234,667 B1 | 6/2007 | Talmage, Jr. | |
| 8,121,786 B2 | 2/2012 | Morbey et al. | |
| 11,981,460 B2 * | 5/2024 | Muceus | B64U 50/19 |
| 2002/0079403 A1 | 6/2002 | Boe | |
| 2004/0200930 A1 | 10/2004 | Bays-Muchmore et al. | |
| 2005/0151018 A1 | 7/2005 | Schoene | |
| 2006/0108477 A1 | 5/2006 | Helou, Jr. | |
| 2008/0099612 A1 | 5/2008 | Plude et al. | |
| 2009/0045288 A1 | 2/2009 | Nakamura et al. | |
| 2009/0173824 A1 | 7/2009 | Perez-Sanchez | |
| 2010/0252682 A1 | 10/2010 | Pahl | |
| 2012/0251280 A1 | 10/2012 | Jaurand et al. | |
| 2013/0019446 A1 | 1/2013 | Venskus et al. | |
| 2015/0183519 A1 | 7/2015 | Llamas Sandin | |
| 2016/0311512 A1 | 10/2016 | Sankrithi | |
| 2018/0203471 A1 | 7/2018 | Lesperance, Jr. et al. | |
| 2018/0370611 A1 | 12/2018 | Guering et al. | |
| 2019/0382136 A1 | 12/2019 | Martino-Gonzalez et al. | |
| 2020/0207475 A1 | 7/2020 | Dobberfuhl et al. | |
| 2022/0306267 A1 | 9/2022 | Poe et al. | |

OTHER PUBLICATIONS

C-130J Super Hercules Whatever the Situation, We'll Be There. Lockheed Martin Corporation, archieved on Apr. 6, 2019 at Internet Archives http://web.archive.org/web/20190406105924/http://www.lockheedmartin.com/content/dam/lockheed-martin/aero/documents/C-130J/C130JPocketGuide.pdf (Year: 2019).

The Lockheed CL-1201 Flying Aircraft Carrier. Talls through Time, archieved on Mar. 1, 2016 at Internet Archives, https://web.archive.org/web/20160301011000/http://www.tailsthroughtimecom/2010/06/in-aviation-those-who-dar-to-dream-are.hmtl (Year: 2016).

Supplemental European Search Report for Application No. EP21925034 dated Sep. 3, 2024 (9 pages).

International Search Report and Written Opinion for Application No. PCT/US20/49787, mailed Nov. 30, 2020 (20 pages).

International Search Report and Written Opinion for Application No. PCT/US2021/01636, mailed Apr. 8, 2021 (11 Pages).

International Search Report and Written Opinion for Application No. PCT/US2021/021792, mailed May 20, 2021 (12 Pages).

No Author Listed. "747-400/-400ER Freighters" StartupBoeing. May 2010.

No Author Listed. Antonov Airlines Brochure. Jul. 2019. [online] retrieved from <URL: https://www.antonov-airlines.com/wp-content/uploads/2019/07 /Antonov-Airlines- brochure.pdf>.

No Author Listed. C-130J Super Hercules Brochure, Lockheed Martin.

No Author Listed. DHC-4 A Caribou Brochure, The De Havilland Canada. Nov. 1962.

No Author Listed. Piasecki H-21 Helicopter, Wikipedia. Website. Accessed Oct. 29, 2021. url: <https://en.wikipedia.org/wiki/Piasecki_H-21>.

* cited by examiner

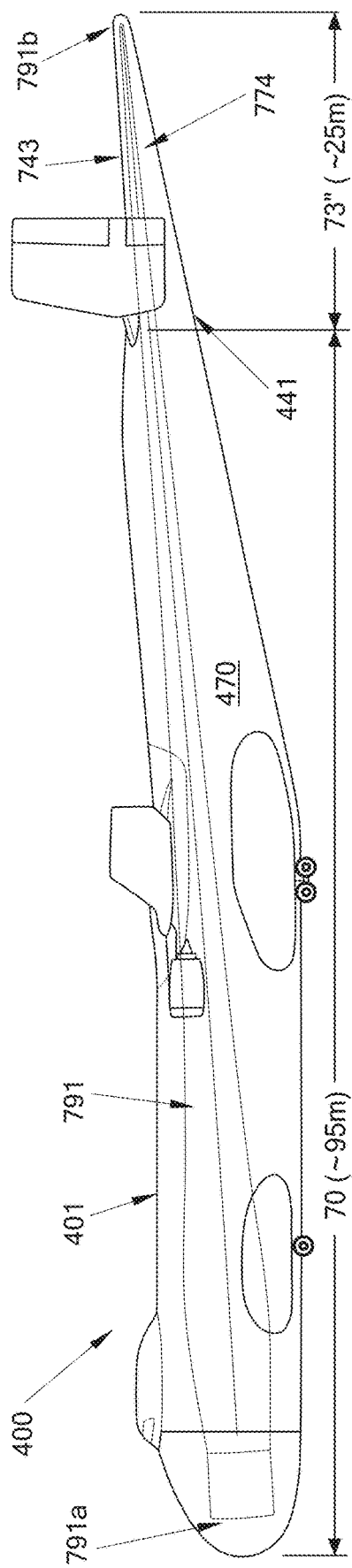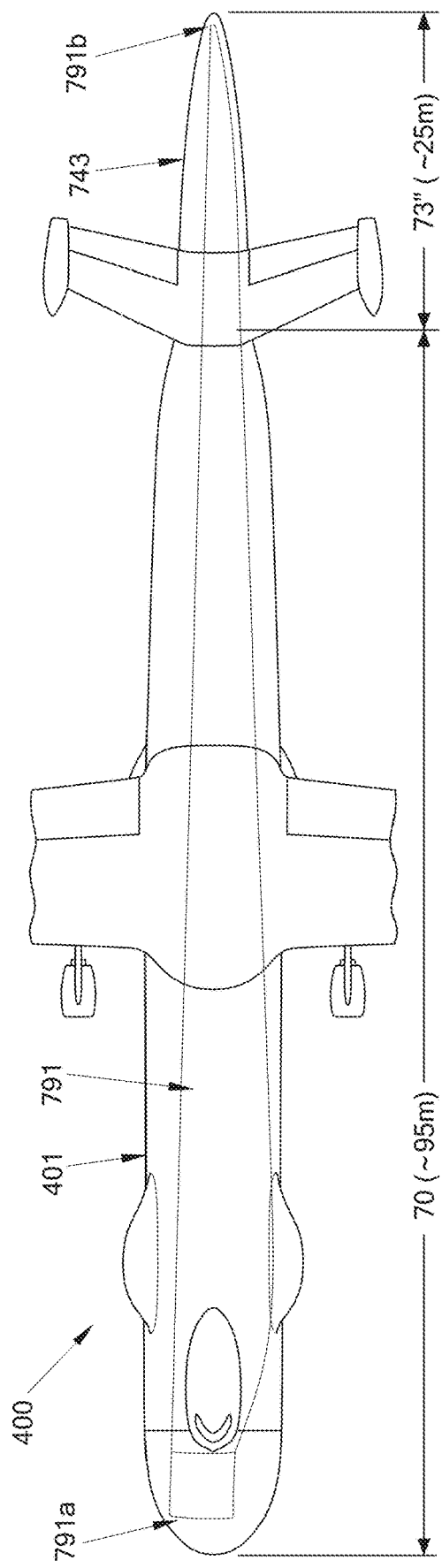
FIG. 7A
FIG. 7B

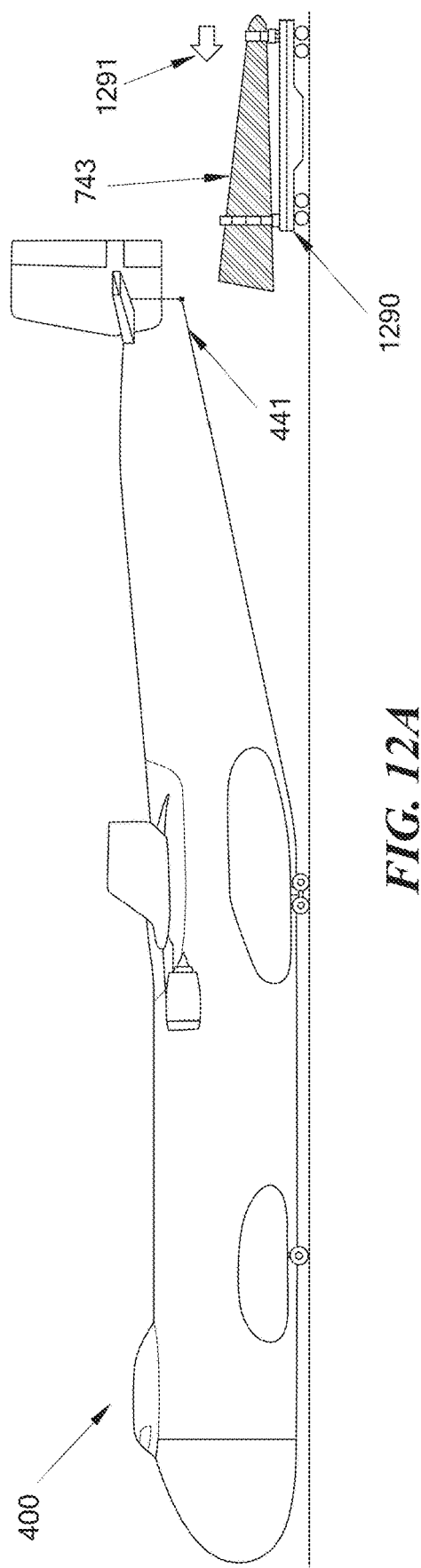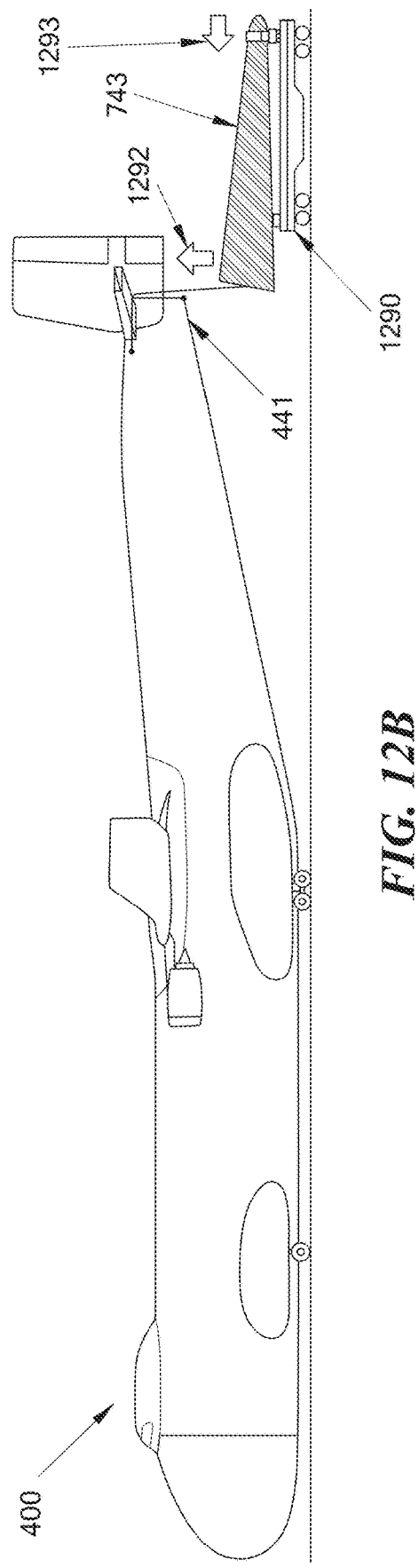
FIG. 12A
FIG. 12B

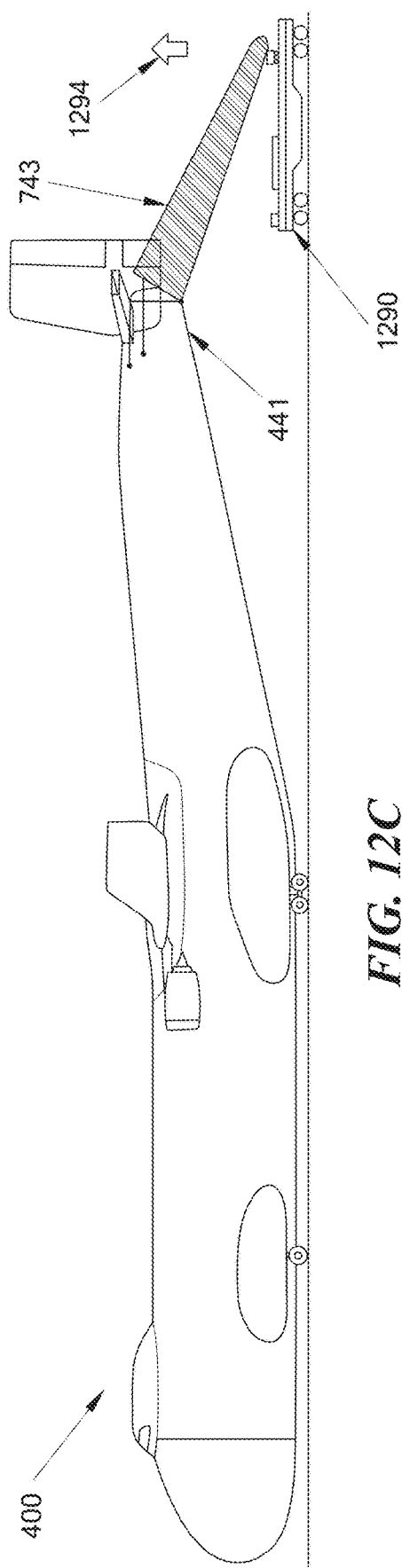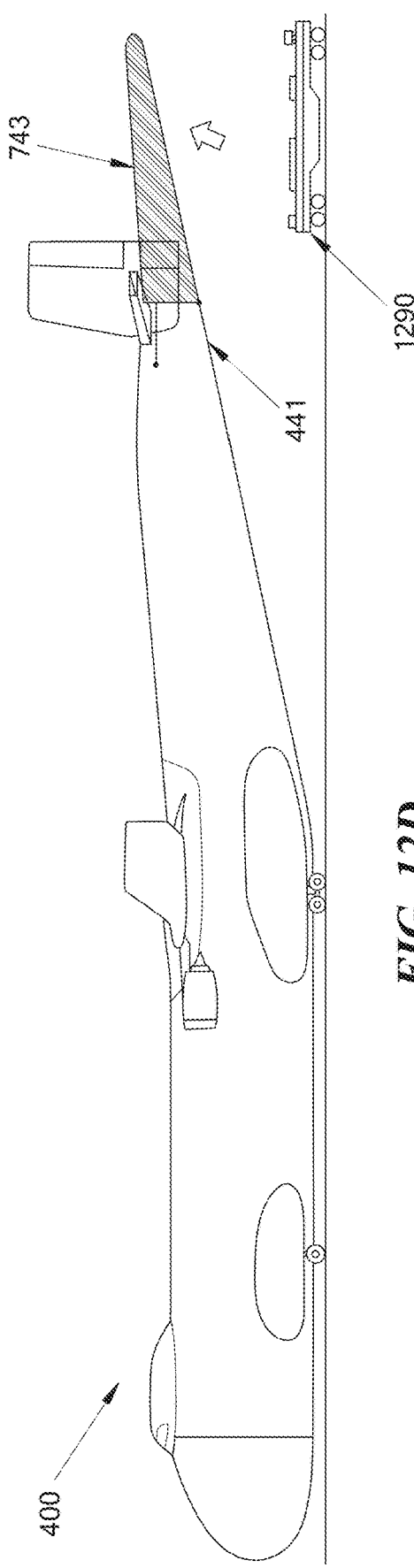
FIG. 12C
FIG. 12D

DEVICES AND METHODS FOR EXTENDING AIRCRAFT CARGO BAYS WITH REPLACEMENT TAILCONES

CROSS-REFERENCE TO RELATED APPLICATIONS

The present application is a divisional of and claims priority to U.S. patent application Ser. No. 17/461,434, filed Aug. 20, 2021, and entitled "DEVICES AND METHODS FOR EXTENDING AIRCRAFT CARGO BAYS WITH REPLACEMENT TAILCONES," which is a U.S. national stage filing from International Application Number PCT/US2021/016366, filed Feb. 3, 2021, the contents of each which is hereby incorporated by reference in its entirety.

FIELD

The present disclosure relates to fuselage designs for cargo aircraft, and more particularly to designs that allow for, or include, removable and replaceable tailcones that extend the maximum cargo carrying length of the cargo aircraft by extending the length of an interior cargo bay of the fuselage into the replaceable tailcone, with the tailcone forming a cargo bay extension that is sized to accept extra length of a payload that cannot fit entirely in the fixed portion of the fuselage.

BACKGROUND

Renewable energy remains an increasingly important resource year-over-year. While there are many forms of renewable energy, wind energy has increased an average of about 19 percent annually since 2007. The increase in global demand in recent years for more wind energy has catalyzed drastic advances in wind turbine technology, including the development of larger, better-performing wind turbines. Better-performing wind turbines can at least sometimes mean larger turbines, as generally turbines with larger rotor diameters can capture more wind energy. As turbines continue to improve in performance and efficiency, more and more wind farm sites become viable both onshore and offshore. These sites may be existing sites, where older turbines need replacement by better-performing, more efficient turbines, and new sites.

A limiting factor to allow for the revitalization of old sites and development of new sites is transporting the wind turbines, and related equipment, to the sites. Wind turbine blades are difficult to transport long distances due to the terrestrial limitations of existing air vehicles and roadway infrastructures. Onshore transportation has traditionally required truck or rail transportation on existing infrastructure. Both are limited by height and width of tunnels and bridges. Road transport has additional complications of lane width, road curvature, and the need to pass through urban areas that may require additional permitting and logistics, among other complications. Offshore transportation by ship is equally, if not more so, limiting. For example, delivery of parts can be limited to how accessible the offshore location is by ship due to various barriers (e.g., sand bars, coral reefs) and the like in the water and surrounding areas, as well as the availability of ships capable of handling such large structures.

Whether onshore or offshore, the road vehicle or ship options for transporting such equipment has become more limited, particularly as the size of wind turbines increase. Delivery is thus limited by the availability of vehicles and ships capable of handling such large structures. The very long lengths of wind turbine blades (some are presently 90 meters long, 100 meters long, or even longer) make conventional transportation by train, truck, or ship very difficult and complicated. Unfortunately, the solution is not as simple as making transportation vehicles longer and/or larger. There are a variety of complications that present themselves as vehicles are made longer and/or larger, including but not limited to complications of: load balancing of the vehicle; load balancing the equipment being transported; load balancing the two with respect to each other; handling, maneuverability, and control of the vehicle; and other complications that would be apparent to those skilled in the art.

Further, whether onshore or offshore, delivery of parts can be slow and severely limited by the accessibility of the site. Whether the site being developed is old or new, the sites can often be remote, and thus not near suitable transportation infrastructure. The sites may be far away from suitable roads and rails (or other means by which cargo may be transported) to allow for easy delivery of cargo for use in building the turbines at the site and/or other equipment used in developing the site. New sites are often in areas without any existing transportation infrastructure at all, thus requiring new construction and special equipment. Ultimately, transportation logistics become cost prohibitive, resulting in a literal and figurative roadblock to further advancing the use of wind energy on a global scale.

Existing cargo aircraft, including some of the largest aircraft ever to fly, are not able to transport extremely large cargo, even if that cargo is, in all dimensions, smaller than the aircraft itself. This limitation is often the result of cargo aircraft, even those purpose built to be cargo aircraft, not fully utilizing their overall size as cargo bay volume. This constraint has many causes, one of which is related to the ability of the aircraft to takeoff and land without excessive runway length. Larger and heavier aircraft take more energy to accelerate during takeoff, as well are more energy to decelerate upon landing. Accordingly, traditional solutions involve increasing the lift provided by the aircraft's lifting surfaces to allow the aircraft to get off the ground at a slower speed and, conversely, to allow the aircraft to approach the runway at a slower speed (while still being able to abort and climb, if necessary).

Large cargo payloads that are significantly oversized in a single dimension (e.g., highly elongated payloads) generally result in those payloads, when transported by aircraft, being arranged in the aircraft close to parallel to the direction of travel, and substantially orthogonal to the wing span direction or the height direction of a static aircraft on the ground. In other words, they are carried with the longest dimension being aligned with the longitudinal axis of the aircraft. However, even the longest existing operational aircraft in the world, the Antonov AN-225, which is 84 meters long (about 275 feet) in total length from fuselage nose tip to fuselage tail tip, cannot stow cargo over 143 feet long, which is just over half of the total length of the AN-225 aircraft. While some smaller cargo aircraft have a larger maximum cargo length ratio, such as about 70% for the Boeing 747-400 (resulting in about 185 feet maximum cargo length), a common feature among these large cargo aircraft is a limited extension of the cargo bay into the aft section of the fuselage. Recently, the even larger transport-category aircraft have been developed, with cargo bays extending aft into a tail region of the fuselage; however these aircraft still have a cargo bay with a fixed maximum length, and any cargo beyond the fixed length of the cargo bay cannot be transported.

Accordingly, there is a need to selectively increase the cargo bay length of large, transport-category aircraft.

SUMMARY

Certain examples of the present disclosure include a cargo aircraft fuselage design for extending the useable interior cargo bay length to a significant majority of the length of the fuselage, while still enabling the cargo aircraft to have a tailstrike criteria that allows for typical (or better) takeoff and landing pitch maneuvers. Tailstrike is where the aft fuselage strikes the ground during takeoff rotation. Examples of the present disclosure include extremely large cargo aircraft capable of both carrying extremely long payloads and being able to takeoff and land at runways that are significantly shorter than those required by most, if not all, existing large aircraft. For purposes of the present disclosure, a large or long aircraft is considered an aircraft having a length from fuselage nose tip to fuselage tail tip that is at least approximately 60 meters long. The American Federal Aviation Administration (FAA) defines a large aircraft as any aircraft of more than 12,500 pounds maximum certified takeoff weight, which can also be considered a large aircraft in the present context, but the focus of size is generally related to a length of the aircraft herein. One example of such an oversized payload capable of being transported using examples of this present disclosure are wind turbine blades, the largest of which can be over 100 meters in length. Examples of the present disclosure enable a payload of such an extreme length to be transported within the cargo bay of an aircraft having a fuselage length only slighter longer than the payload, while that aircraft can also takeoff and land at most existing commercial airports, as well as runways that are even smaller, for instance because they are built at a desired location for landing such cargo aircraft near a site where the cargo is to be used, such as a landing strip built near or as part of a wind farm.

In one exemplary embodiment a cargo aircraft includes a fuselage defining a forward end, an aft end, a continuous interior cargo bay that spans a majority of a length of the fuselage from the forward end to the aft end, the aft end defining an aft opening into the continuous interior cargo bay and a removable tailcone configured to be coupled to the aft end of the fuselage, the removable tailcone enclosing the aft opening into the continuous interior cargo bay. The removable tailcone, when coupled to the aft end of the fuselage, can define an aft terminal end of the fuselage cargo aircraft.

In some examples, the removable tailcone defines a forward opening and an interior cargo volume extending from the forward opening, and the interior cargo volume of the removable tailcone is configured to form an aft region extending from the continuous interior cargo bay when the removable tailcone is coupled to the aft end of the fuselage such that the interior cargo volume defines an aft end of an extended cargo bay of the cargo aircraft, the extended cargo bay comprising both the interior cargo volume and the continuous interior cargo bay. The removable tailcone can include two or more segments, at least one of the two or more segments defining at least a portion of the interior cargo volume of the removable tailcone. The two or more segments can include at least a first segment and a second segment, with the first segment including a forward end configured to be coupled to the aft opening of the fuselage of the cargo aircraft and an aft end, and the first segment can define a first portion of a length of the interior cargo volume between the forward and aft ends of the first segment and the second segment can include a forward end configured to be coupled to the aft end of the first segment and an aft end, with the second segment defining a second portion of the length of the interior cargo volume between the forward and aft ends of the second segment, with the aft end of the first segment and the forward end of the second segment each defining complimentary openings into respective portions of the interior cargo volume.

In some examples, the aft end of the first segment is further configured to be coupled to a tailcone apex cap that encloses the complimentary opening of the first segment. In some examples, the aft end of the second segment defines a second aft opening into the interior cargo volume, and the aft end of the second segment is configured to be coupled to at least one of: a tailcone apex cap that encloses the second aft opening of the second segment or a third segment of the two or more segments, the third segment configured to extend the length of the interior cargo bay volume such that the interior cargo bay volume comprises a third portion of the length of the interior cargo volume, the third portion being between forward and aft ends of the third segment. In some examples, the removable tailcone comprises one or more moveable segments that define at least a first configuration and a second configuration. Where, in the first configuration, the interior cargo volume defines a first length along a longitudinal centerline of the extended cargo bay and, in the second configuration, the interior cargo volume defines a second length along the longitudinal centerline of the extended cargo bay, the second length being longer than the first length such that the extended cargo bay defines a maximum payload length in the second configuration that is longer than a maximum payload length in the first configuration. The one or more moveable segments can define a telescopic arrangement. In some examples, the interior cargo volume of the removable tailcone is sized and shaped to contain an end of a wind turbine blade disposed throughout the combined interior cargo bay.

In some examples, the continuous interior cargo bay defines a first maximum payload length and, when the removable tailcone is attached to the aft end of the fuselage, the extended cargo bay defines a second maximum payload length, the second maximum payload length being at least approximately 5% longer than the first maximum payload length. In some examples, the second maximum payload length is at least about 90 meters.

The cargo aircraft can include a tail coupler on a forward end of the removable tailcone and a fuselage coupler on the aft end of the fuselage and about the aft opening into the continuous interior cargo bay, where the tail coupler and the fuselage coupler are configured to mate together to secure the removable tailcone to the fuselage of the cargo aircraft during flight. In some examples, the removable tailcone comprises one or more indexing features configured to enable alignment of the tail coupler with the fuselage coupler.

In some examples, the aft opening into the continuous interior cargo bay is positioned to permit a payload extending through the aft opening to be disposed above or below a horizontal stabilizer of the cargo aircraft.

A bottom surface of the removable tailcone can include at least one of a wheel or a skid configured to safely contact the ground during a pitch-up maneuver. The removable tailcone can be sized and shaped to, when coupled to the aft end of the fuselage, maintain an acceptable a tailstrike angle of the cargo aircraft such that a tailstrike does not occur. In some examples, a bottom surface of the aft fuselage defines an upsweep angle, and a bottom surface of the removable tailcone defines an upsweep angle equal to or greater than the upsweep angle of the aft fuselage.

In some examples, the fuselage of the cargo aircraft includes a lifting system configured to assist in a removal or attachment operation of the removable tailcone.

Another example of the present disclosure is a cargo system that includes a cargo aircraft including a fuselage defining a forward end, an aft end, a continuous interior cargo bay that spans a majority of a length of the fuselage from the forward end to the aft end, the aft end defining an aft opening into the continuous interior cargo bay. The cargo system further includes a first removable tailcone configured to be coupled to the aft end of the fuselage, the removable tailcone enclosing the aft opening into the continuous interior cargo bay and a second removable tailcone configured to be coupled to the aft end of the fuselage, the second removable tailcone enclosing the aft opening into the continuous interior cargo bay, wherein the second removable tailcone defines a forward opening and an interior cargo volume extending from the forward opening. In this example cargo system, the interior cargo volume of the second removable tailcone is configured to form an aft region extending from the continuous interior cargo bay when the second removable tailcone is coupled to the aft end of the fuselage such that the interior cargo volume defines an aft end of an extended cargo bay of the cargo aircraft, the extended cargo bay comprising both the interior cargo volume and the continuous interior cargo bay.

Yet another example is a cargo aircraft that includes a fuselage defining a forward end, an aft end, a continuous interior cargo bay that spans a majority of a longitudinal centerline length of the fuselage from the forward end to the aft end. The aft end includes an extendible tailcone defining an aft end of the continuous interior cargo bay, the extendible tailcone having one or more moveable segments that define at least a first configuration and a second configuration, where, in the first configuration, the aft end continuous interior cargo bay defines a first length along a longitudinal centerline of the extendible tailcone, and, in the second configuration, the aft end continuous interior cargo bay defines a second length along the longitudinal centerline, the second length being longer than the first length.

Still another example is a removable aircraft tailcone that includes a body having a forward end and an aft end, the forward end defining an opening into an interior cargo region contained in the body and a coupler configured to removeably secure the forward end of the body to an aft end of an cargo aircraft fuselage such that when the body is coupled to the cargo aircraft fuselage, an interior cargo bay of the cargo aircraft fuselage extends into the interior cargo region of the body and the aft end of the body defines a terminal aft end of the cargo aircraft fuselage.

Yet another example is a removable aircraft tailcone kit that includes a first removable aircraft tailcone with a body having a forward end and an aft end, the forward end defining an opening into an interior cargo region contained in the body and a coupler configured to removeably secure the forward end of the body to an aft end of an cargo aircraft fuselage such that when the body is coupled to the cargo aircraft fuselage, an interior cargo bay of the cargo aircraft fuselage extends into the interior cargo region of the body and the aft end of the body defines a terminal aft end of the cargo aircraft fuselage. The kit also includes a second removable tailcone configured to be coupled to an aft end of a fuselage of a cargo aircraft, the second removable tailcone configured to an aft opening into a continuous interior cargo bay of a cargo aircraft when coupled to the aft end of the fuselage.

The removable aircraft tailcone kit can further include a third removable tailcone configured to be coupled to an aft end of a cargo aircraft fuselage, the third removable tailcone enclosing the aft opening into the continuous interior cargo bay when coupled to the aft end of the fuselage, where the third removable tailcone defines a forward opening and an interior cargo volume extending from the forward opening, and where the interior cargo volume of the third removable tailcone is configured to form an aft region extending from the continuous interior cargo bay when the third removable tailcone is coupled to the aft end of the fuselage such that the interior cargo volume defines an aft end of an extended cargo bay of the cargo aircraft, the extended cargo bay comprising both the interior cargo volume and the continuous interior cargo bay.

A method of attaching a removable tailcone to a cargo aircraft includes coupling a forward end of a body of a removable tailcone to an aft end of a fuselage of the cargo aircraft, the removable tailcone enclosing an aft opening into a continuous interior cargo bay of the fuselage, the removable tailcone being configured to be separable from the fuselage without causing damage to either the fuselage or the removable tailcone.

In some examples, the method includes lifting the removable tailcone using a lifting mechanism disposed about the aft end of the fuselage, the lifting disposing the forward end of the body of the removeable tailcone approximately adjacent to the aft end of the fuselage of the cargo aircraft. The method can further include coupling one or more pivot features located a bottom portion of the forward end of the removable tailcone to one or more corresponding features located at the aft end of the fuselage and, after the coupling, pivoting the removable tailcone about the one or more pivot features until the forward end of the body of the removable tailcone is approximately in a position to undergo the coupling of the forward end of the body to the aft end of the fuselage. The method can further include removing the removable tailcone from the aft end of the fuselage of the cargo aircraft and coupling a forward end of a body of a second removable tailcone to the aft end of a fuselage of the cargo aircraft, the removable tailcone defining a cargo region that forms an aft region extending from the continuous interior cargo bay of the fuselage.

BRIEF DESCRIPTION OF DRAWINGS

This disclosure will be more fully understood from the following detailed description taken in conjunction with the accompanying drawings, in which:

FIG. 7A is a side, transparent view of the aircraft of FIG. 4 with a longer extended tailcone attached and a 120-meter wind turbine blade disposed in the interior cargo bay and extending into the longer extended tailcone;

FIG. 7B is a top, transparent view of the aircraft and wind turbine blade of FIG. 7A;

FIGS. 12A-D are illustrations of an alternative example method of attaching a tailcone to a fuselage;

DETAILED DESCRIPTION

Figure 1A:
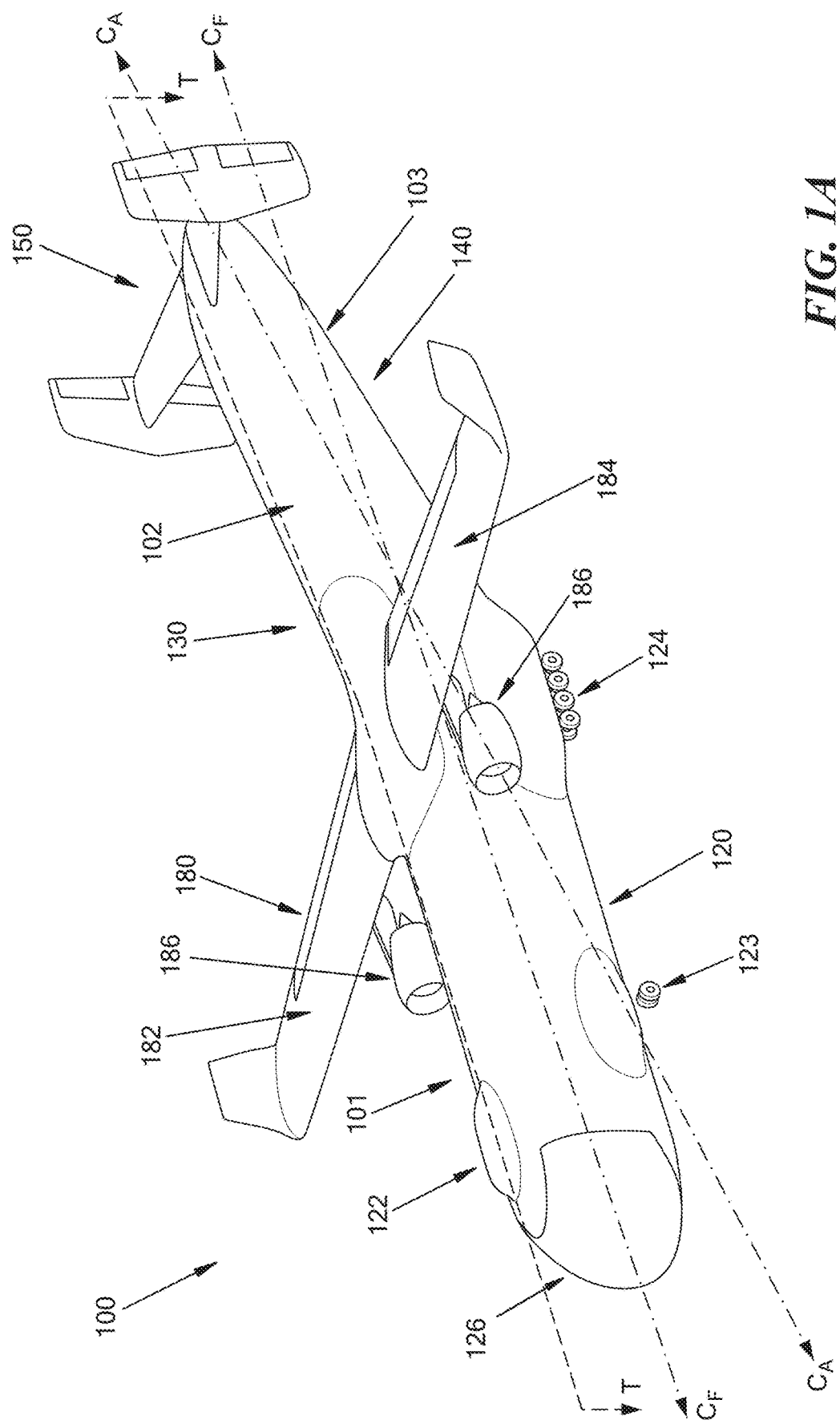
FIG. 1A is an isometric view of one exemplary embodiment of an aircraft.

Certain exemplary embodiments will now be described to provide an overall understanding of the principles of the structure, function, manufacture, and use of the devices, systems, aircraft, and methods disclosed herein. One or more examples of these embodiments are illustrated in the accompanying drawings. Those skilled in the art will understand that the devices, systems, aircraft, components related to or otherwise part of such devices, systems, and aircraft, and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Some of the embodiments provided for herein may be schematic drawings, including possibly some that are not labeled as such but will be understood by a person skilled in the art to be schematic in nature. They may not to be scale or may be somewhat crude renderings of the disclosed components. A person skilled in the art will understand how to implement these teachings and incorporate them into work systems, methods, aircraft, and components related to each of the same, provided for herein.

To the extent the present disclosure includes various terms for components and/or processes of the disclosed devices, systems, aircraft, methods, and the like, one skilled in the art, in view of the claims, present disclosure, and knowledge of the skilled person, will understand such terms are merely examples of such components and/or processes, and other components, designs, processes, and/or actions are possible. By way of non-limiting example, while the present application describes loading an airplane through a front end of the aircraft, alternatively, or additionally, loading can occur through an aft end of the aircraft and/or from above and/or below the aircraft. In the present disclosure, like-numbered and like-lettered components of various embodiments generally have similar features when those components are of a similar nature and/or serve a similar purpose. To the extent terms such as front, back, top, bottom, forward, aft, proximal, distal, etc. are used to describe a location of various components of the various disclosures, such usage is by no means limiting, and is often used for convenience when describing various possible configurations. The foregoing notwithstanding, a person skilled in the art will recognize the common vernacular used with respect to aircraft, such as the terms "forward' and "aft," and will give terms of those nature their commonly understood meaning. Further in some instances, terms like forward and proximal or aft and distal may be used in a similar fashion.

The present disclosure is related to large, transport-category aircraft, capable of moving oversized cargo not traditionally shippable by air. For example, wind turbine blades, which are typically highly elongated and irregular in shape in order to provide greater electrical power generating efficiency, or similarly long industrial equipment, shipping containers, or military equipment. The present disclosure is not limited to these specific cargos or payloads, but rather, these are examples. Example of the present disclosure include aircraft with aft ends configured to have a removable and replaceable tailcone attached, with the tailcones being, in at least some embodiments, configured to extend the overall length of an interior cargo bay of the aircraft by allowing terminal portions of payloads disposed in the cargo bay to extend out of a fixed portion of the fuselage and into an interior region of the tailcone. Embodiments of the present disclosure include aircraft configured to couple with a plurality of different tailcones, which can each provide, for example, a different length and/or shape extension to the interior cargo bay. Embodiments include tailcones of different sizes, shapes, and lengths, which can be selectively attached to the aft end of the aircraft based on the dimensions of a payload to be carried in the aircraft. Embodiments also include segmented tailcones that enable selecting a desired length and/or shape of extension to a cargo bay of an aircraft by selecting how many individual tailcone sections are added to the aft end of the fuselage. In such embodiments each section can provide, for example, a continuous additional length interior section into which a payload disposed in the interior cargo bay can extend.

Embodiments include designs for an aft end of an aircraft fuselage and the integration with the horizontal stabilizer to accommodate extremely long payloads (e.g., turbine blades in excess of at least about 57 meters, or at least about 65 meters, or at least about 75 meters, or at least about 85 meters, or at least about 90 meters, or at least about 100 meters, or at least about 120 meters, among other lengths) to fit inside the aircraft by allowing the aft end of the extremely long payload to reside underneath the horizontal stabilizer and poke out of the aft end of the fuselage primary structure and into a region of the fuselage enclosed by a removable and replaceable tailcone.

Aircraft

Figure 1B:
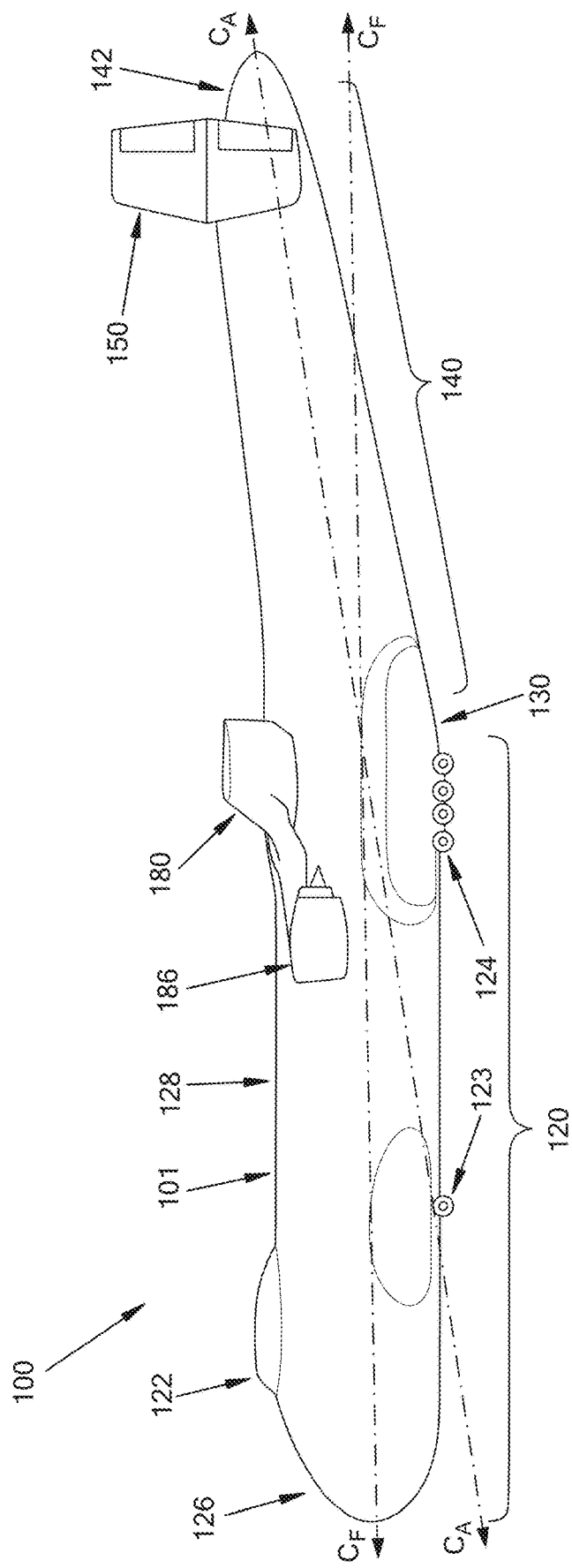
FIG. 1B is a side view of the aircraft of FIG. 1A.

The focus of the present disclosures is described with respect to a large aircraft 100, such as an airplane, illustrated in FIGS. 1A and 1B, along with the loading of a large payload into the aircraft, illustrated at least in FIGS. 2A-2D, 6B-6D, and 8A. Additional details about the aircraft and payload may be described with respect to the other figures of the present disclosure as well. In the illustrated embodiment, a payload 10 is a combination of two wind turbine blades 11A and 11B (FIGS. 2B-2D), although a person skilled in the art will appreciate that other payloads are possible. Such payloads can include other numbers of wind turbine blades (e.g., one, three, four, five, etc., or segments of a single even larger blade), other components of wind turbines (e.g., tower segments, generator, nacelle, gear box, hub, power cables, etc.), or many other large structures and objects whether related to wind turbines or not. The present application can be used in conjunction with most any large payload—large for the present purposes being at least about 57 meters long, or at least about 60 meters long, or at least about 65 meters long, or at least about 75 meters long, or at least about 85 meters long, or at least about 90 meters long, or at least about 100 meters long, or at least about 110 meters long, or at least about 120 meters long—or for smaller payloads if desired. Some non-limiting examples of large payloads that can be used in conjunction with the present disclosures beyond wind turbines include but are not limited to industrial oil equipment, mining equipment, rockets, military equipment and vehicles, defense hardware, commercial aerospace vehicles, crane segments, aircraft components, space launch rocket boosters, helicopters, generators, or hyperloop tubes. In other words, the aircraft 100 can be used with most any size and shape payload, but has particular utility when it comes to large, often heavy, payloads.

As shown, for example in FIGS. 1A-1B and 2A-2D, the aircraft 100, and thus its fuselage 101, includes a forward end 120 and an aft end 140, with a kinked portion 130 connecting the forward end 120 to the aft end 140. The forward end 120 is generally considered any portion of the aircraft 100, and related components, that are forward of the kinked portion 130 and the aft end 140 is considered any portion of the aircraft 100, and related components, that are aft of the kinked portion 130. The kinked portion 130, as described in greater detail below, is a section of the aircraft 130 in which both a top-most outer surface 102 and a bottom-most outer surface 103 of the fuselage 101 become angled (notably, the placement of reference numerals 102 and 103 in the figures do not illustrate location of the "kink" since they more generally refer to the top-most and bottom-most surfaces of the fuselage 101), as illustrated by an aft centerline CA of the aft end 140 of the fuselage 101 with respect to a forward centerline $C_F$ of the forward end 120 of the fuselage 101.

The forward end 120 can include a cockpit or flight deck 122, and landing gears, as shown a forward or nose landing gear 123 and a rear or main landing gear 124. The illustrated embodiment does not show various components used to couple the landing gears 123, 124 to the fuselage 101, or operate the landing gears (e.g., actuators, braces, shafts, pins, trunnions, pistons, cylinders, braking assemblies, etc.), but a person skilled in the art will appreciate how the landing gears 123, 124 are so connected and operable in conjunction with the aircraft 100. The forward-most end of the forward end 120 includes a nose cone 126. As illustrated more clearly in FIG. 2A, the nose cone 126 is functional as a door, optionally being referred to the nose cone door, thus allowing access to an interior cargo bay 170 defined by the fuselage 101 via a cargo opening 171 exposed by moving the nose cone door 126 into an open or loading position (the position illustrated in FIG. 2A; FIGS. 1A and 1B illustrate the nose cone door 126 in a closed or transport position). The door may operate by rotating vertically tip-upwards about a lateral axis, or by rotating horizontally tip-outboards about a vertical axis, or by other means as well such as translation forwards then in other directions, or by paired rotation and translation, or other means.

As described in greater detail below, the interior cargo bay 170 is continuous throughout the length of the aircraft 101, i.e., it spans a majority of the length of the fuselage. The continuous length of the interior cargo bay 170 includes the space defined by the fuselage 101 in the forward end 120, the aft end 140, and the kinked portion 130 disposed therebetween, such spaces being considered corresponding to the forward bay, aft bay, and kinked bay portions of the interior cargo bay 170. The interior cargo bay 170 can thus include the volume defined by nose cone 126 when it is closed, as well as the volume defined proximate to a fuselage tailcone 142 located at the aft end 140. In the illustrated embodiment of FIG. 2A, the nose cone door 126 is hinged at a top such that it swings clockwise towards the fuselage cockpit 122 and a fixed portion or main section 128 of the fuselage 101.

In other embodiments, a nose cone door can swing in other manners, such as being hinged on a left or right side to swing clockwise or counter-clockwise towards the fixed portion 128 of the fuselage. The fixed portion 128 of the forwards fuselage 101 is the portion that is not the nose cone 126, and thus the forwards fuselage 101 is a combination of the fixed portion 128 and the nose cone 126. Alternatively, or additionally, the interior cargo bay 170 can be accessed through other means of access known to those skilled in the art, including but not limited to a hatch, door, and/or ramp located in the aft end 140 of the fuselage 101, hoisting cargo into the interior cargo bay 170 from below, and/or lowering cargo into the interior cargo bay 170 from above. One advantage provided by the illustrated configuration, at least as it relates to some aspects of loading large payloads, is that by not including an aft door, the interior cargo bay 170 can be continuous, making it significantly easier to stow cargo in the aft end 140 all the way into the fuselage tailcone 142. While loading through an aft door is possible with the present disclosures, doing so would make loading into and use of the interior cargo bay 170 space in the aft end 140 all the way into the fuselage tailcone 142 much more challenging and difficult to accomplish—a limitation faced in existing cargo aircraft configurations. Existing large cargo aircraft are typically unable to add cargo in this way (e.g., upwards and aftwards) because any kink present in their aft fuselage is specifically to create more vertical space for an aft door to allow large cargo into the forwards portion of the aircraft.

A floor 172 can be located in the interior cargo bay 170, and can also extend in a continuous manner, much like the bay 170 itself, from the forward end 120, through the kinked portion 130, and into the aft end 140. The floor 172 can thus be configured to have a forward end 172$f$, a kinked portion 172$k$, and an aft end 172$a$. In some embodiments, the floor 172 can be configured in a manner akin to most floors of cargo bays known in the art. In some other embodiments, discussed in greater detail below, one or more rails can be disposed in the interior cargo bay 170 and can be used to assist in loading a payload, such as the payload 10, into the interior cargo bay 170 and/or used to help secure the location of a payload once it is desirably positioned within the interior cargo bay 170. Additional fixtures and tooling designed to be used in conjunction with such rails are also discussed below at least with respect to FIGS. 10A-10C.

Opening the nose cone 126 not only exposes the cargo opening 171 and the floor 172, but it also provides access from an outside environment to a cantilevered tongue 160 that extends from or otherwise defines a forward-most portion of the fixed portion 128 of the fuselage 101. The cantilevered tongue can be an extension of the floor 172, or it can be its own feature that extends from below or above the floor 172 and associated bottom portion of the fuselage 101. The cantilevered tongue 160 can be used to support a payload, thus allowing the payload to extend into the volume of the interior cargo bay 170 defined by the nose cone 126.

A wingspan 180 can extend substantially laterally in both directions from the fuselage. The wingspan 180 includes both a first fixed wing 182 and a second fixed wing 184, the wings 182, 184 extending substantially perpendicular to the fuselage 101 in respective first and second directions which are approximately symmetric about a longitudinal-vertical plane away from the fuselage 101, and more particularly extending substantially perpendicular to the centerline $C_F$. Wings 182, 184 being indicated as extending from the fuselage 101 do not necessarily extend directly away from the fuselage 101, i.e., they do not have to be in direct contact with the fuselage 101. Further, the opposite directions the wings 182, 184 extend from each other can alternatively be described as the second wing 184 extending approximately symmetrically away from the first wing 182. As shown, the wings 182, 184 define approximately no sweep angle and no dihedral angle. In alternative embodiments, a sweep angle can be included in the tip-forwards (−) or tip-aftwards (+) direction, the angle being approximately in the range of about −40 degrees to about +60 degrees. In other alternative embodiments, a dihedral angle can be included in the tip-downwards (negative, or "anhedral") or tip-upwards (positive, or "dihedral") direction, the angle being approximately in the range of about −5 degrees to about +5 degrees. Other typical components of wings, including but not limited to slats for increasing lift, flaps for increasing lift and drag, ailerons for changing roll, spoilers for changing lift, drag, and roll, and winglets for decreasing drag can be provided, some of which a person skilled in the art will recognize are illustrated in the illustrations of the aircraft 100 (other parts of wings, or the aircraft 100 more generally, not specifically mentioned in this detailed description are also illustrated and recognizable by those skilled in the art). Engines, engine nacelles, and engine pylons 186 can also be provided. In the illustrated embodiment, two engines 186, one mounted to each wing 182, 184 are provided. Additional engines can be provided, such as four or six, and other locations for engines are possible, such as being mounted to the fuselage 101 rather than the wings 182, 184.

The kinked portion 130 provides for an upward transition between the forward end 120 and the aft end 140. The kinked portion 130 includes a kink, i.e., a bend, in the fixed portion 128 of the fuselage 101 such that both the top-most outer surface 102 and the bottom-most outer surface 103 of the fuselage 101 become angled with respect to the centerline $C_F$ of the forward end 120 of the aircraft 100, i.e., both surfaces 102, 103 include the upward transition provided for by the kinked portion 130. As shown at least in FIG. 1B, the aft-most end of the aft end 140 can raise entirely above the centerline $C_F$. In the illustrated embodiment, the angle defined by the bottom-most outer surface 103 and the centerline $C_F$ is larger than an angle defined by the top-most outer surface 102 and the centerline $C_F$, although other configurations may be possible. Notably, although the present disclosure generally describes the portions associated with the aft end 140 as being "aft," in some instances they may be referred to as part of a "kinked portion" or the like because the entirety of the aft end 140 is angled as a result of the kinked portion 130. Thus, references herein, including in the claims, to a kinked portion, a kinked cargo bay or cargo bay portion, a kinked cargo centerline, etc. will be understood by a person skilled in the art, in view of the present disclosures, to be referring to the aft end 140 of the aircraft 100 (or the aft end in other aircraft embodiments) in some instances.

Despite the angled nature of the aft end 140, the aft end 140 is well-suited to receive cargo therein. In fact, the aircraft 100 is specifically designed in a manner that allows for the volume defined by the aft end 140, up to almost the very aft-most tip of the aft end 140, i.e., the fuselage tailcone 142, can be used to receive cargo as part of the continuous interior cargo bay 170. Proximate to the fuselage tailcone 142 can be an empennage 150, which can include horizontal stabilizers for providing longitudinal stability, elevators for controlling pitch, vertical stabilizers for providing lateral-directional stability, and rudders for controlling yaw, among other typical empennage components that may or may not be illustrated but would be recognized by a person skilled in the art.

The aircraft 100 is particularly well-suited for large payloads because of a variety of features, including its size. A length from the forward-most tip of the nose cone 126 to the aft-most tip of the fuselage tailcone 142 can be approximately in the range of about 60 meters to about 150 meters. Some non-limiting lengths of the aircraft 100 can include about 80 meters, about 84 meters, about 90 meters, about 95 meters, about 100 meters, about 105 meters, about 107 meters, about 110 meters, about 115 meters, or about 120 meters. Shorter and longer lengths are possible. A volume of the interior cargo bay 170, inclusive of the volume defined by the nose cone 126 and the volume defined in the fuselage tailcone 142, both of which can be used to stow cargo, can be approximately in the range of about 1200 cubic meters to about 12,000 cubic meters, the volume being dependent at least on the length of the aircraft 100 and an approximate diameter of the fuselage (which can change across the length). One non-limiting volume of the interior cargo bay 170 can be about 6850 cubic meters. Not accounting for the very terminal ends of the interior cargo bay 170 where diameters get smaller at the terminal ends of the fuselage 101, diameters across the length of the fuselage, as measured from an interior thereof (thus defining the volume of the cargo bay) can be approximately in the range of about 4.3 meters to about 13 meters, or about 8 meters to 11 meters. One non-limiting diameter of the fuselage 101 proximate to its midpoint can be about 9 meters. The wingspan, from tip of the wing 132 to the tip of the wing 134, can be approximately in the range of about 60 meters to 110 meters, or about 70 meters to about 100 meters. One non-limiting length of the wingspan 180 can be about 80 meters. A person skilled in the art will recognize these sizes and dimensions are based on a variety of factors, including but not limited to the size and mass of the cargo to be transported, the various sizes and shapes of the components of the aircraft 100, and the intended use of the aircraft, and thus they are by no means limiting. Nevertheless, the large sizes that the present disclosure both provides the benefit of being able to transport large payloads, but faces challenges due, at least in part, to its size that make creating such a large aircraft challenging. The engineering involved is not merely making a plane larger. As a result, many innovations tied to the aircraft 100 provided for herein, and in other counterpart patent applications, are the result of very specific design solutions arrived at by way of engineering.

Materials typically used for making fuselages can be suitable for use in the present aircraft 100. These materials include, but are not limited to, metals and metal alloys (e.g., aluminum alloys), composites (e.g., carbon fiber-epoxy composites), and laminates (e.g., fiber-metallic laminates), among other materials, including combinations thereof.

Figure 2A:
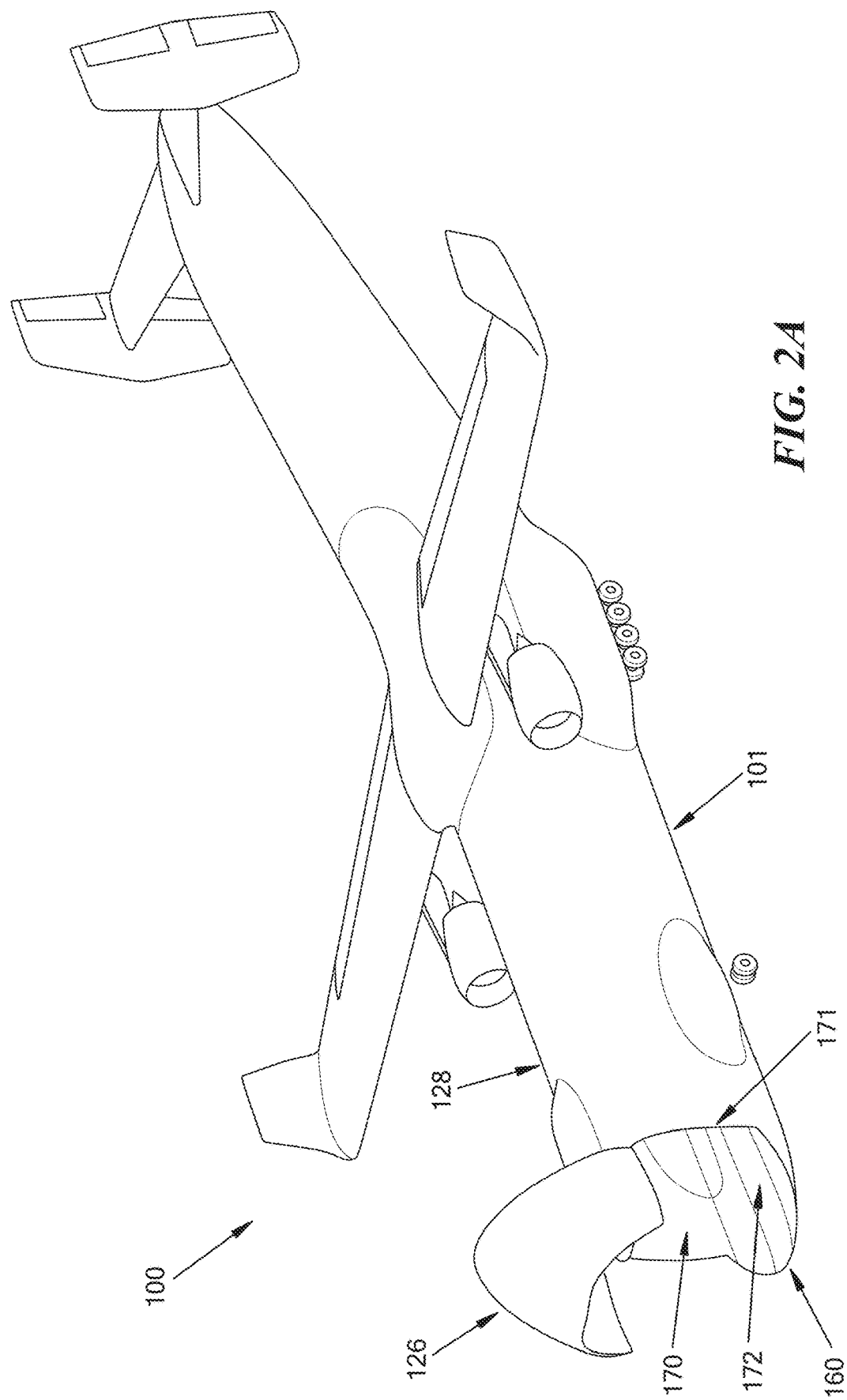
FIG. 2A is an isometric view of the aircraft of FIG. 1A with a nose cone door in an open position to provide access to an interior cargo bay of the aircraft.
Figure 2B:
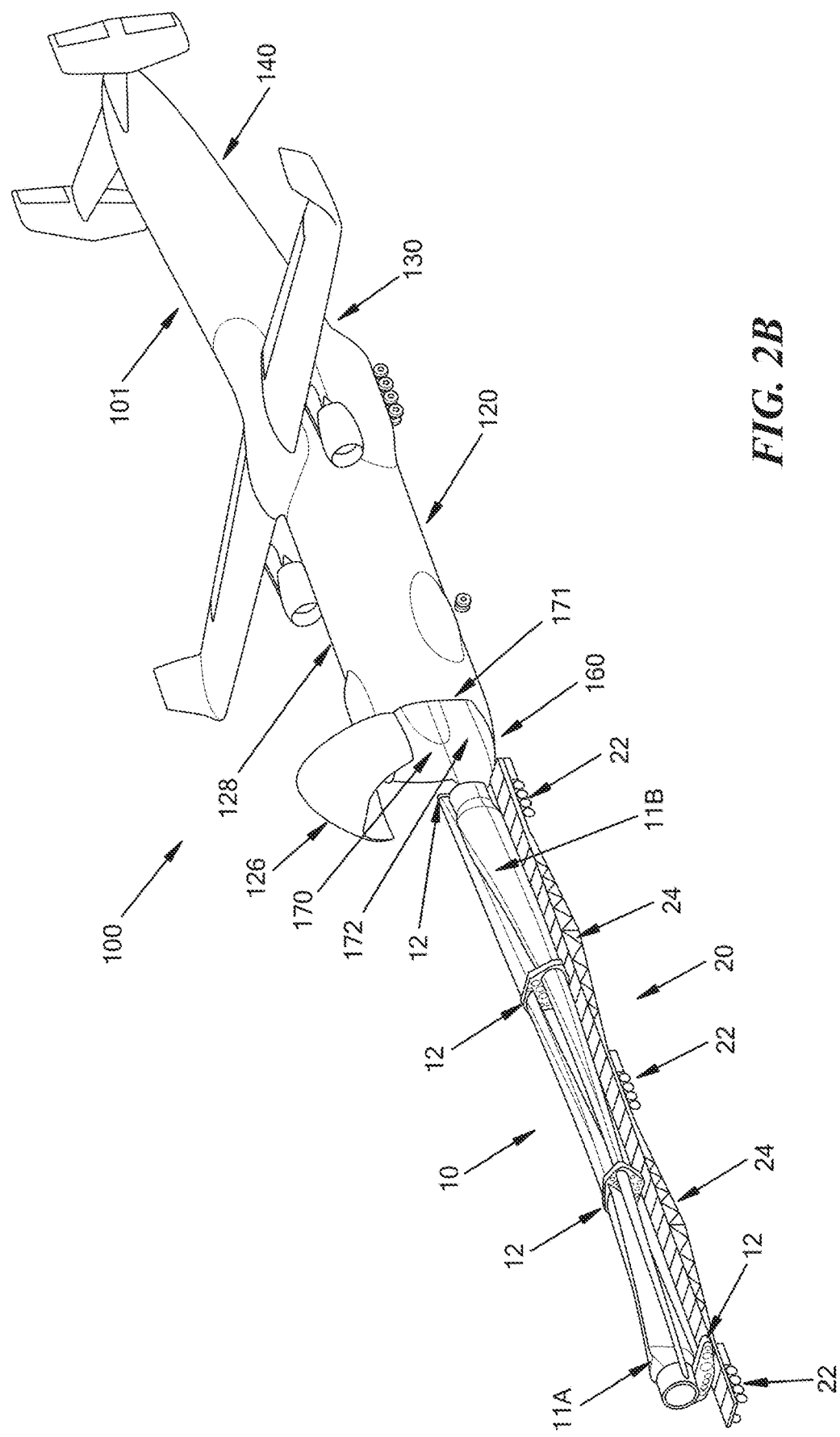
FIG. 2B is an isometric view of the aircraft of FIG. 2A with a payload being disposed proximate to the aircraft for loading into the interior cargo bay.
Figure 2C:
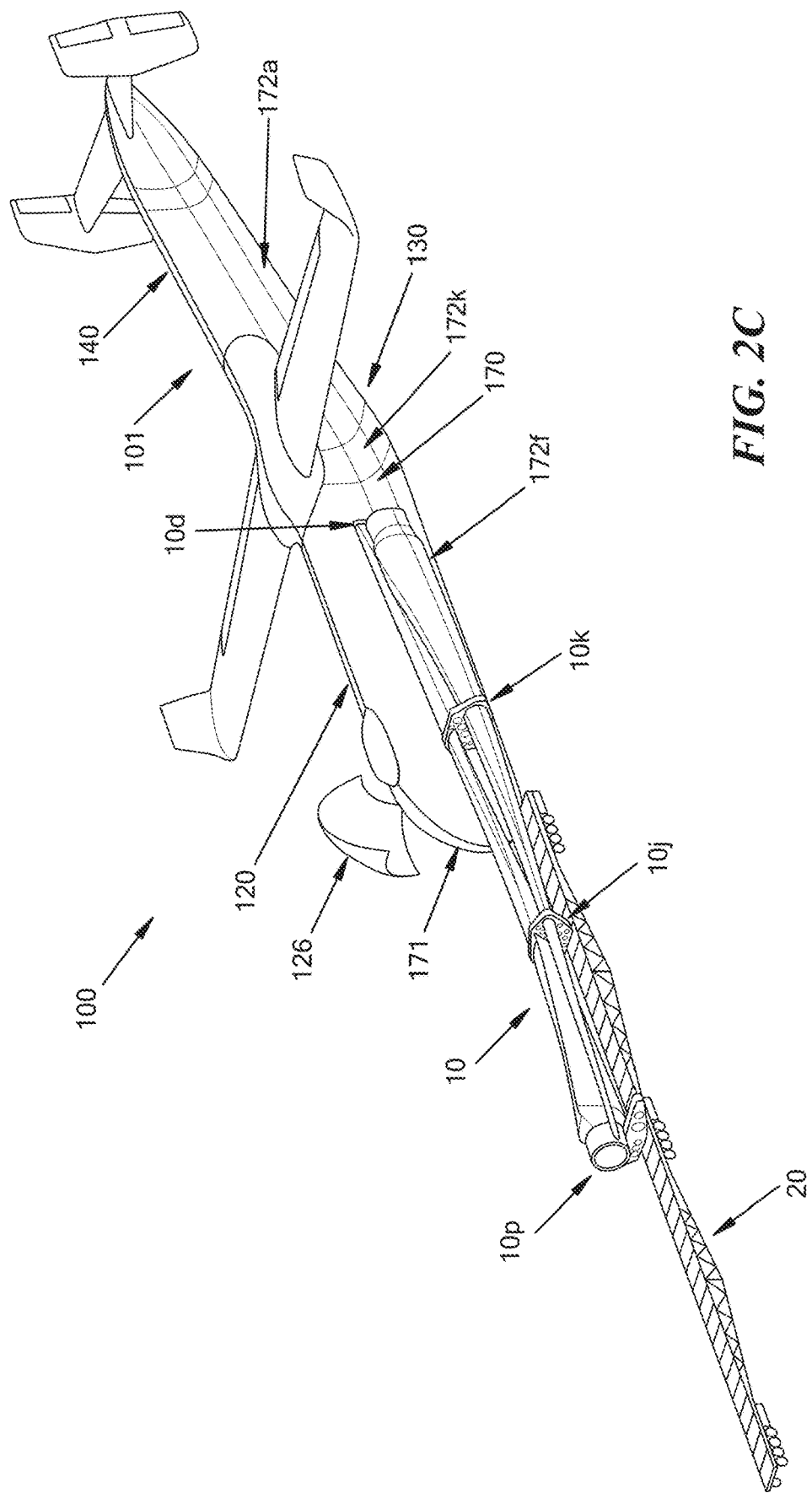
FIG. 2C is an isometric, partial cross-sectional view of the aircraft of FIG. 2B with the payload being partially loaded into the interior cargo bay.
Figure 2D:
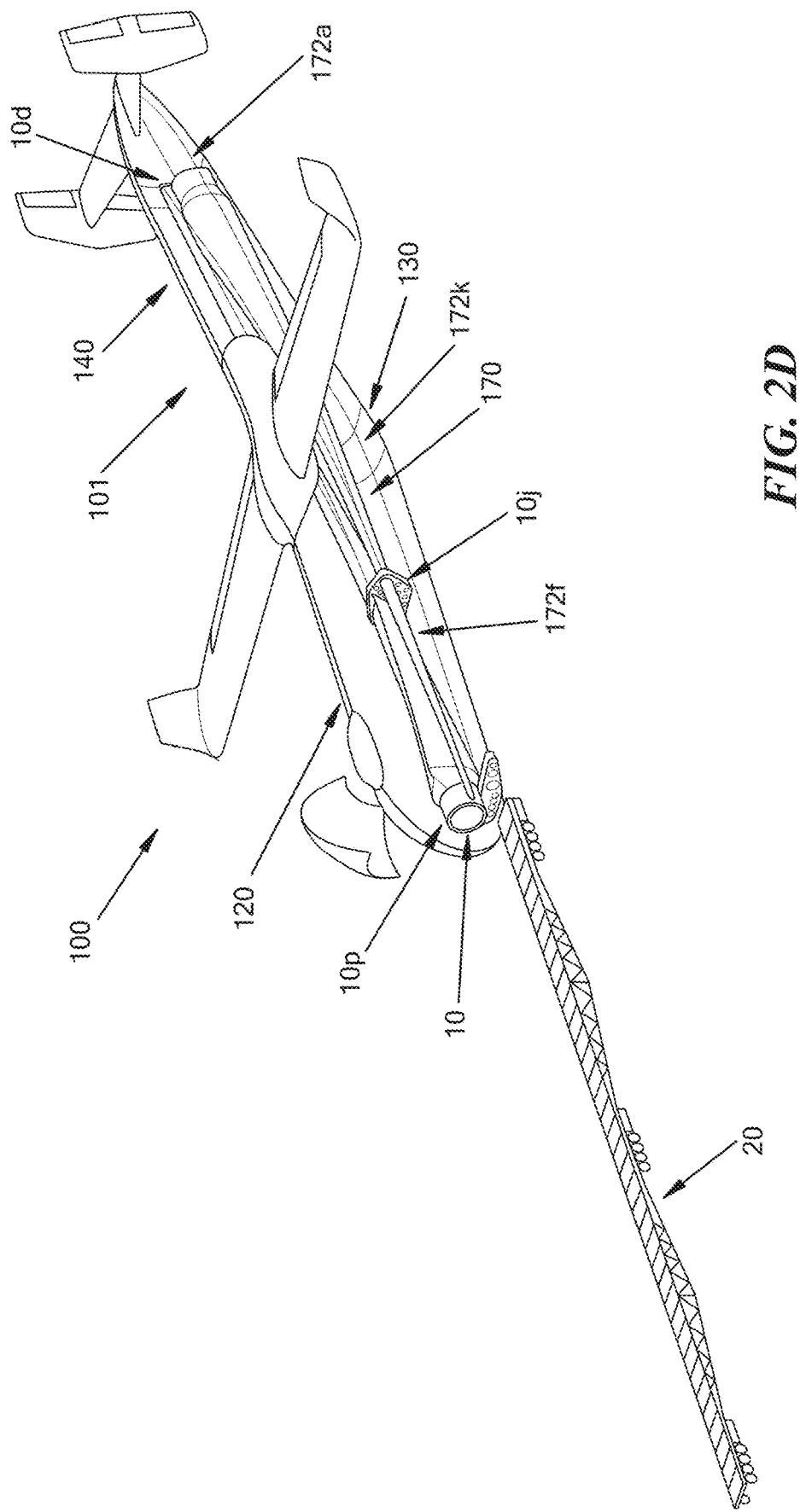
FIG. 2D is an isometric, partial cross-sectional view of the aircraft of FIG. 2C with the payload being fully loaded into the interior cargo bay.

FIGS. 2B-2D provide for a general, simplified illustration of one exemplary embodiment of loading a large payload 10 into the aircraft 100. As shown, the cargo nose door 126 is swung upwards into its open position, exposing the portion of the interior cargo bay 170 associated with the fixed portion 128 of the fuselage 101, which can extend through the kinked portion 130 and through essentially the entirety of the aft end 140. The cargo opening 171 provides access to the interior cargo bay 170, and the cantilevered tongue 160 can be used to help initially receive the payload. As shown, the payload 10 includes two wind turbine blades 11A, 11B, held with respect to each other by payload-receiving fixtures 12. The payload-receiving fixtures 12 are generally considered part of the payload, although in an alternative interpretation, the payload 10 can just be configured to be the blades 11A, 11B. This payload 10 can be considered irregular in that the shape, size, and weight distribution across the length of the payload is complex, causing a center of gravity of the payload to be at a separate location than a geometric centroid of the payload. One dimension (length) greatly exceeds the others (width and height), the shape varies with complex curvature nearly everywhere, and the relative fragility of the payload requires a minimum clearance be maintained at all times as well as fixturing support the length of the cargo at several locations even under the payload's own weight under gravity. Additional irregular payload criteria can include objects with profiles normal to a lengthwise axis rotate at different stations along that axis, resulting in a lengthwise twist (e.g., wind turbine blade spanwise twist) or profiles are located along a curved (rather than linear) path (e.g., wind turbine blade in-plane sweep). Additionally, irregular payloads include objects where a width, depth, or height vary non-monotonically along the length of the payload (e.g., wind turbine blade thickness can be maximal at the max chord station, potentially tapering to a smaller cylinder at the hub and to a thin tip). The term irregular package will be similarly understood.

The payload 10, which can also be referred to as a package, particularly when multiple objects (e.g., more than one blade, a blade(s) and ballast(s)) are involved, possibly secured together and manipulated as a single unit, can be delivered to the aircraft 100 using most any suitable devices, systems, vehicles, or methods for transporting a large payload on the ground. A package can involve a single object though. In the illustrated embodiment, a transport vehicle 20 includes a plurality of wheeled mobile transporters 22 linked together by a plurality of spans, as shown trusses 24. In some instances, one or more of the wheeled mobile transporters 22 can be self-propelled, or the transport vehicle 20 more generally can be powered by itself in some fashion. Alternatively, or additionally, an outside mechanism can be used to move the vehicle 20, such as a large vehicle to push or pull the vehicle 20, or various mechanical systems that can be used to move large payloads, such as various combinations of winches, pulleys, cables, cranes, and/or power drive units.

As shown in FIG. 2B, the transport vehicle 20 can be driven or otherwise moved to the forward end 120 of the aircraft 100, proximate to the cargo opening 171. Subsequently, the payload 10 can begin to be moved from the transport vehicle 20 and into the interior cargo bay 170. This can likewise be done using various combinations of one or more winches, pulleys, cables, cranes, and/or power drive units, such set-ups and configurations being known to those skilled in the art. FIG. 2C illustrates a snapshot of the loading process with half of the fuselage removed for illustrative purposes (as currently shown, the half of the nose cone 126 illustrated is in both an open and closed position, but during loading through the cargo opening 171, it is in an open position). As shown, the payload 10 is partially disposed in the interior cargo bay 170 and is partially still supported by the transport vehicle 20. A distal end 10d of the payload 10 is still disposed in the forward end 120, as it has not yet reached the kinked portion 130.

The system and/or methods used to move the payload 10 into the partially loaded position illustrated in FIG. 2C can continue to be employed to move the payload 10 into the fully loaded position illustrated in FIG. 2D. As shown, the distal end 10d of the payload 10d is disposed in the interior cargo bay 170 at the aft end 140, a proximal end 10p of the payload 10 is disposed in the interior cargo bay 170 at the forward end 120 (for example, on the cantilevered tongue 160, although the tongue is not easily visible in FIG. 2D), and the intermediate portion of the payload 10 disposed between the proximal and distal ends 10p, 10d extends from the forward end 120, through the kinked portion 130, and into the aft end 140. As shown, the only contact points with a floor of the interior cargo bay 170 (which for these purposes includes the tongue 160) are at the proximal and distal ends 10p, 10d of the payload 10 and at two intermediate points 10j, 10k between the proximal and distal ends 10p, 10d, each of which is supported by a corresponding fixture 12. In other embodiments, there may be fewer or more contact points, depending, at least in part, on the size and shape of each of the payload and related packaging, the size and shape of the cargo bay, the number of payload-receiving fixture used, and other factors. This illustrated configuration of the payload disposed in the interior cargo bay 170 is more clearly understood by discussing the configuration of the kinked fuselage (i.e., the fuselage 101 including the kinked portion 130) in greater detail. Once the payload 10 is fully disposed in the interior cargo bay 170, it can be secured within the cargo bay 170 using techniques provided for herein, in counterpart applications, or otherwise known to those skilled in the art.

Figure 3A:
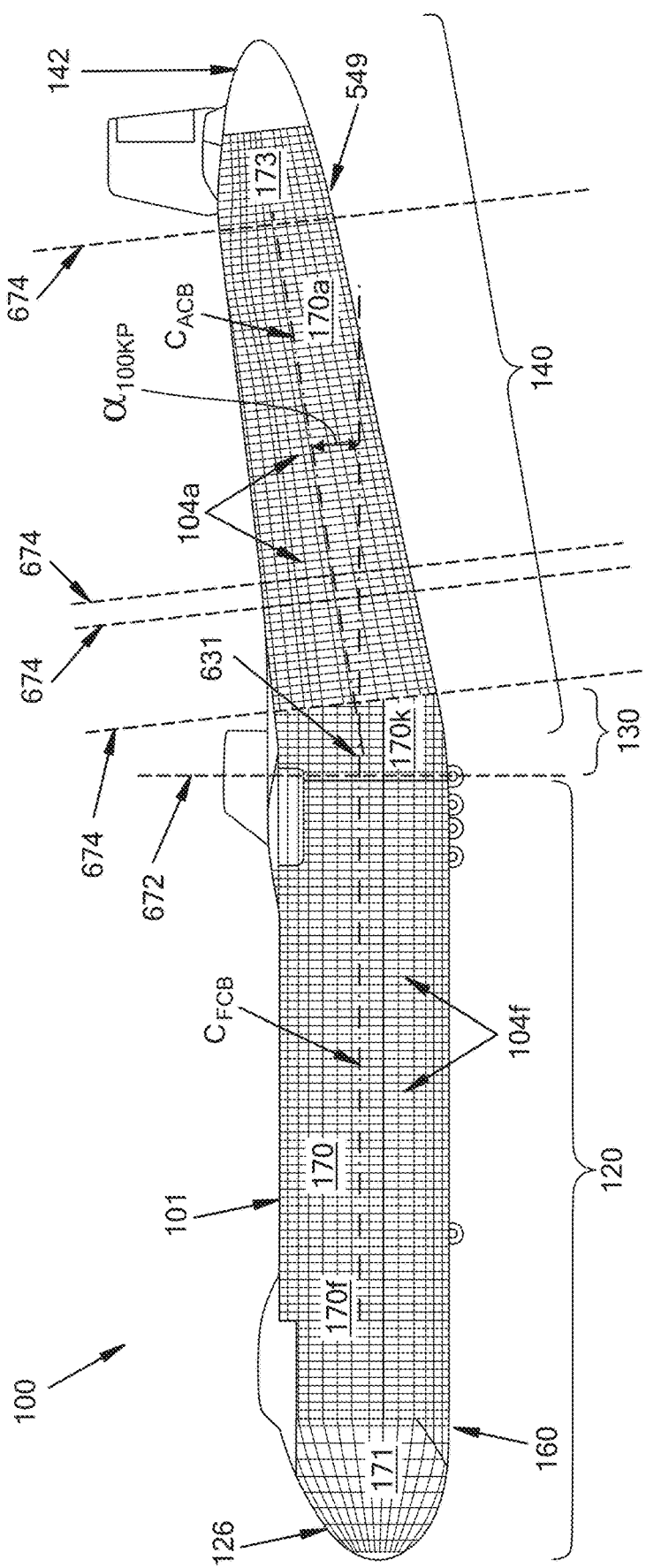
FIG. 3A is a side cross-sectional view of the aircraft of FIG. 1A, including an interior cargo bay of the aircraft.

FIG. 3A shows the aft region 170a of the cargo bay 170 extending through almost all of the aft fuselage 140, which is a distinct advantage of the configurations discussed herein. Moreover, due to the length of the aft fuselage 140, a pitch 674 of structural frames 104a of the aft fuselage 140 can be angled with respect to a pitch 672 of structural frames 104f of the forward fuselage 120 approximately equal to the kink angle $\alpha_{100K}$ of the fuselage 101. In some examples, the kinked region 130 represents an upward transition between the pitch 672 of the structural frames 104f of the forward fuselage 120 and the pitch 674 of the structural frames 104a of the aft fuselage 140. A person skilled in the art will recognize that structural frames 104a, 104f are merely one example of structural features or elements that can be incorporated into the fuselage 101 to provide support. Such elements can be more generally described as circumferentially-disposed structural elements that are oriented orthogonally along the aft centerline $C_{ACB}$ and the forward centerline $C_{FCB}$. In some examples, the location of the cargo bay kink 631 is forward or aft of a fuselage kink such that either the forward cargo region 170f partially extends into the aft fuselage 140 or the aft cargo region 170a partially extends into the forward fuselage 120, however, this generally depends, at least in part, on the distance between the interior of the cargo bay 170 and the exterior of the fuselage, which is typically a small distance for cargo aircraft having a maximally sized cargo bay. Regardless, to fully utilize examples of the present disclosure, the aft region 170a of the cargo bay 170 can be both (1) able to be substantially extended due to the ability of the aft fuselage 140 length to be extended and (2) able to extend along substantially all of the length of the aft fuselage 140 because examples of the present disclosure enable aircraft to have elongated aft fuselages for a fixed tailstrike angle and/or minimized kink angle. Additionally, minimizing the fuselage kink angle for elongated aft fuselages allows the aft region of the cargo bay to extend further along the fuselage while increasing the maximum straight-line payload length for a given overall aircraft length and tailstrike angle, as shown at least in FIG. 3A.

Figure 3B:
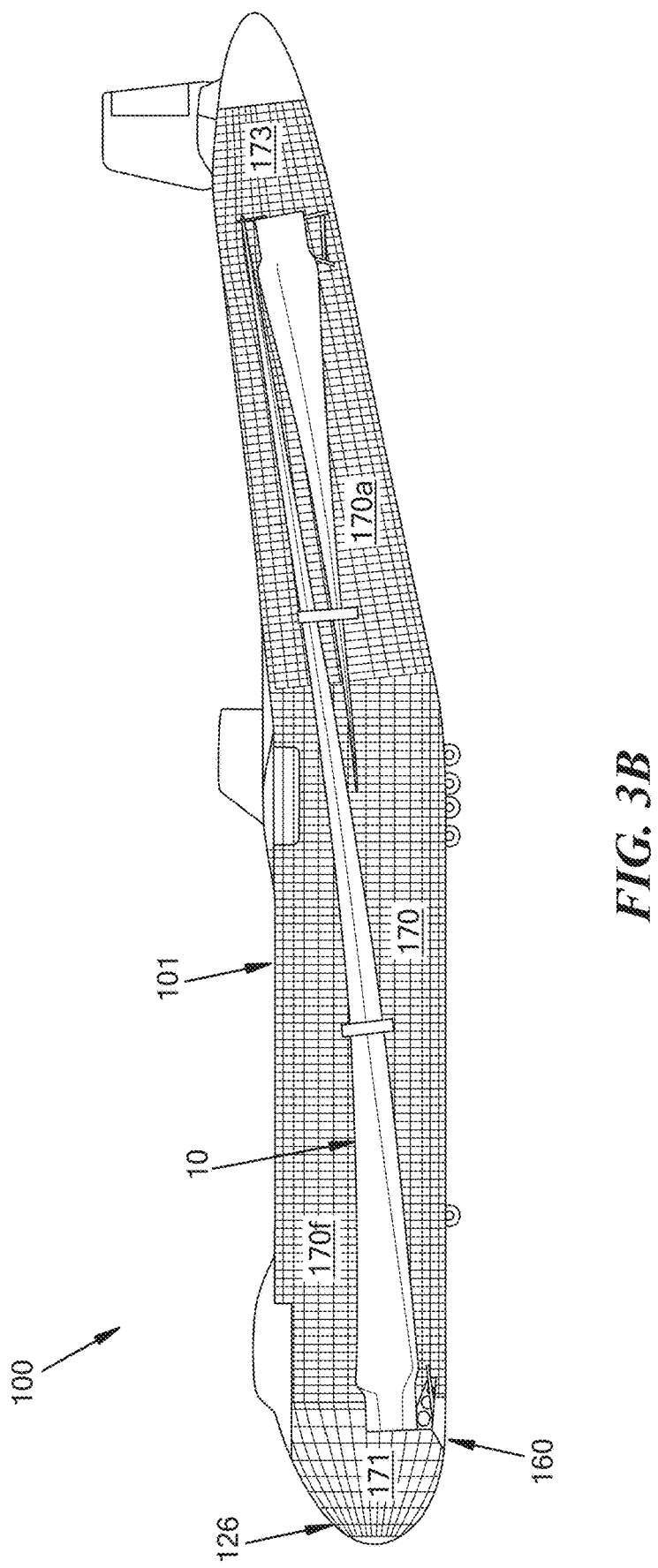
FIG. 3B is the side cross-sectional view of the aircraft of FIG. 1A with an exemplary payload disposed in the interior cargo bay.

FIG. 3B shows a side cross-sectional view of the fuselage 101 of the cargo aircraft 100 of FIG. 1A with a highly elongated payload 10 of two wind turbine blades 11A, 11B disposed substantially throughout the interior cargo bay 170 and extending from the forward end 171 of the forward region 170f to the aft end 173 of the aft region 170a. Having at least a portion of the aft region 170a being linearly connected to (e.g., within line of sight) of at least a portion of the forward region 170f enables the extension of the aft region 170a to result in an extension in the maximum overall length of a rigid payload capable of being carried inside the interior cargo bay 170. Wind turbine blades, however, are often able to be deflected slightly during transport and so examples of the present disclosure are especially suited to their transport as the ability to slightly deflect the payload 10 during transport enables even long maximum payload lengths to be achieved by further extending the aft end 173 of the aft region 170a beyond the line of sight of the forward-most end 171 of the forward region 170f.

Figure 3C:
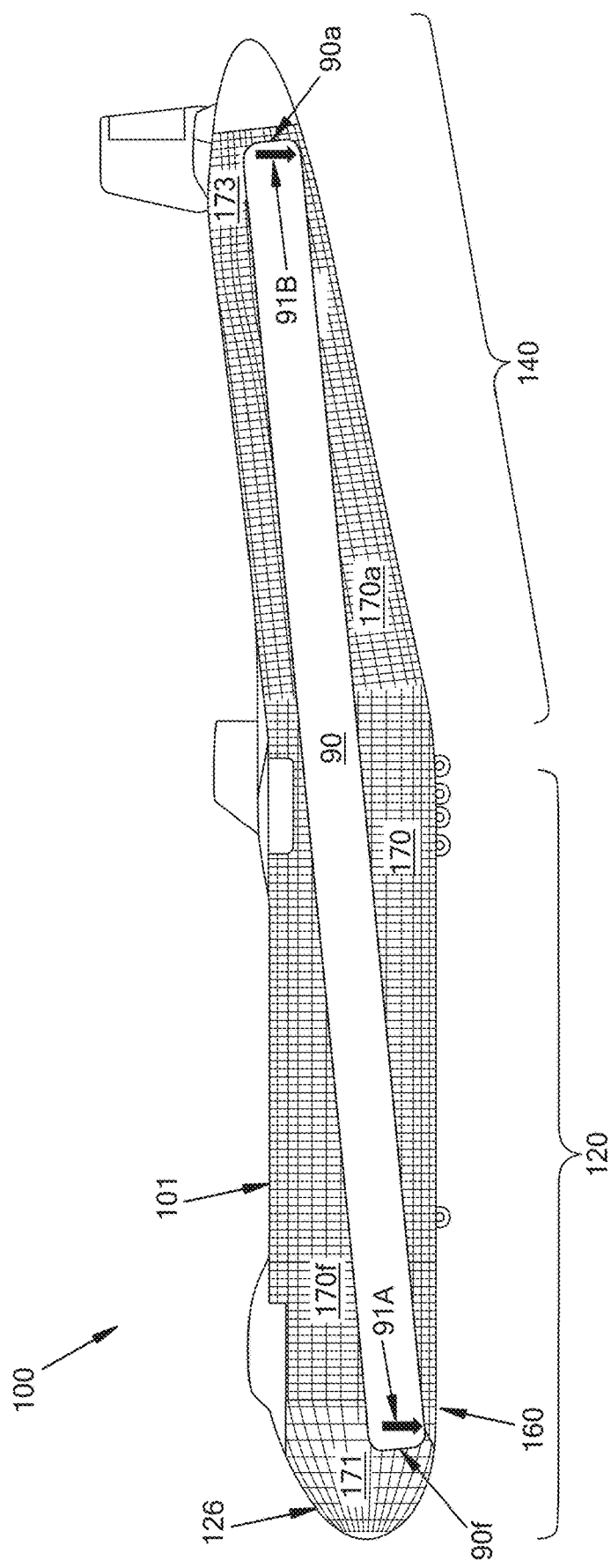
FIG. 3C is the side cross-sectional view of the aircraft of FIG. 3A with a schematic of an exemplary maximum-length payload disposed in the interior cargo bay.

FIG. 3C is the same cross-sectional view of the fuselage 101 of the cargo aircraft 100 of FIG. 3B with a maximum length rigid payload 90 secured in the cargo bay 170. A forward end 90f of the maximum length rigid payload 90 can be secured to the cantilevered tongue 160 in the forward end 171 of the forward region 170f with a first portion of the weight of the payload 90 (shown as vector 91A) being carried by the cantilevered tongue 160 and an aft end 90a of the maximum length rigid payload 90 can be secured to the aft end 173 of the aft region 170a with a second portion of the weight of the payload 90 (shown as vector 91B) being carried by the aft end 173 of the aft region 170a.

Additional details about a kinked fuselage configuration may be provided in International Patent Application No. PCT/US2020/049787, entitled "AIRCRAFT FUSELAGE CONFIGURATIONS FOR AVOIDING TAIL STRIKE WHILE ALLOWING LONG PAYLOADS," and filed Sep. 8, 2020, and the content of which is incorporated by reference herein in its entirety.

Removable and Replaceable Tailcones

Systems and methods for packaging extremely long payloads (e.g., wind turbine blades) in cargo aircraft are presented herein. Embodiments of these systems and methods can enable one end of any extremely long cargo payload to reside underneath the horizontal stabilizer and poke out of an aft end opening of the fuselage primary structure into a cargo extension that is formed inside a removable tailcone structure attached to the aft end opening of the fuselage. Because the tailcone can be removable and replaceable and/or, in some instances, extendable and/or adjustable, embodiments presented herein enable cargo aircraft to be designed to have a variable maximum payload length. The maximum available volume of the cargo bay is varied by swapping tailcones and/or extending or otherwise adjusting a tailcone structure.

Figure 4:
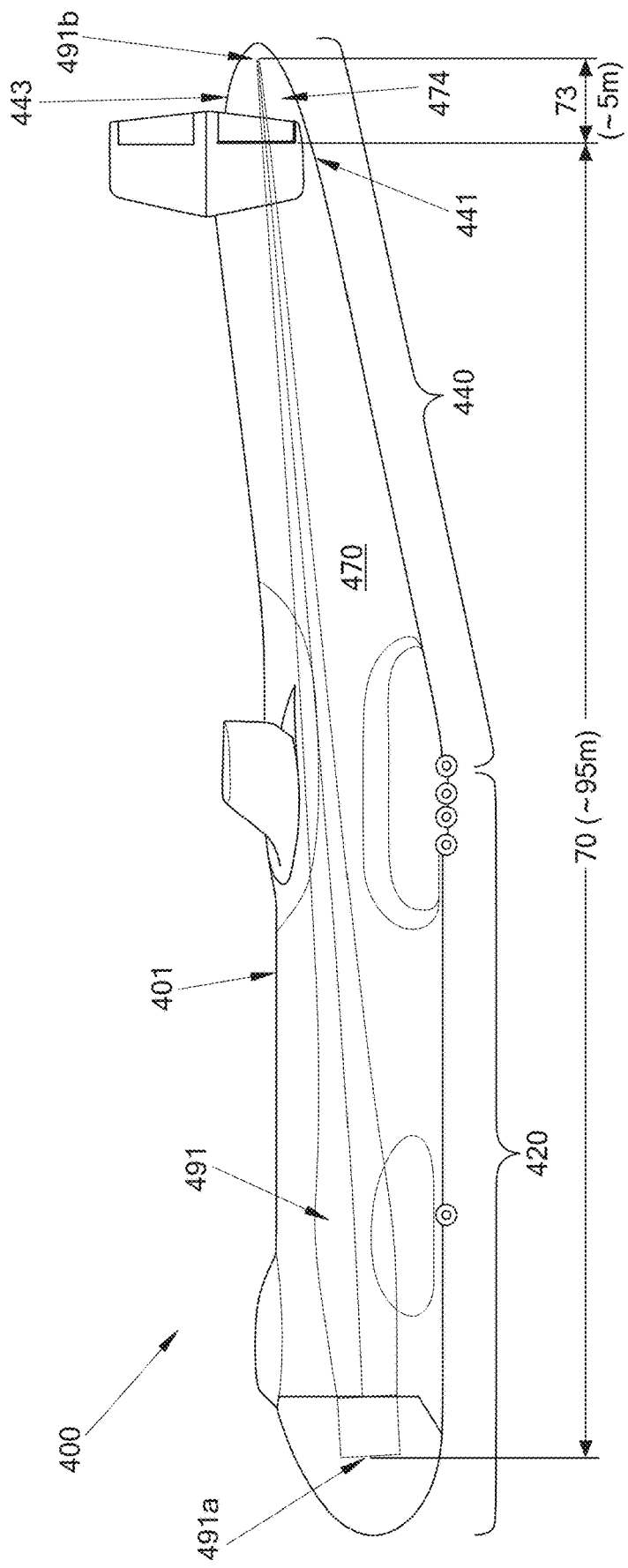
FIG. 4 is a side view of one exemplary embodiment of an aircraft having a removable and replaceable tailcone with an aft terminal region of an interior cargo bay in the tailcone, the aircraft carrying a 100-meter wind turbine blade.

FIG. 4 is a side view of an aircraft 400 that is designed similar to the aircraft 100 of FIG. 1A except that the aircraft 400 of FIG. 4 includes a primary fuselage 401 with an aft end 441 having attached thereto a removable and replaceable tailcone 443. The fuselage 401 includes a continuous interior cargo bay 470 that extends along the forward 420 and aft 440 sections of the fuselage 401, as well as into an extended cargo region 474 that is inside the replaceable tailcone 443. The aircraft 400 of FIG. 4 also is shown containing an extremely long payload, which is shown as a 100 meter long wind turbine blade 491 that extends from a forward end 491a, along the entirety of the continuous interior cargo bay 470, and to an aft end 491b that is disposed within the extended cargo region 474 of the replaceable tailcone 443. In FIG. 4, the continuous interior cargo bay 470 is shown to have a maximum payload length 70 of approximately 95 meters, which is extended by approximately 5 meters via the length 73 extended cargo region 474 of the replaceable tailcone 443. This results in a continuous cargo bay 470 capable of carrying the 100 meter long payload 491. The replaceable tailcone 443 of FIG. 4 can be sized and shaped in a traditional manner of an aft end of a fuselage, and thus resembles the fuselage tailcone 142 of the aircraft 100 of FIG. 1A. However, the aft end 441 is different in that it provides for an extended or otherwise adjustable cargo region 474, and is also removably attached about an aft opening 442 to the cargo bay 470 of the primary fuselage 401, as shown in FIG. 5A.

Figure 5A:
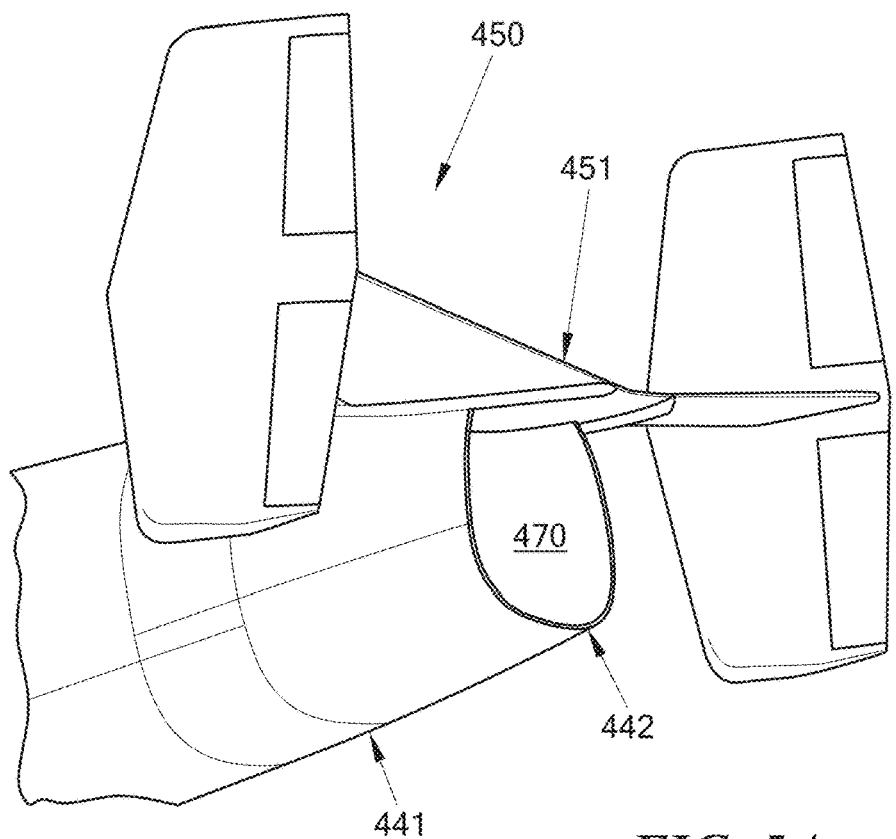
FIG. 5A is an isometric view of the aft end of the aircraft of FIG. 4 with the tailcone removed.

FIG. 5A is an isometric view of the aft end 441 of the aircraft 400 of FIG. 4 with the replaceable tailcone 443 removed to show the aft opening 442 into the continuous interior cargo bay 470. FIG. 5A also shows that the aft opening 442 can be arranged below the horizontal stabilizer 451 of the empennage to maximum the size of the aft opening 442. In other examples, the primary fuselage 401 could be designed to have the empennage 450 at the aft end 441 with the horizontal stabilizer 451 arranged below the aft opening 442. In both cases a center region of the aft region of the continuous interior cargo bay is left open so that the cargo can pass either under (in the former case) or over (the latter case) the horizontal stabilizer. It is also contemplated that a horizontal stabilizer can be designed in such a manner as to allow at least a portion the cargo bay to pass between structural elements of the horizontal stabilizer that transit through the fuselage. Additionally, the aft opening 442 can include an interface, such as one or more coupling mechanisms, configured to secure a forward end of the replaceable tailcone 443 to the primary fuselage 401. In some instances, this interface is designed to minimize the time required for installation and removal of a tailcone, and the ability to change the tailcone quickly can be enhanced by minimizing required fasteners and incorporating indexing features for alignment. One skilled in the art will appreciate that a plurality of different types of existing coupling mechanism and arrangements may be suitable for securing the replaceable tailcone 443 to the primary fuselage 401, such as bolts, latches, and electromechanical actuators.

Figure 5B:
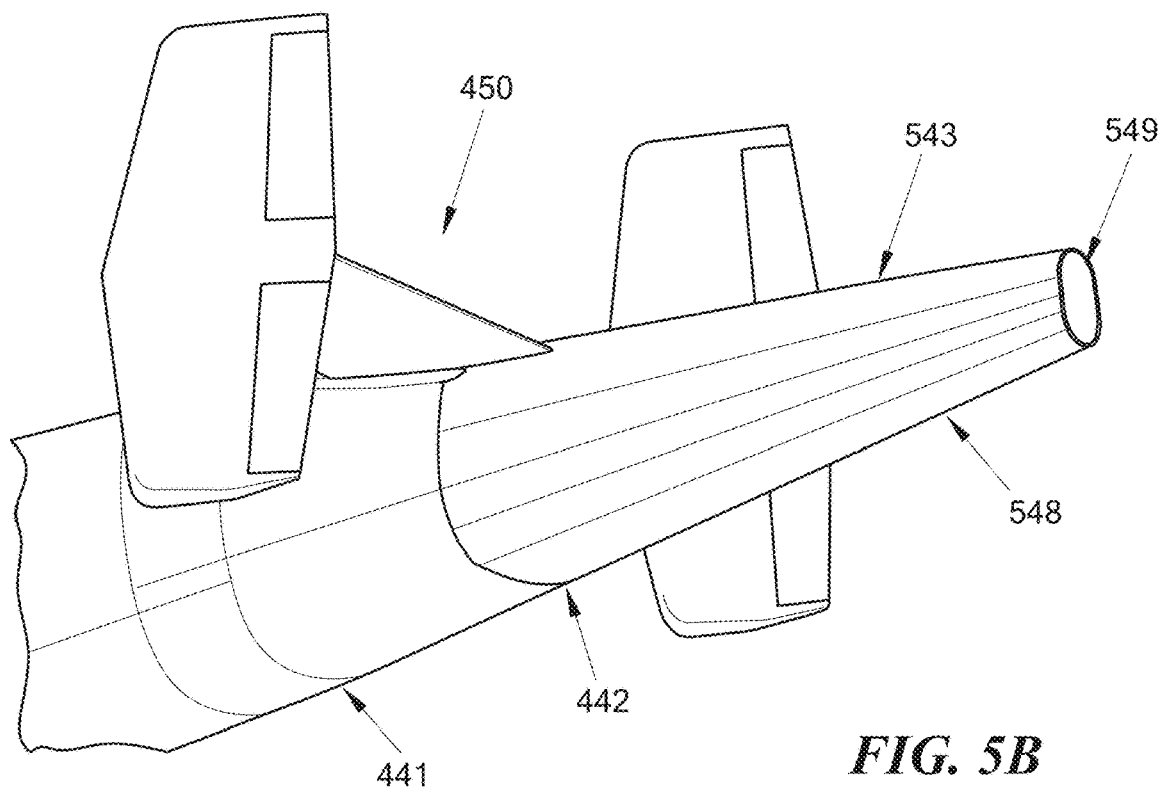
FIG. 5B is an isometric view of the aft end of the aircraft of FIG. 4 with an extended tailcone attached.

Examples of the present disclosure include the use of different tailcones to adjust a parameter (e.g., maximum payload length) of the cargo aircraft 400. As a representative example, an extended length tailcone, such as the longer removable tailcone 543 shown in FIG. 5B, can replace the replaceable tailcone 443 on the aircraft 400 of FIG. 4 to provide an extended cargo region that is longer than the extended cargo region 474 of the replaceable tailcone 443. Accordingly, FIG. 5B illustrates the longer removable tailcone 543 coupled to the aft opening 442 of the aft end 441 of the primary fuselage 401 of the aircraft 400 of FIG. 4. The longer removable tailcone 543 contains an extended cargo region (574, as shown in FIGS. 6A-6D) that is approximately three times longer than that of the replaceable tailcone 443 of FIG. 4. Additionally, even though this longer removable tailcone 543 further extends the overall length of the aircraft 400, the longer removable tailcone 543 can include a lower surface 548 that is designed to not substantially change the overall performance of the aircraft 400, especially during takeoff and landing. For example, an additional feature of some embodiments of the tailcones disclosed herein relates to the shape of the tailcone and the risk of a tailstrike. To mitigate any additional risk of tailstrike on the tailcone cargo extension, the upsweep angle of the tailcone can be maintained with that of the aft fuselage forward of the tailcone. Additionally, the aft fuselage forward of the tailcone and under the horizontal stabilizer can be locally reinforced to absorb a potential impact during tailstrike and incorporates either a wheel or frangible skid at the impact point. In the event of a tailstrike the wheel or skid would absorb the impact with the ground before the tailcone touched the surface. For example, the lower surface 548 is shown to have a substantially similar angle as the lower surface of the adjacent aft end 441 of the primary fuselage 401, which is done to avoid modifying the tail strike angle of the aircraft 400. Additionally, the longer removable tailcone 543 tapers significantly to an aft end 549 to minimize additional drag during flight. Note that while the aft end 549 of the longer removable tailcone 543 is shown to be open, this can also be a closed end. Embodiments include the attachment of a tail or end cap (not shown) onto the aft end 549 of the longer removable tailcone 543 to, for example, provide access to the aft end of a payload during loading and unloading that may be otherwise unreachable from the forward end due to the shape of the longer removable tailcone 543. Alternatively, the aft end 549 can just be formed in a closed manner without tail cap.

Figure 6A:
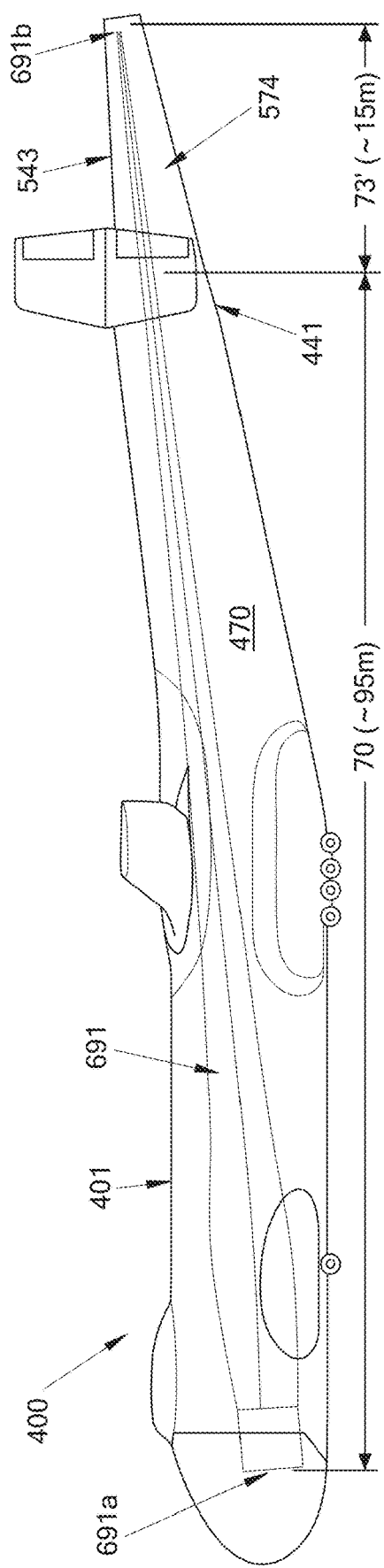
FIG. 6A is a side, transparent view of the aircraft of FIG. 4 with the extended tailcone attached and a 110-meter wind turbine blade disposed in the interior cargo bay and extending into the extended tailcone.
Figure 6B:
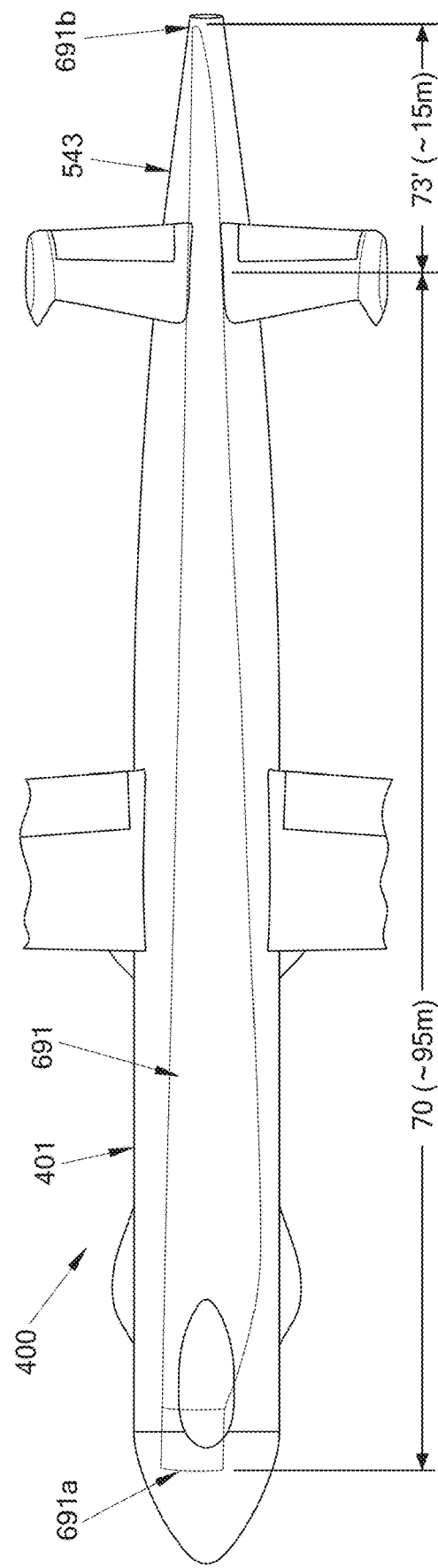
FIG. 6B is a top, transparent view of the aircraft and wind turbine blade of FIG. 6A.
Figure 6C:
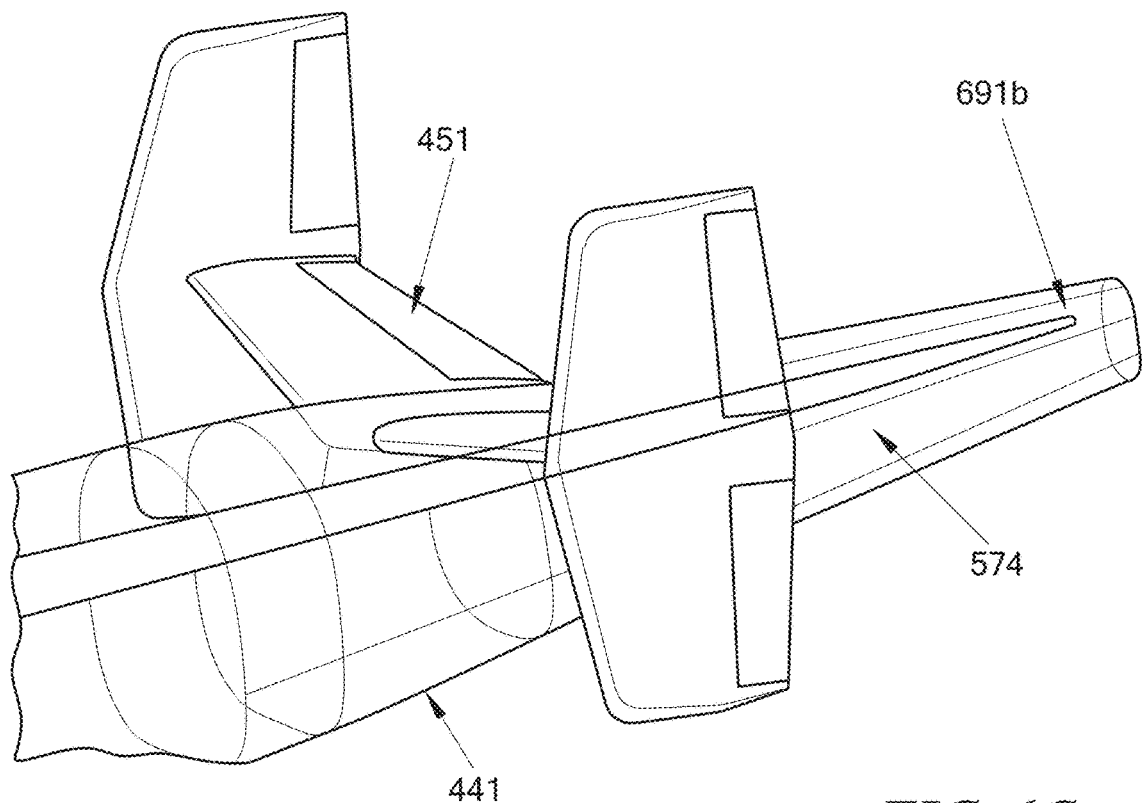
FIGS. 6C and 6D are isometric, transparent views of the aft end of the aircraft of FIG. 6A showing an aft end of the 110-meter wind turbine blade disposed in an interior cargo region of the extended tailcone.
Figure 6D:
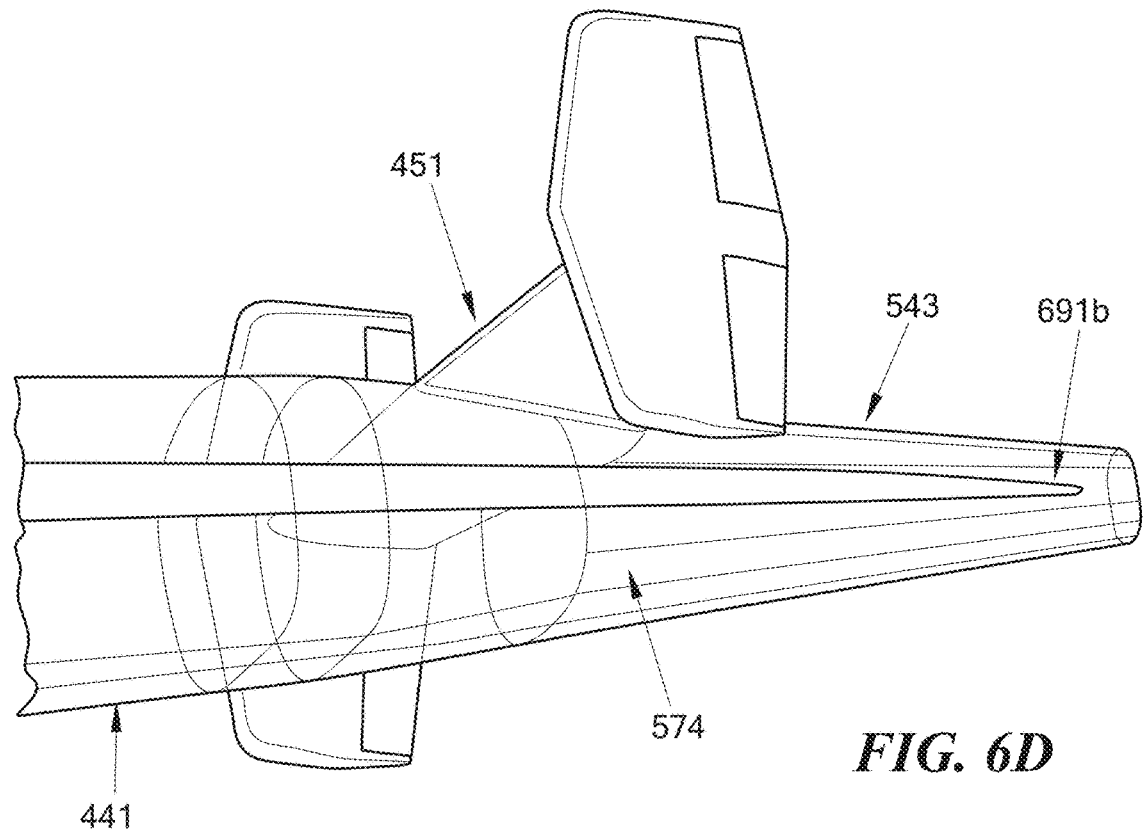

A view of the complete aircraft 400 with the longer removable tailcone 543 is shown in FIGS. 6A and 6B, which are transparent side and top views, respectively, of the aircraft 400 of FIG. 4 with a 110 meter wind turbine blade disposed in the interior cargo bay 470 and extending into an extended cargo region 574 inside the longer removable tailcone 543. As detailed above, the primary fuselage 401 of the aircraft 400 has a continuous interior cargo bay 470 with a maximum payload length 70 of approximately 95 meters, which is extended by approximately 15 meters by the length 73' extended cargo region 574 of the longer replaceable tailcone 443 to successfully carry the 110 meter long payload 691. As shown, the forward end 691a of the payload 691 can be disposed at an extreme forward end of the continuous interior cargo bay 470 and the aft end 691b of the payload 691 can be disposed at an extreme aft end of the extended cargo region 574. The arrangement of the payload 691 in the extended cargo region 574 is shown more clearly in the detail views of FIGS. 6C and 6D, with the payload 691 extending out of the aft end 441 of the primary fuselage, under the horizontal stabilizer 451, and along substantially all of the length 73' of the extended cargo region 574.

Figure 7C:
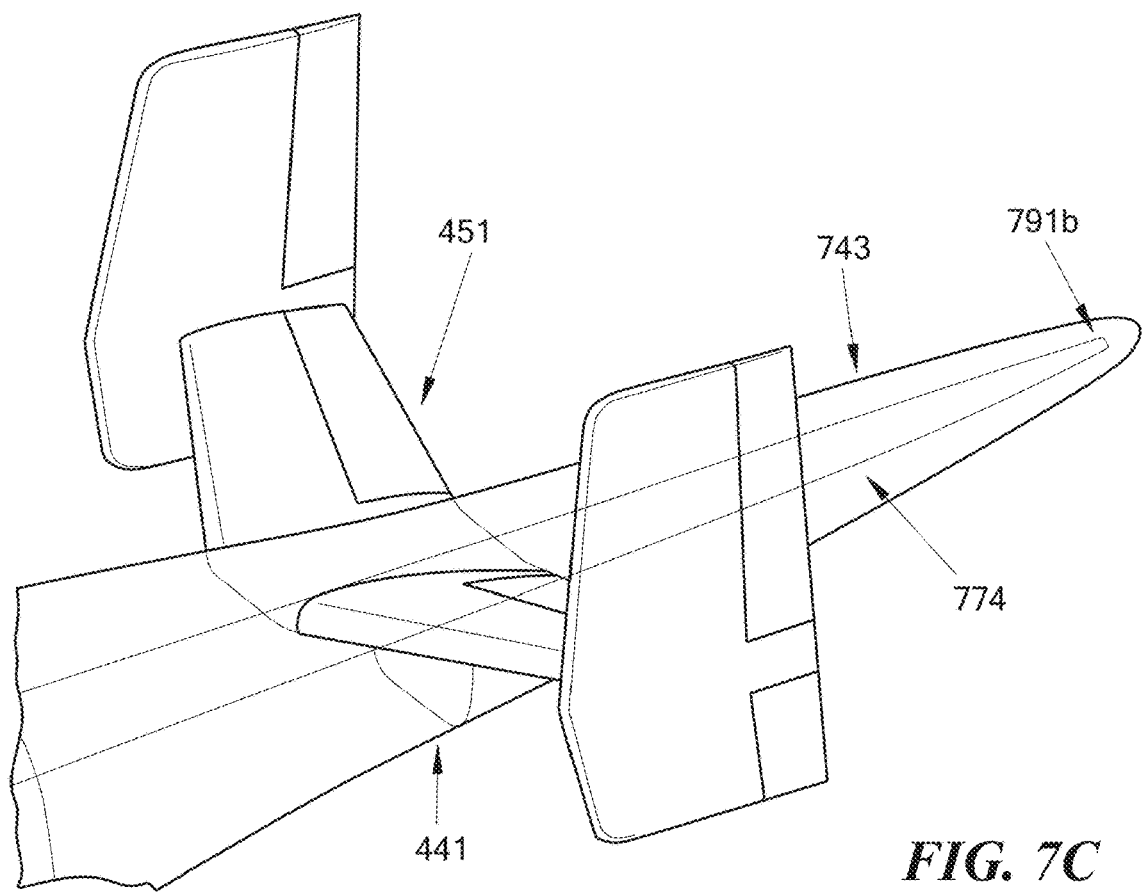
FIGS. 7C and 7D are isometric, transparent views of the aft end of the aircraft of FIG. 7A showing an aft end of the 120-meter wind turbine blade disposed in an interior cargo region of the longer extended tailcone.
Figure 7D:
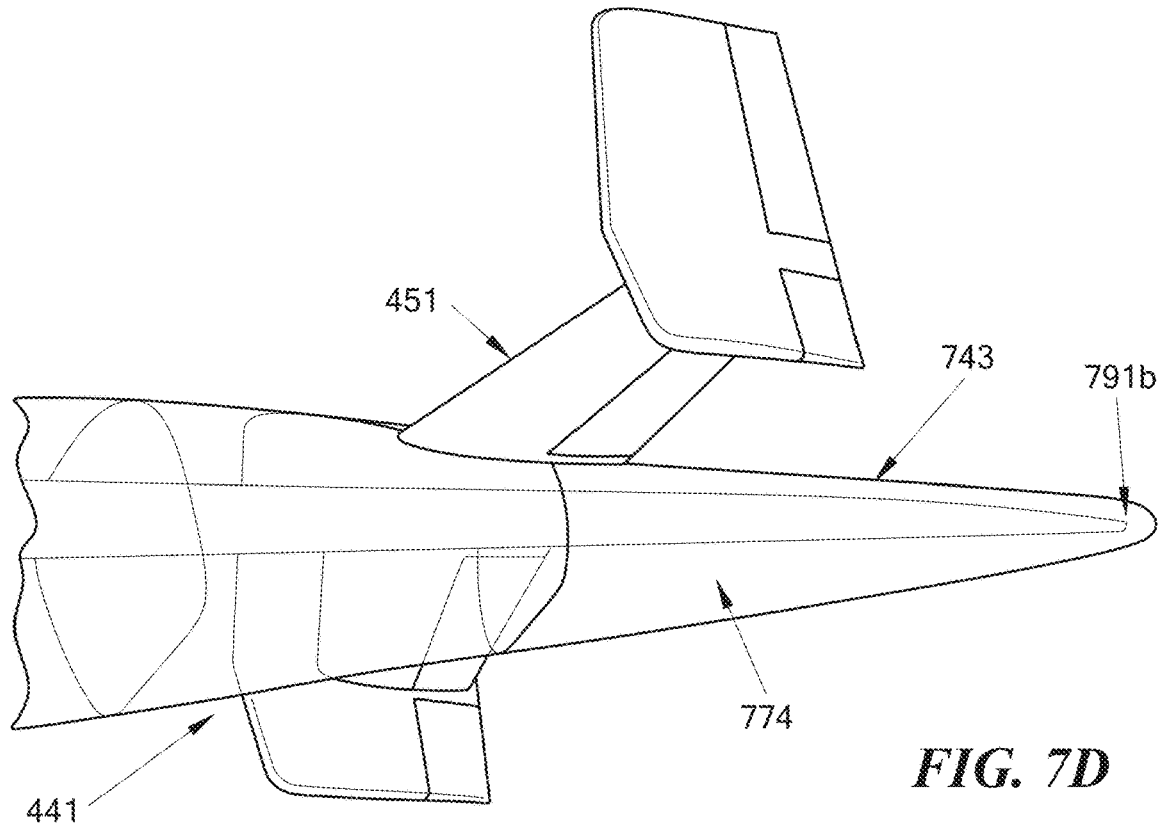
Figure 7E:
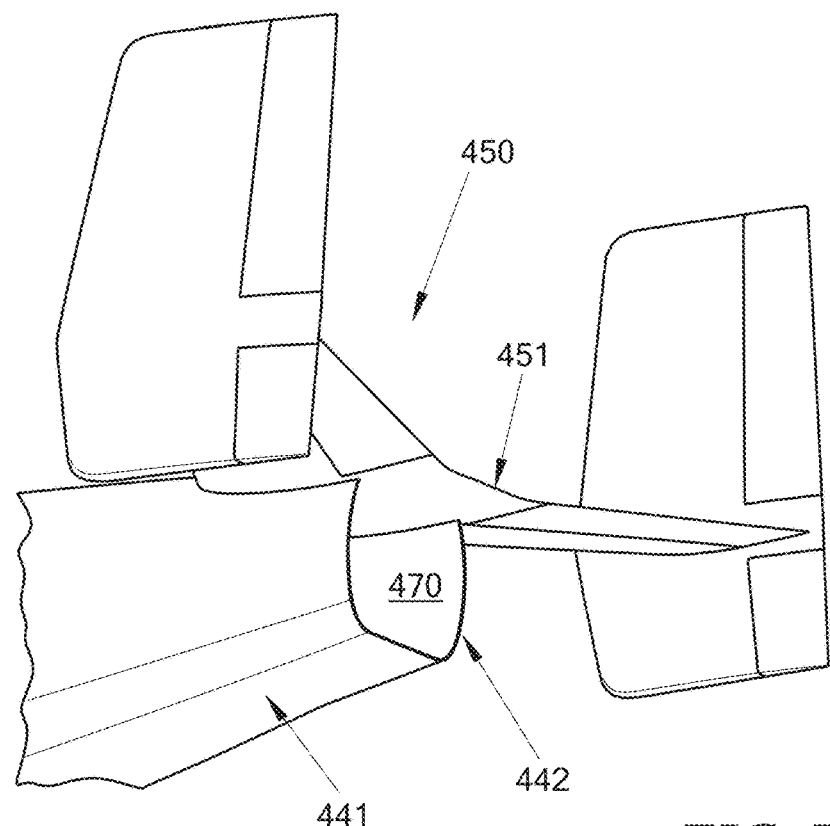
FIG. 7E is an isometric view of the aft end of the aircraft of FIG. 7A with the longer extended tailcone removed.
Figure 7F:
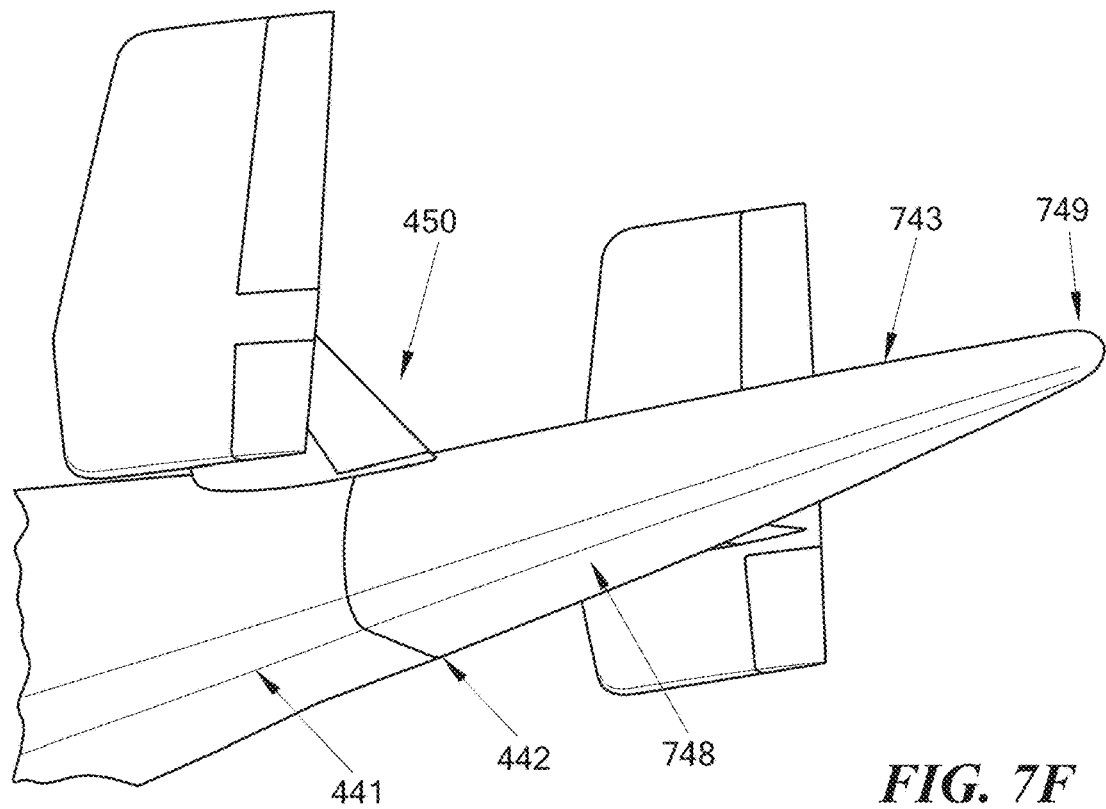
FIG. 7F is an isometric view of the aft end of the aircraft of FIG. 7A with the longer extended tailcone attached.
Figure 7G:
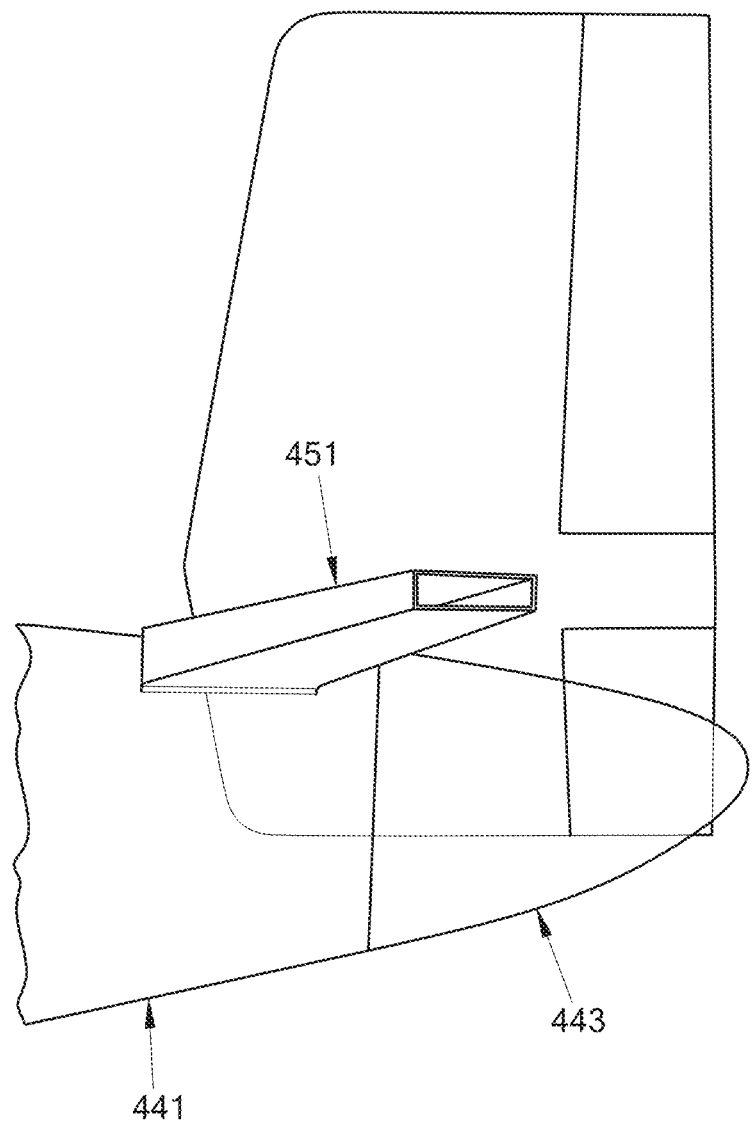
FIG. 7G is an isometric view of the aft end of the aircraft of FIG. 7A with a shorter tailcone attached.

Embodiments of the present disclosure include removable tailcones of various sizes and lengths such that, for most payloads, the shortest tailcone would be used. When extremely long cargo is being flown, tailcones of increasing length can be attached as needed. For example, FIGS. 7A and 7B show the aircraft 400 of FIG. 4 configured to carry a 120-meter long wind turbine blade 791 by replacing the longer removable tailcone 543 (not shown) with an extremely long removable tailcone 743. The extremely long removable tailcone 743 adds a length 73" of approximately 25 meters to the existing length 70 of 95 meters of the continuous interior cargo bay 470 to enable the 120-meter long wind turbine blade 791 to be carried by the aircraft 400. As shown, the root 791a of the wind turbine blade 791 can be disposed at an extreme forward end of the continuous interior cargo bay 470 and the tip 791b of the wind turbine blade 791 can be disposed at an extreme aft end of the extended cargo region 774. FIGS. 7C and 7D are isometric, transparent views of the aft end 441 of the aircraft 400, showing the aft end 791b of the 120-meter wind turbine blade disposed in the interior cargo region 774 of the longer extended tailcone 743. FIG. 7E is an isometric view of the aft end 441 of the aircraft 400 with the longer extended tailcone 443 removed and FIG. 7F is the same isometric view of the aircraft 400 with the longer extended tailcone 443 attached. FIG. 7G shows the aircraft 400 with the shorter replaceable tailcone 443 of FIG. 4 attached.

While the tailcones of FIGS. 4-7G are shown to be single structures, other designs are contemplated, such as tailcones constructed from a plurality of segments, where different combinations of segments can be used to adjust the extension to the cargo bay provided by the tailcone, as well as extending tailcones that can be retracted into the primary fuselage 401 and extended aft-ward only as much as needed based on the payload to be carried. Additionally, embodiments of the tailcones shown and discussed herein illustrate the individual tailcones or aircraft suitable for coupling with individual tailcones, examples of the present disclosure also include groups or kits of one or more replaceable tailcones and, in some instances, any and all additional tools or coupling mechanisms for use in removing and replacing a tailcone with another tailcone. Any exemplary kit includes a plurality of tailcones of differing lengths, such as the tailcones of FIGS. 4, 6A, and 7A, along with the associated tools necessary to remove and replace of the tailcones with another of the kit. The tailcones and associated tools and hardware can be provided as a kit with different sizes, shapes, configurations that may or may not be specifically tailored for specific uses and/or for specific aircrafts can be provided.

Segmented and Extendable Tailcones

Figure 8A:
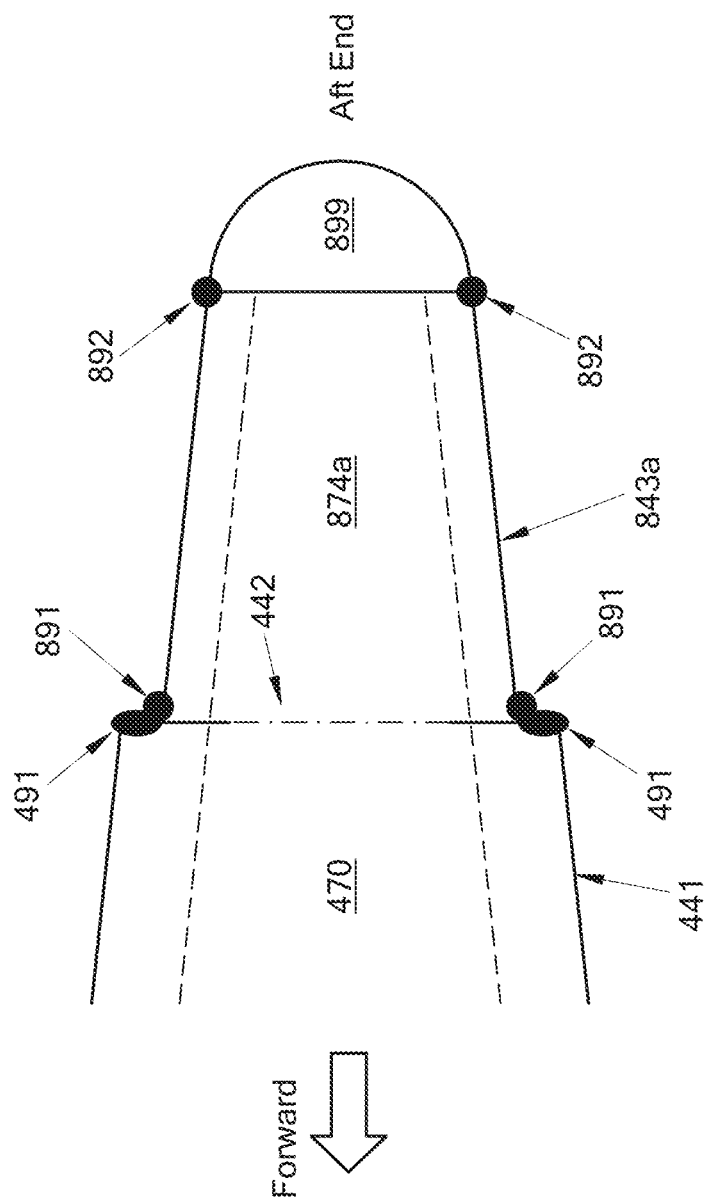
FIG. 8A is a cross-sectional schematic of a segmented tailcone with a first segment attached to an aft end of an aircraft fuselage to form an extension of an interior cargo bay.
Figure 8B:
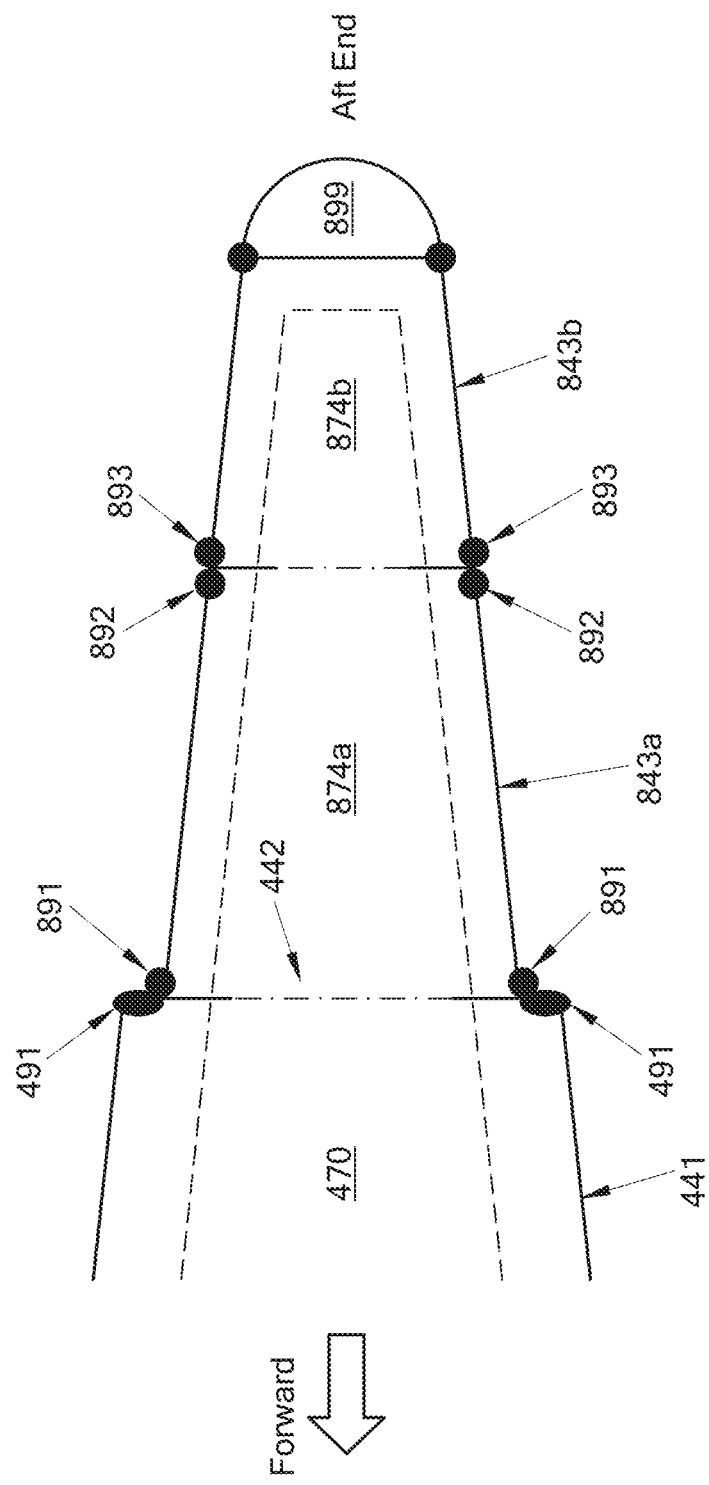
FIG. 8B is a cross-sectional schematic of the segmented tailcone of FIG. 8A with a second segment attached to the first segment to extend the length of the extension of the interior cargo bay.

In some embodiments, a removable tailcone is made from several stackable sections that allow for varying the tailcone length depending on which pieces are mounted. For examples, FIG. 8A shows a cross-sectional schematic of a segmented tailcone with a first segment 843a attached to the aft end 441 of the primary fuselage 401 to form a first extension 874a of the interior cargo bay 470. In this embodiment, a forward end of the first segment 843a can include a coupler 891 configured to mate with a corresponding coupler 491 disposed about the aft opening 442 into the aft end 441 of the primary fuselage 401. The mating between the coupler 891 and the corresponding coupler 491 can be configured to allow a plurality of different tailcones to be attached, for example the tailcones 443, 543, 743 shown in FIGS. 4-7B, as well as the first segment 843a. The couplers 891, 491 can be of the same types as those discussed above with respect to coupling mechanisms between the tailcone and fuselage in FIG. 5A. In some instances, the aft end first segment 843a can be closed and, in other instances, such as the illustrated embodiment, the aft end of the first segment 843a can be open. In some embodiments a second corresponding coupler 892 can be provided to attach a tail end cap 899 to close the aft end of the first segment 843a (as shown) or, alternatively, to attach a second segment 843b via a second coupler 893 to further extend the interior cargo bay 470 into a second extension 874b beyond the first extension 874a, as shown in FIG. 8B. Accordingly, a number of different tailcone attunements are contemplated, with many possible different segmented arrangements. For examples, the segments can be longitudinal segments (as opposed to the lateral segments shown in FIGS. 8A and 8B) and can have different shapes and sizes to, for example, better contain a desired payload shape or length.

Figure 9A:
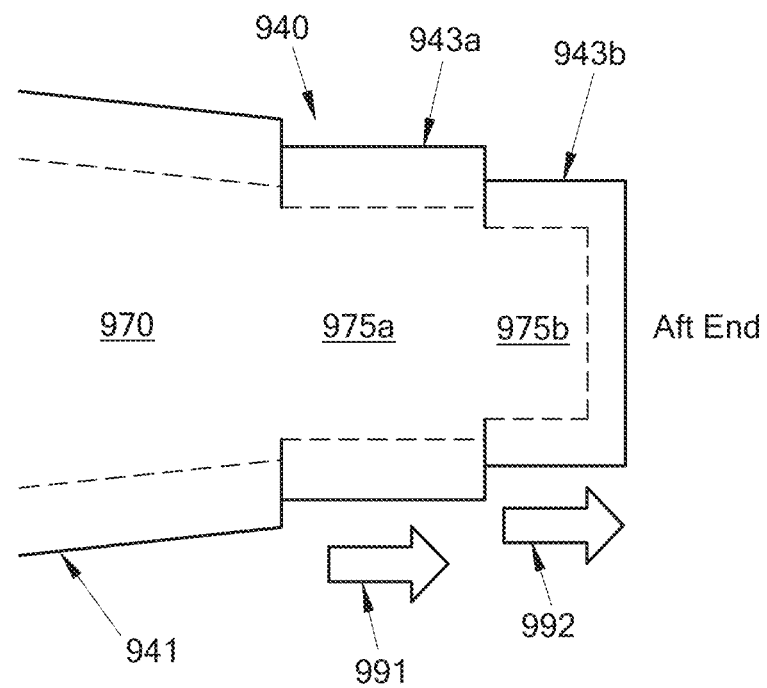
FIG. 9A is a cross-sectional schematic of an aft end of an aircraft having an extending tailcone in a retracted position and forming an extension of an interior cargo bay of a first length.
Figure 9B:
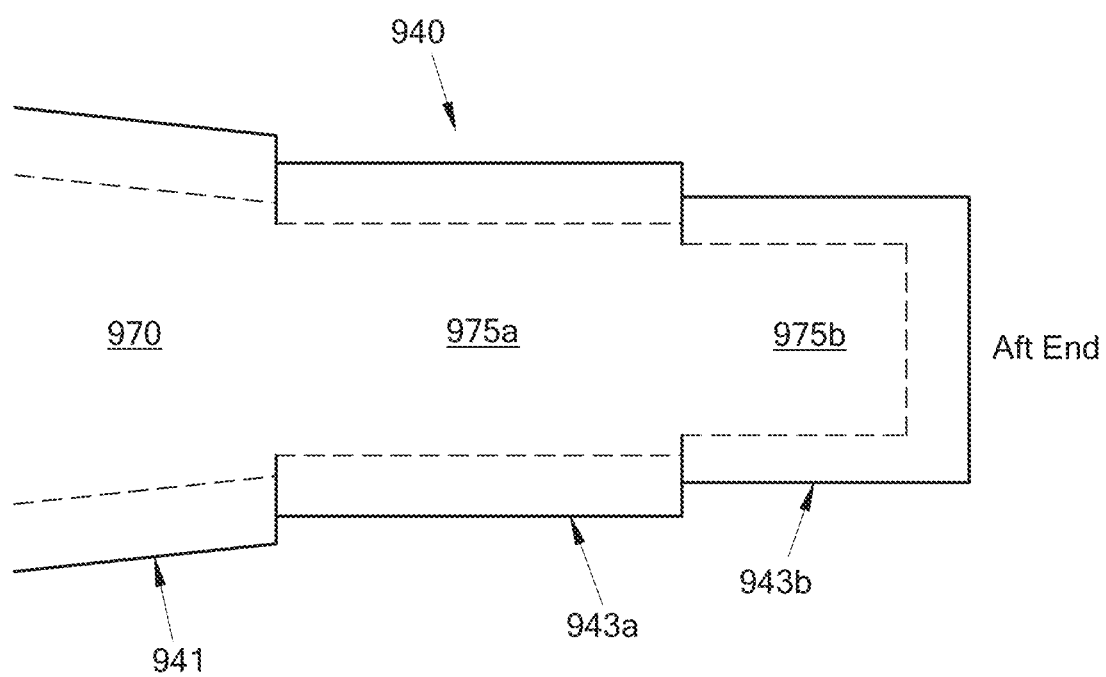
FIG. 9B is a cross-sectional schematic of the extending tailcone of FIG. 9A in an extended position forming an extension of the interior cargo bay of a second length that is longer than the first length.

Still other adjustable arrangements are considered within the scope of the present disclosure, such as tailcones with built-in length adjustment to accommodate various payload lengths. In operation, for example, when a cargo does not extend beyond aft end of the primary fuselage, an extending tailcone would be arranged in a most compact configuration, and for any payload with longer lengths, the tailcone can be extended as required. One such example of these embodiments is shown by the telescopically extending tailcone system 940 shown in FIGS. 9A and 9B. FIG. 9A shows the telescopically extending tailcone system 940 in a retracted configuration, with a first telescopic segment 943a partially disposed inside the aft end 941 of an aircraft (such as the aircraft 400 of FIG. 4) and a second telescopic segment 943b partially disposed in the first segment 943a. The first and second segments 943a,b each have an interior cargo extension region 975a,b that forms an aft extension of a cargo bay 970 in the aft end 941 of the aircraft. In operation, each of the first and second segments 943a,b can independently move with respect to each other and to the aft end 941 to adjust the resultant overall length of the aft extension. FIG. 9A shows the first segment 943a moving (as indicated by arrow 991) aftward to extend the first cargo extension region 975a and the second segment 943b also moving (as indicated by arrow 992) aftward to extend the second cargo extension region 975b. FIG. 9B shows the first and second segments 943a,b in their maximally extended positions, which results in the extended interior cargo extension regions 975a,b forming a maximum aft extension to the interior cargo bay 970.

While the removable and replaceable tailcones disclosed herein have been shown and discussed in the context of an extremely large cargo aircraft having a continuous interior cargo bay that spans substantially all of the length of the aircraft, ones skilled in the art will understand that embodiments of the present disclosure are equally applicable to many other types of aircraft. For example, aircraft with aft cargo bays that can be extended into the tailcone, as well as aircraft without aft cargo bays that can have additional cargo storage added by adding a cargo region inside a removable tailcone. Additionally, while examples shown herein have presented the extended cargo region in the tailcone as being an opening region, it can alternatively contain structures or functional equipment (e.g., radar, telescopes, auxiliary power unit, navigation and communication equipment) that can be swapped onto the aircraft as necessary, which may include the use of a communication interface and/or a power interface where the tailcone couples to the fuselage in order to facilitate the operation of any equipment contained therein. Other uses are contemplated as well, such as an exterior fixture for enabling or facilitating the carrying of external cargo, a landing assistance device (e.g., parachute or retrorocket), a takeoff assistance device (e.g., a solid rocket engine), or one or more sensors (e.g., to detect the distance from the tailcone's exterior to the ground to assistance in the avoidance of a tailstrike during a takeoff or landing maneuver). It is also contemplated that the remove tailcone may have one or more exterior control surfaces or internal control device (e.g., gyroscopes). Additionally, as explained in more detail below, it is also contemplated that the interior of the tailcones may be one or more features to assist in the loading, unloading, or carrying of payloads during flight (e.g., fixtures and/or rails) that can be incorporated with similar structures existing within the primary fuselage.

Rails and Payload-Receiving Fixtures

Figure 10A:
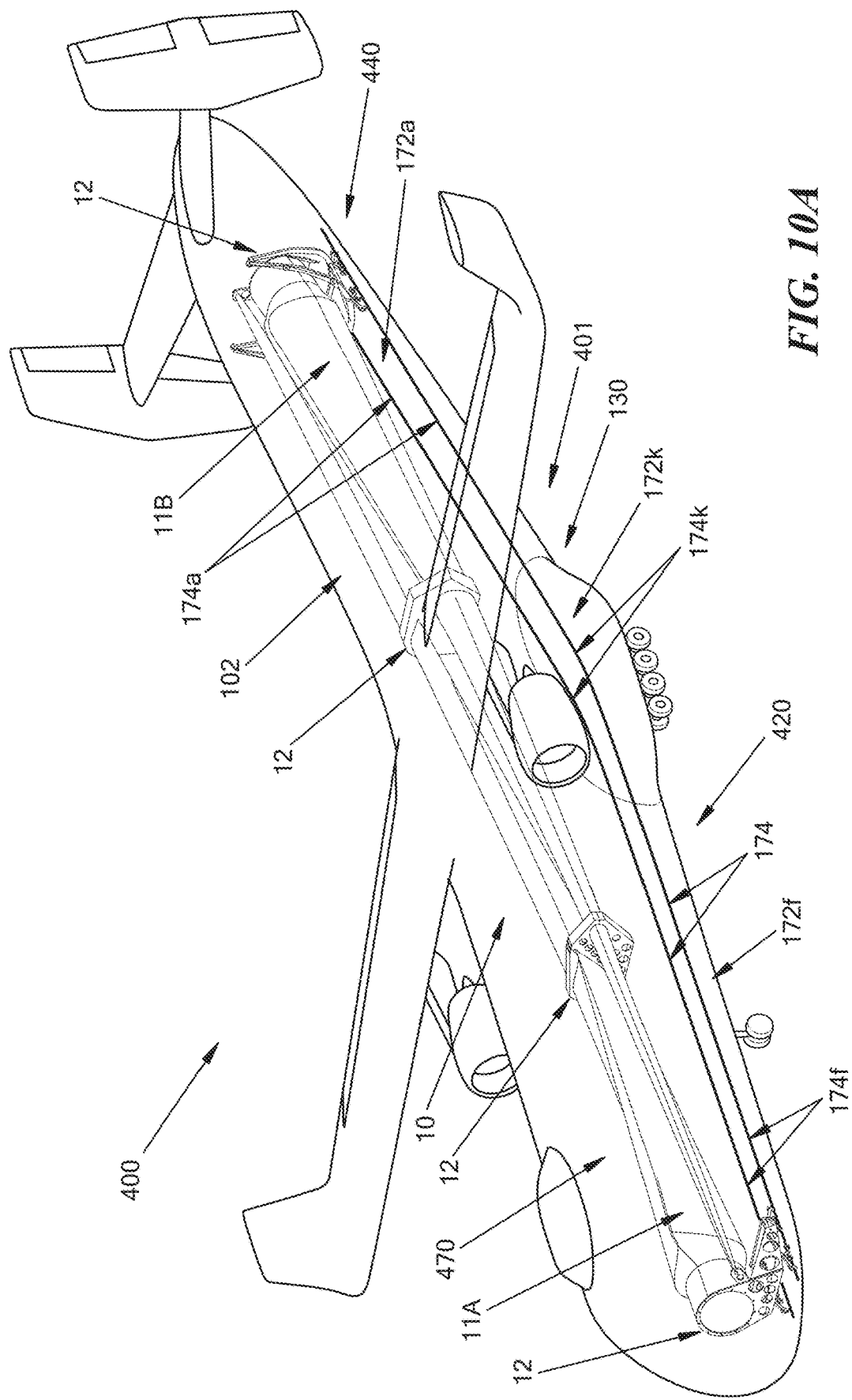
FIG. 10A is an isometric, transparent view of the aircraft of FIG. 4 having a payload disposed therein.
Figure 10B:
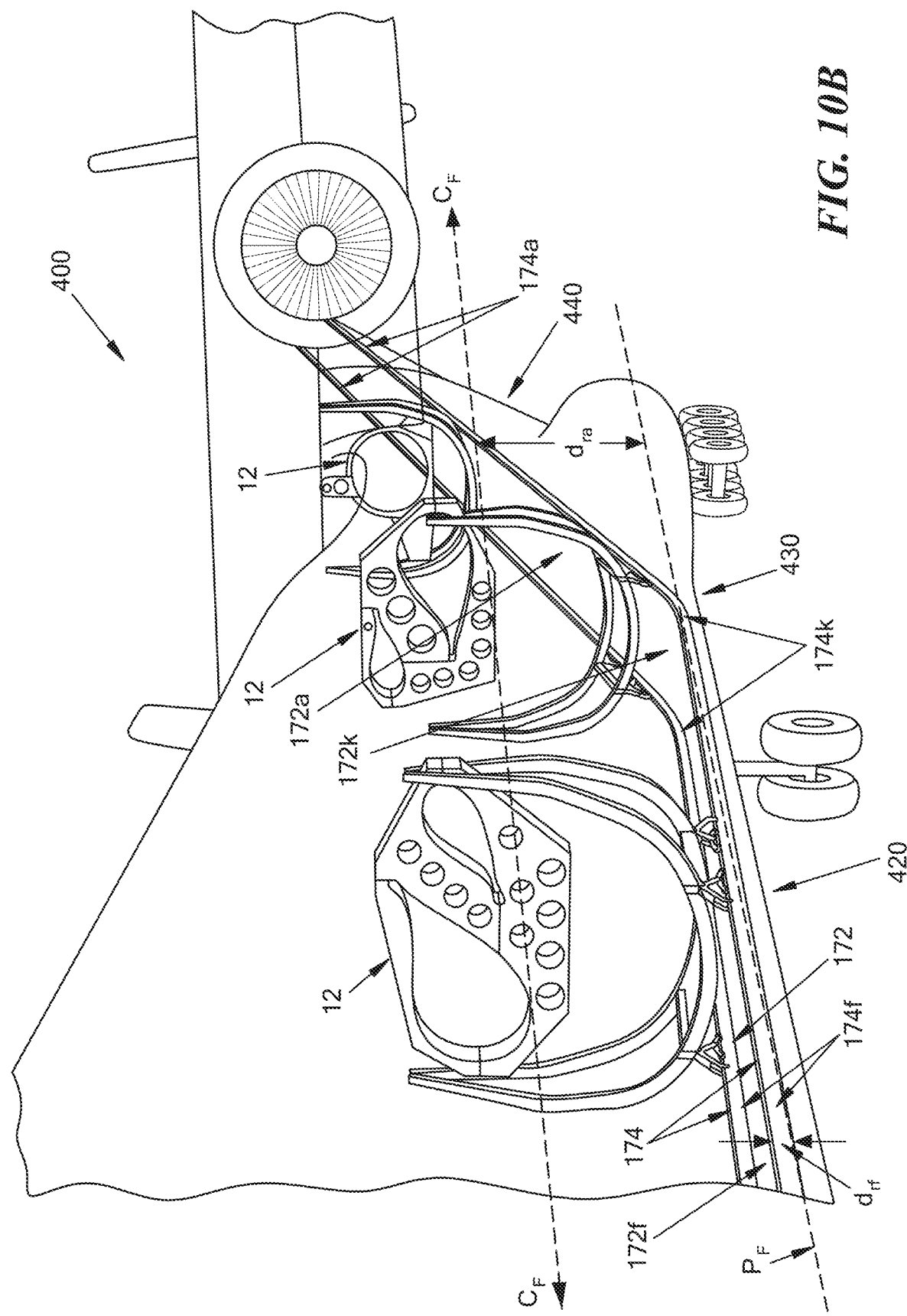
FIG. 10B is a detailed, front-side isometric, transparent view of the aircraft of FIG. 10A with wind turbine blades of the payload hidden from view to better illustrate a pair of rails disposed in the interior cargo bay and exemplary payload-receiving fixtures for holding the wind turbine blades coupled to the rails.
Figure 10C:
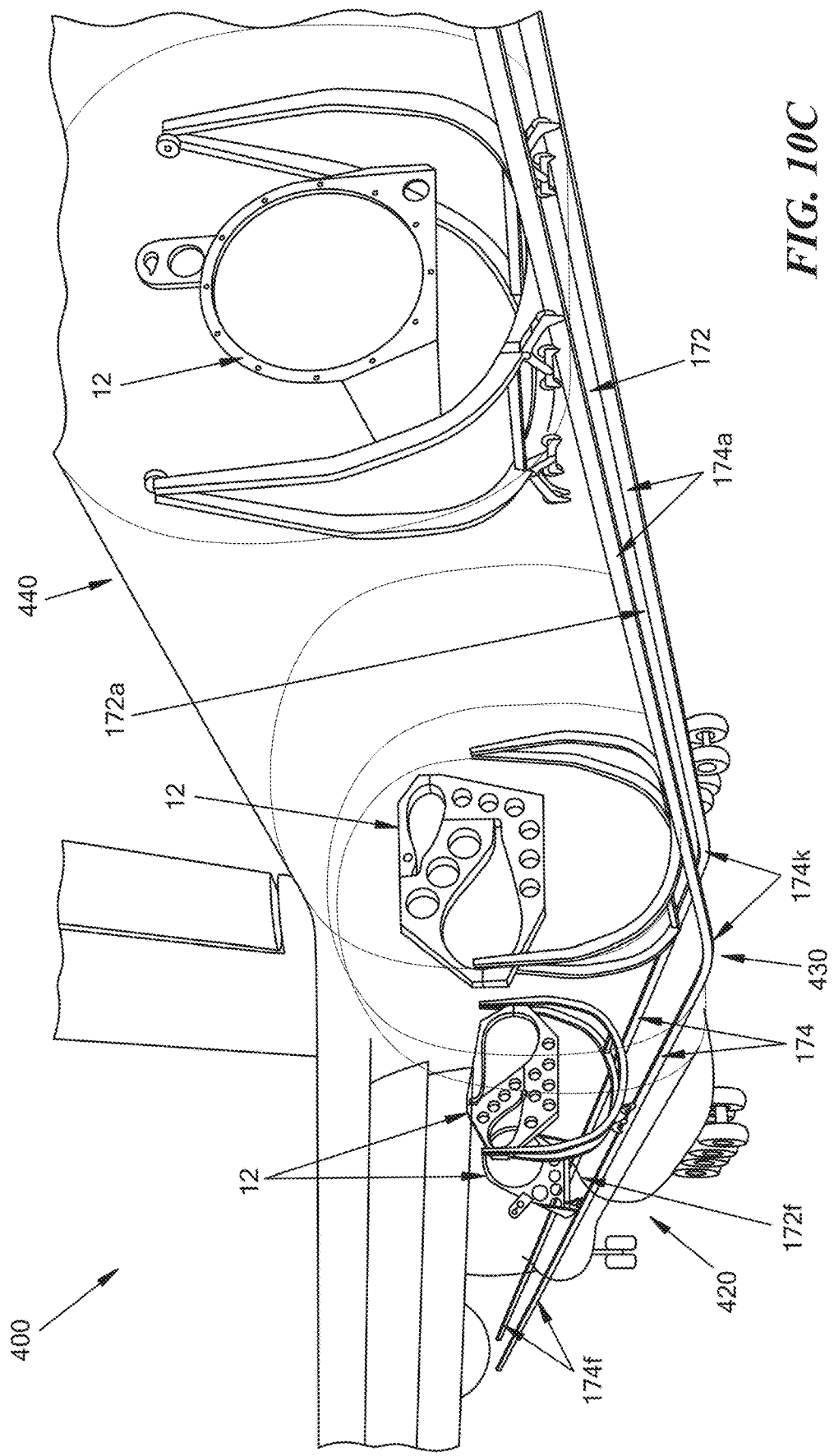
FIG. 10C is a detailed, back-side isometric, transparent view of the aircraft of FIG. 10B.

Hidden from view in the previous figures of the aircraft 100, but illustrated in FIGS. 10A-10C are a pair of rails 174 coupled to, extending from, or otherwise associated with the floor 172 of the cargo bay 470. Some of the illustrations may look incomplete or incompatible with other figures, such as having rails extending beyond what looks like the terminal end of a fixed portion of the fuselage (see, e.g., FIG. 10C as filed), but a person skilled in the art will recognize this is just the result of complications that can arise while drawing and viewing components using solid models and is not indicative of an incomplete, incompatible, or inoperable aspect of the aircraft and/or related components. A person skilled in the art, in view of the present disclosures, will understand how such components should be illustrated in view of the present disclosures and other figures. Embodiments of the rails and fixtures disclosed herein can be used to dispose an end of a payload into a cargo bay region of a tailcone. In some embodiments, the tailcone includes a rail system configured to form an extension of the rail system in the fuselage 401. In some embodiments, the tailcone includes features configured to secure the end of the payload during flight.

Much like the bay 470 and the floor 172, the rails 174 can extend in a continuous manner from the forward end 420, through a kinked portion 430, and into the aft end 440. The rails 174 can thus be configured to have a forward end 174f, a kinked portion 174k, and an aft end 174a. As a result of the kinked portion 174k, a vertical distance $d_{ra}$ between the aft end 174a and a plane $P_F$ defined by an interior bottom contact surface of the interior cargo bay 170 in the forward end 420 of the aircraft 100, i.e., the plane $P_F$ extending longitudinally and laterally through the forward end 172f of the floor 172 and that is substantially parallel to the forward centerline $C_F$, is greater than a vertical distance $d_{rf}$ between at least a portion of the forward end 174f and the plane $P_F$. Further, in some embodiments in which the aft end 440 extends above a plane extending substantially through an entirety of the top surface 102 of the forward end 420 of the fuselage 101 such that the plane is substantially parallel to ground, because the rails 174 can extend towards and into the fuselage tailcone 142, a portion of at least one of the rails 174, as shown both rails 174, disposed in the aft bay portion 172a can also be located above the plane extending substantially through an entirety of the top surface 102 of the forward end 420 of the fuselage 401. The angle at which the rails 174 are disposed in the aft bay portion 170a can be akin to a kink angle $\alpha_{100K}$ of the fuselage. More generally, the rails 174 can extend in a manner such that a majority of it disposed in the aft bay portion 170a is disposed at the kink angle. As shown, there are two rails 174 that are substantially parallel to each other across their length, but in other embodiments there can be fewer (e.g., one rail) or more rails and the rails can extend in non-parallel manner, such as having them angle closer together or further apart slightly as they extend towards the aft end 140 to create a desired stopping location that works with fixtures loaded onto the rails 174. In some embodiments, the rail(s) 174 can serve as a primary structural member(s) or beam(s) of the fuselage 401, capable of bearing operational flight and/or ground loads, akin to a keel beam in some aircraft.

A payload, such as the payload 10, can be translated along the rails 174 from the forward end 174f and towards the aft end 174a until the payload reaches a desired location. That desired location can relate, for example, to placing a center of gravity of the payload within a desired range of a center of gravity of the aircraft. Translation of the payload can be aided by the fixtures 12 illustrated in FIGS. 10A-10C. The fixtures 12 can have a variety of configurations that are configured to both receive a payload, such as wind turbine blades 11A, 11B (of fewer or more blades as desired) and translate along the rails 174 to place the payload at the desired location(s).

A person skilled in the art will recognize other carriages, frames, and receivers that can be used in conjunction with the present disclosures. Further, while payload-receiving fixtures are referred to herein using reference numeral 12, in some embodiments, a payload-receiving fixture may just be a receiver, and thus such usage of the term "payload-receiving fixture" herein, including in the claims, can be directed to just a receiver as provided for herein. Generally, that term in any claim should be read in that manner, unless such interpretation would be incompatible with the remaining portion of the claim, for example, if the claim separately recites a receiver.

Additional details about tooling for cargo management, including rails and payload-receiving fixtures and fuselage configuration for enabling loading and unloading of payloads into aft regions of a continuous interior cargo bay may be provided in International Patent Application No. PCT/US2020/049784, entitled "SYSTEMS AND METHODS FOR LOADING AND UNLOADING A CARGO AIRCRAFT," and filed Sep. 8, 2020, and the content of which is incorporated by reference herein in its entirety.

Removing and Replacing Tailcones

Figure 11A:
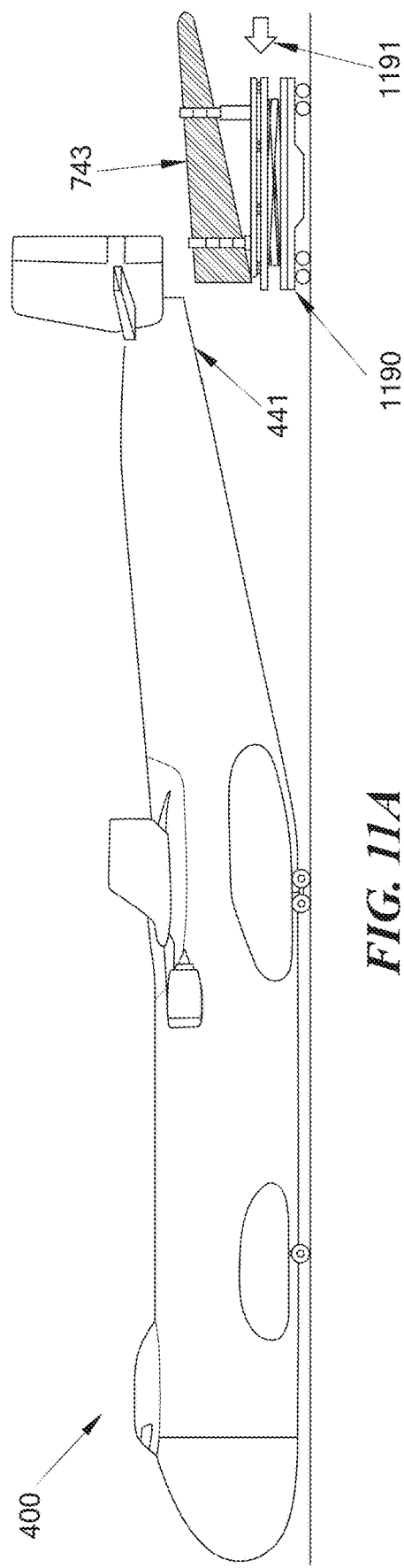
FIGS. 11A-D are illustrations of an example method of attaching a tailcone to a fuselage.
Figure 11B:
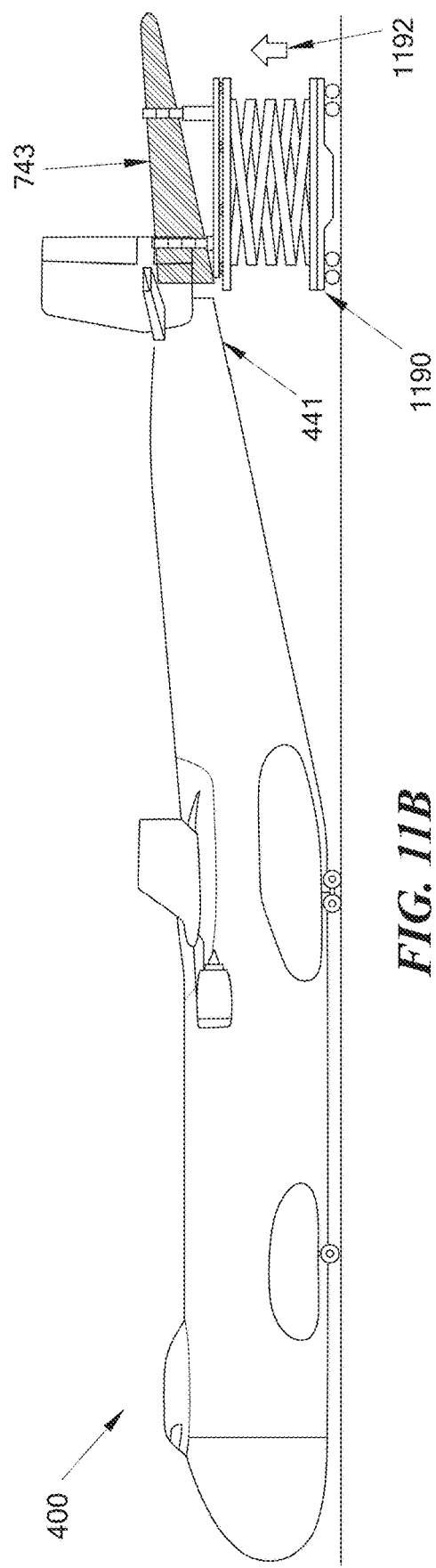
Figure 11C:
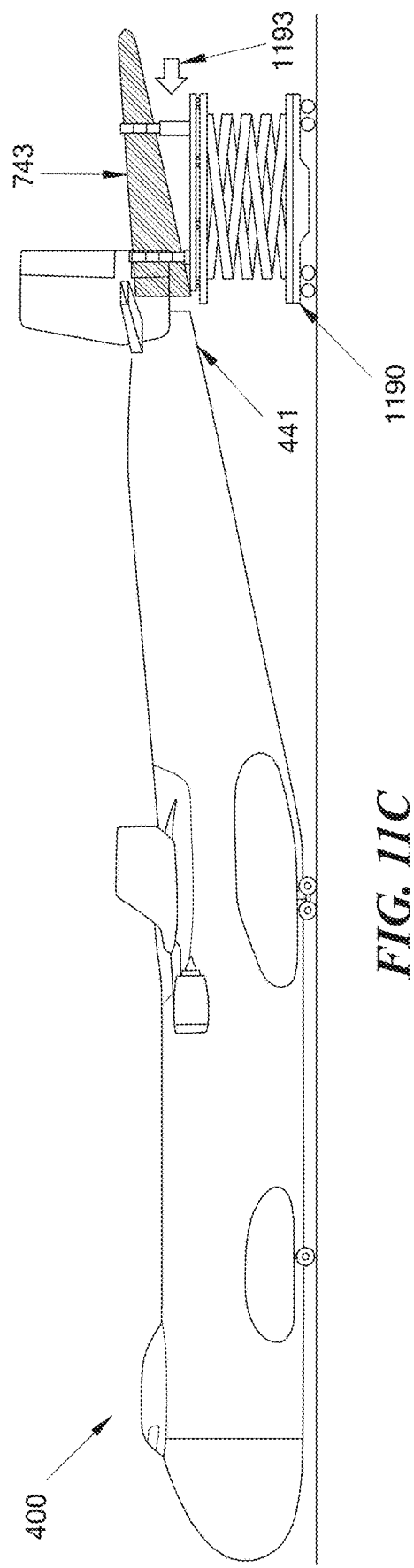
Figure 11D:
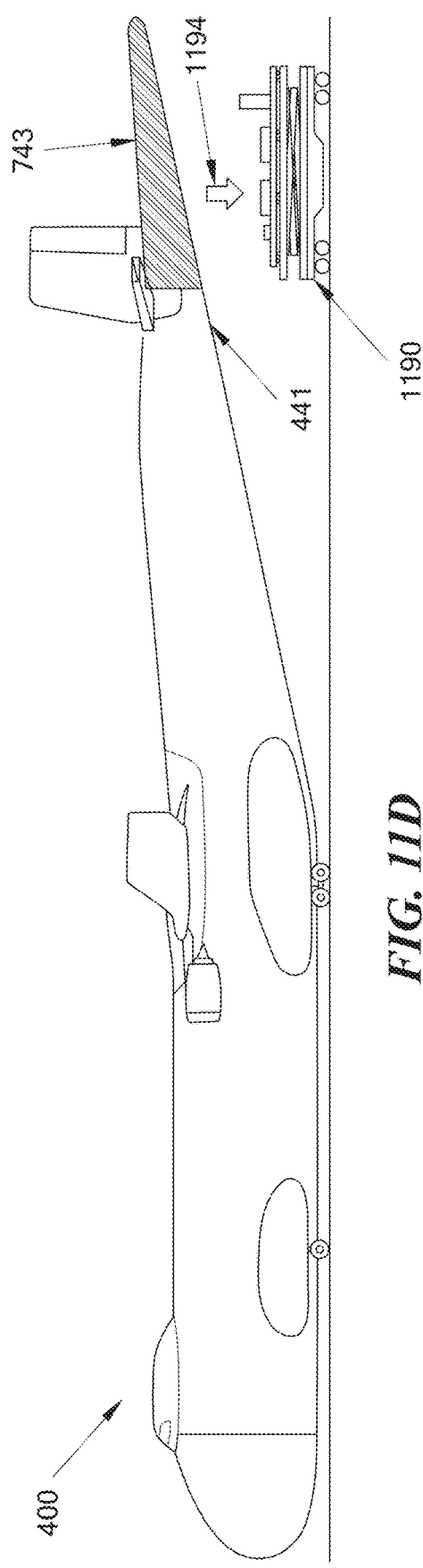

The replaceable tailcones of the present disclosure can be removed and attached to an aircraft fuselage in a variety of ways. FIGS. 11A-14D provide a few examples of type of process and equipment that can be used to facilitate the removeable and replaceable aspects of the present tailcones. FIGS. 11A-D show an example method of attaching a tailcone to a fuselage that starts, as shown in FIG. 11A, with the aircraft 400 parked on the ground with no tailcone attached, which could be the state of the aircraft 400 immediately after the removal of a previously attached tailcone or during an initial construction of the aircraft 400. At the aft end of the aircraft 400, an extended tailcone 743 is held on top of a lifting device 1190 (e.g., a scissor jack or similar) that is moved (as indicated by arrow 1191) into position to place the extended tailcone 743 below the aft end 441 of the aircraft 400. Next, as shown in FIG. 11B, the lifting device 1190 raises (as indicated by arrow 1192) the extended tailcone 743 until the extended tailcone 743 is level and aligned with the opening in the aft end 441, at which point, as shown in FIG. 11C, the lifting device 1190 moves (as indicated by arrow 1193) the extended tailcone 743 against the aft end 441, where coupling of the extended tailcone 743 to the aircraft 400 can take place. Finally, with the extended tailcone 743 attached, the lifting device 1190 is lowered, leaving the extended tailcone 743 supported by the aircraft 400.

FIGS. 12A-D are illustrations of an alternative example method of attaching the extended tailcone 743 to the aircraft 400 without the use of an external lifting mechanism. In FIG. 12A, the extended tailcone 743 is brought to the aft end 441 of the aircraft on a sliding platform 1290 (as indicated by arrow 1291), whereafter, as shown in FIG. 12B, a cable is connected between the aft end 441 and the forward end of the extended tailcone 743 and the cable proceeds to lift (as indicated by arrow 1292) the forward end of the extended tailcone 743, which may also slide the platform 1290 forward (as indicated by arrow 1293) or the extended tailcone 743 may be allowed to translate horizontally. In FIG. 12C, the extended tailcone 743 is lifted by cable up until a pivot mechanism (e.g., one or more hooks) engages rollers on lower edge of the aft end 441, creating a hinge to allow further pulling from the cable to raise (as indicated by arrow 1294) the aft end of the extended tailcone 743. Once raised, locking of the extended tailcone 743 to the aircraft 400, as shown in FIG. 12D can occur. In some instances, an internal locking sequence may be conducted at this point as well, depending on the method of coupling the extended tailcone 743 to the aircraft 400.

Figure 13A:
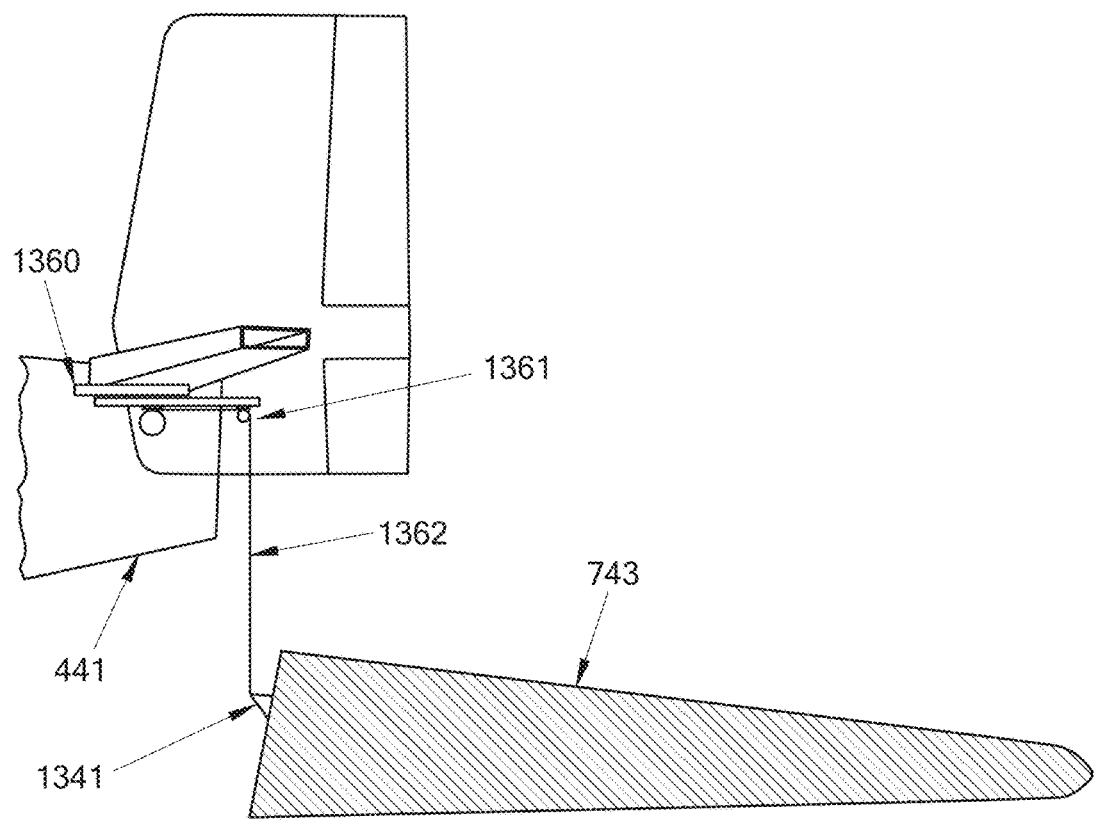
FIGS. 13A-D are illustrations of an example lifting system being used to attach a tailcone to a fuselage.
Figure 13B:
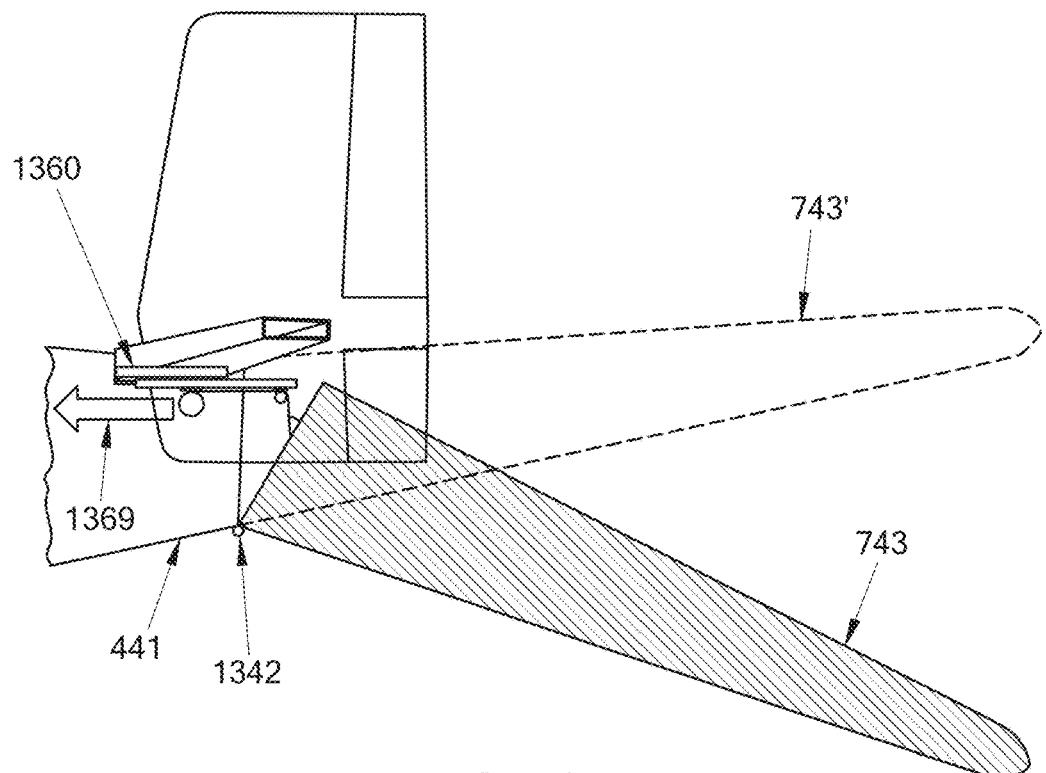
Figure 13C:
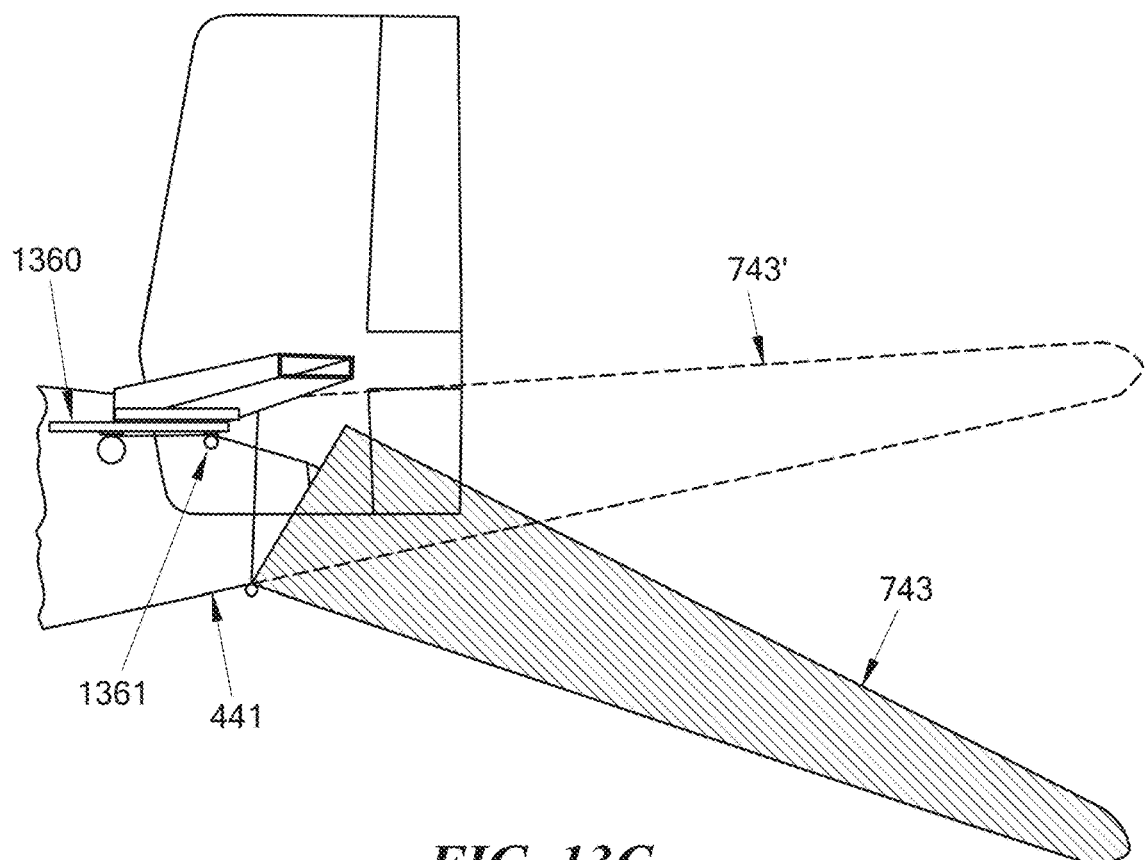
Figure 13D:
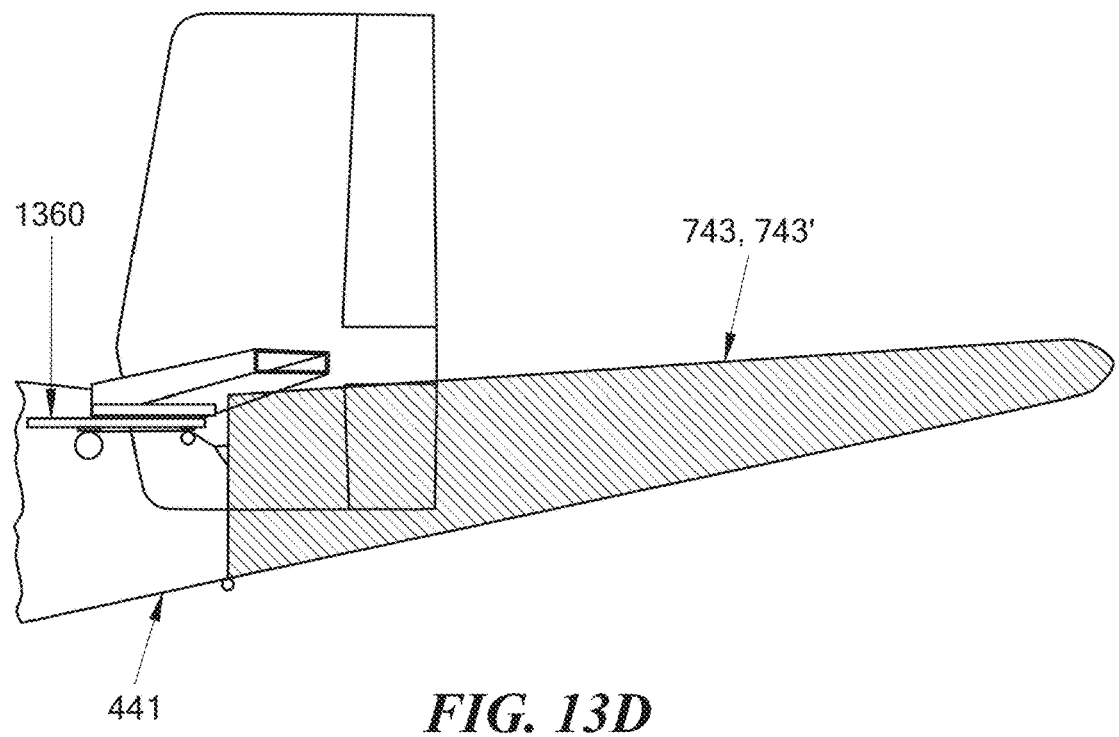
Figure 13E:
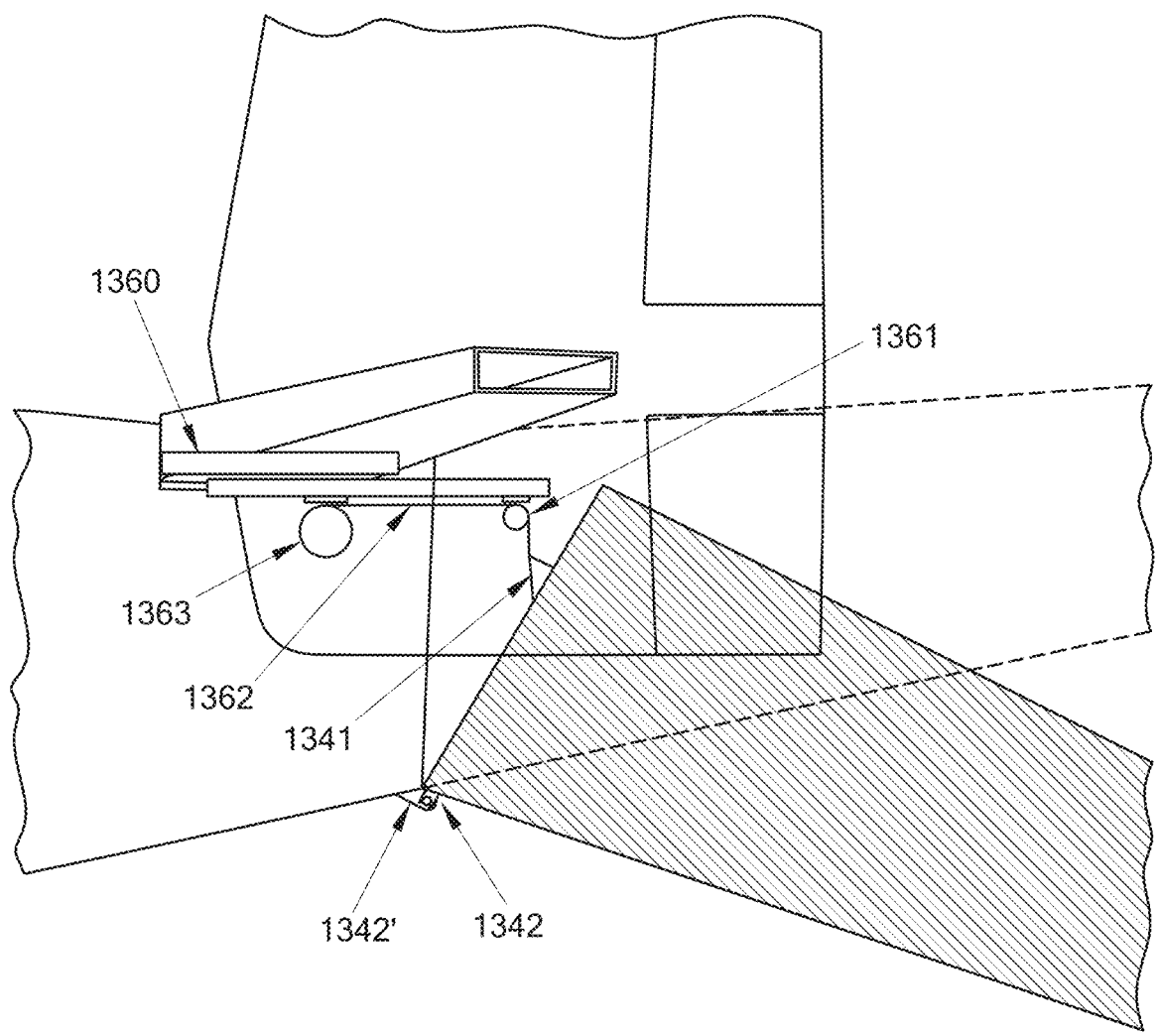
FIG. 13E is a detailed view illustration of the lifting mechanism used in FIGS. 13A-D.

FIGS. 13A-D are illustrations of an example lifting system 1360 being used to attach the extended tailcone 743 to the aft end 441 of the fuselage according to the illustrations of FIG. 12-A-D. FIG. 13A shows the lifting system 1360 includes an extendible pully 1361 that is extended from the aft opening in order to pull on a cable 1362 that is coupled to an anchor 1341 on the forward end of the extended tailcone 743 without risking the extended tailcone 743 striking the aircraft 400 as it pivots during the lift. In FIG. 13B, the forward end of the extended tailcone 743 is fully lifted and a pivot point is created about the lower side of the forward of the extended tailcone 743 by coupling a pivot element 1342 of the extended tailcone 743 to a positioned below the opening in the aft end 441. Once coupled, the extendible pully 1361 is retracted (as indicated by arrow 1369) into the aft end 441 of the aircraft 400 to allow the lifting system 1360 to use the pully from a more forward location (as shown in FIG. 13C) to raise the aft end of the extended tailcone 743 to the desired position 743'. In FIG. 13D, the lifting system 1360 has fully raised the aft end of the extended tailcone 743 and the extended tailcone 743 is in position to be secured to the aft end 441 of the aircraft 400. FIG. 13E is a detailed view of the lifting system 1360 in the arrangement of FIG. 13B, showing a motor 1363 of the lifting system arranged to tension the cable 1362 that passes over the extendible pully 1361 and is coupled to the anchor 1341 of the extended tailcone 743. FIG. 13E also shows the pivot arrangement in more detail, where the pivot element 1342 of the extended tailcone 743 is rotatably engaged with a roller 1342 to allow the tension of the cable 1362 provided by the motor 1362 to raise the aft end of the extended tailcone 743.

Figure 14A:
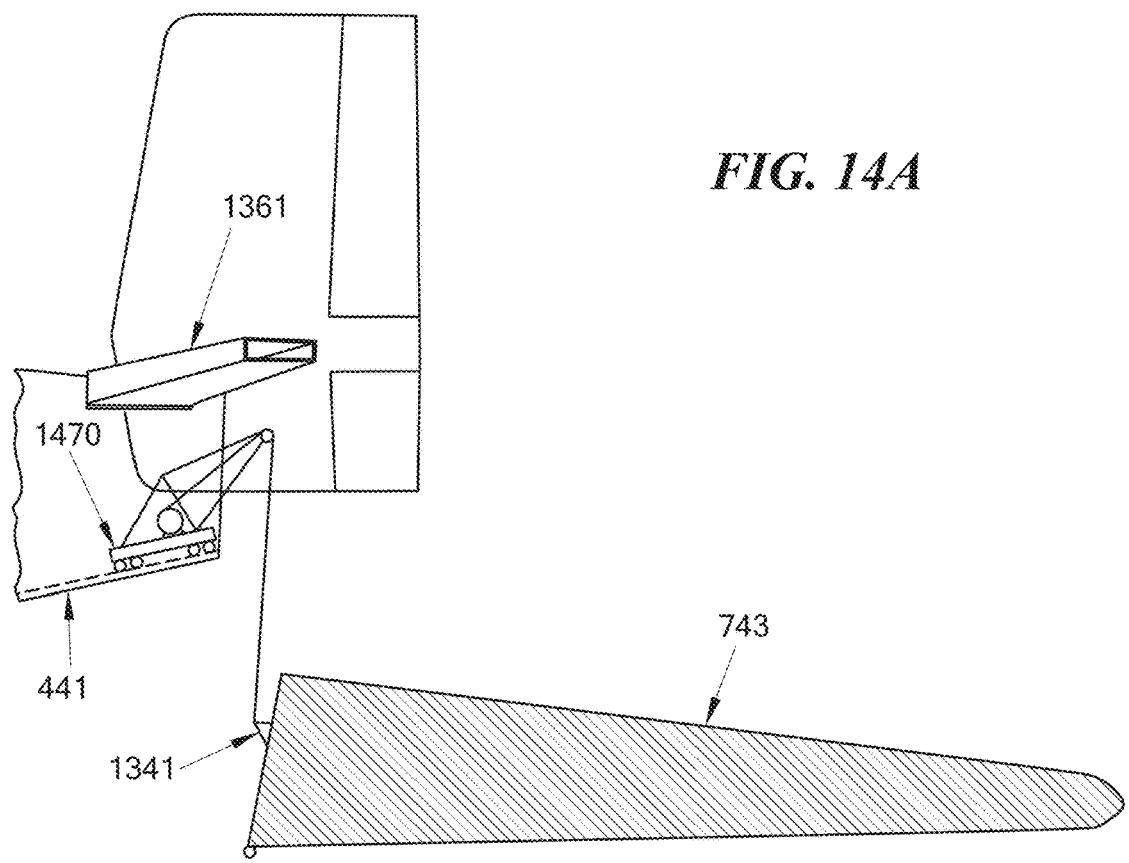
FIGS. 14A-D are illustrations of an alternative example lifting system being used to attach a tailcone to a fuselage.
Figure 14B:
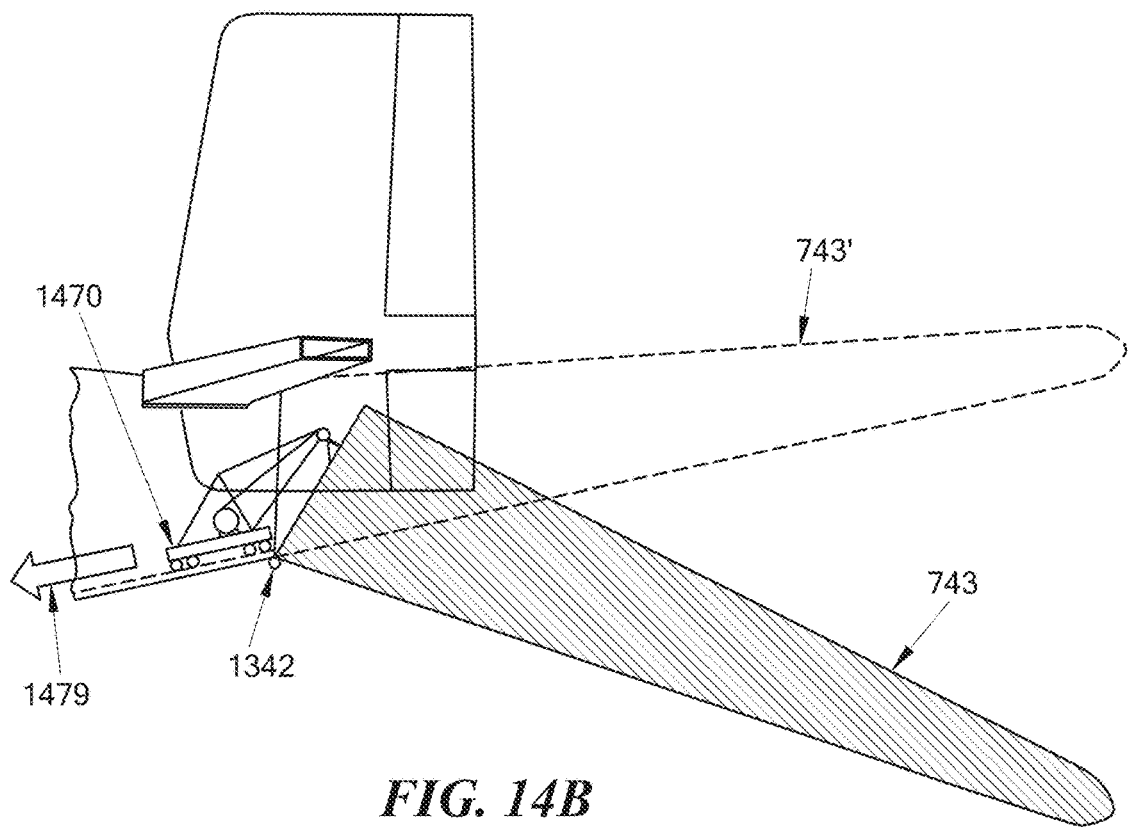
Figure 14C:
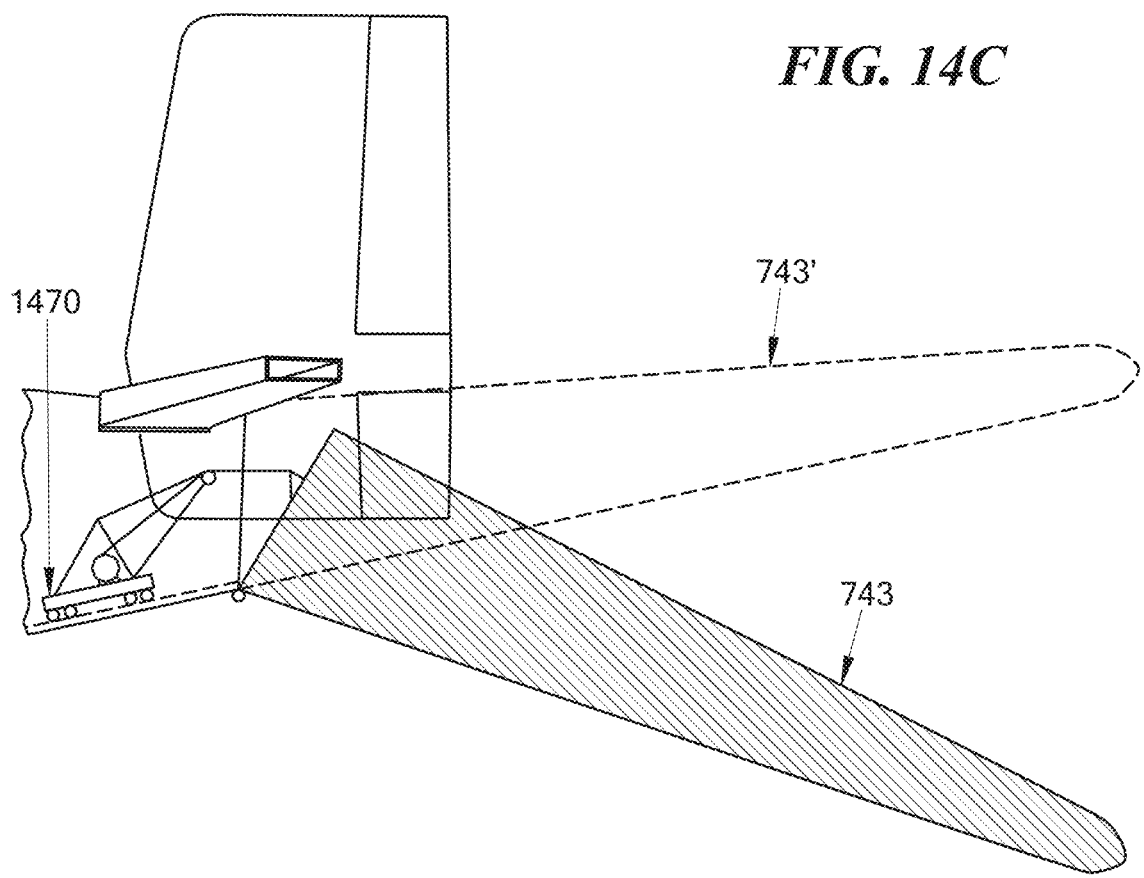
Figure 14D:
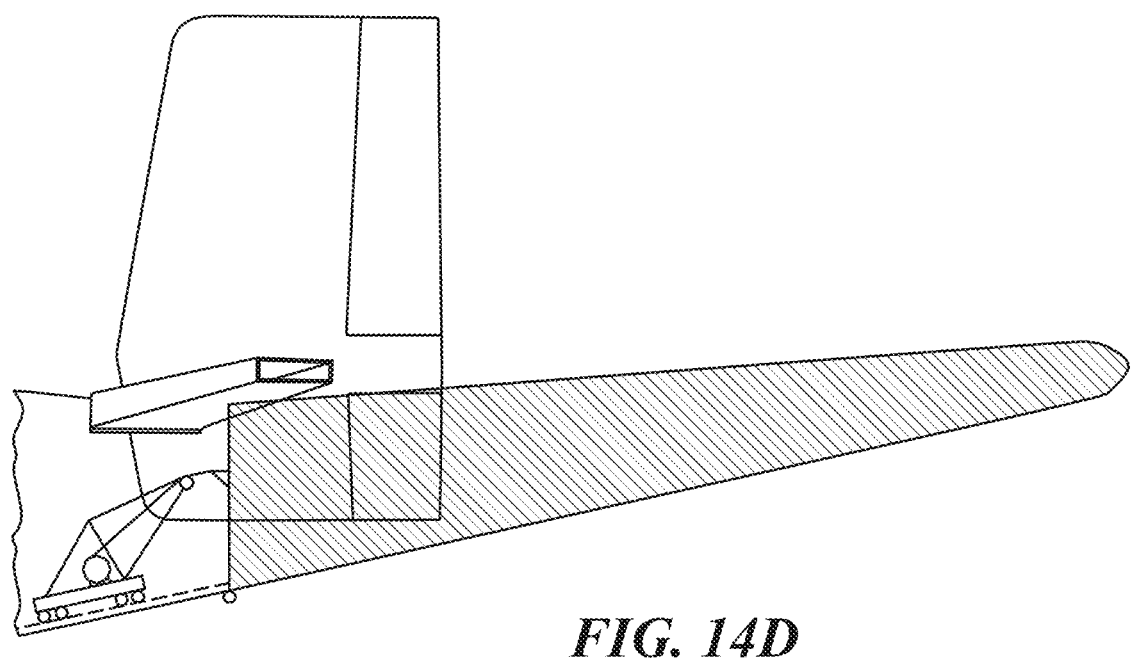

FIGS. 14A-D are illustrations of an alternative example lifting system being used to attach a tailcone to a fuselage. In FIG. 14A a moveable lifting assembly 1470 is disposed at the aft end 441 with a pully extending aft from the aft opening in a similar fashion to the pully 1361 of FIGS. 13A-E. In FIG. 14B, once the moveable lifting assembly 1470 has raised the forward end of the extended tailcone 743 to be pivotably coupled with the aft end 441 of the aircraft 400, the moveable lifting assembly 1470 is repositioned (as indicated by arrow 1479) to a more forward position, as shown in FIG. 14C, where the cable extending from the moveable lifting assembly 1470 is now tensioned by the moveable lifting assembly 1470 from a more forward position, which is a position suitable for raising the aft end of the extended tailcone 743 into the desired position 743', as shown in FIG. 14D, where the extended tailcone 743 can be secured to the aircraft 400. In some examples the, moveable lifting assembly 1470 includes a cable and one or more pulleys from an internal cargo rail system configured to assist in the movement of payloads into and out of the aircraft 400 along the cargo rail system.

One skilled in the art will appreciate further features and advantages of the disclosures based on the provided for descriptions and embodiments. Accordingly, the inventions are not to be limited by what has been particularly shown and described. For example, although the present disclosure provides for transporting large cargo, such as wind turbines, the present disclosures can also be applied to other types of large cargos or to smaller cargo. All publications and references cited herein are expressly incorporated herein by reference in their entirety.

Examples of the above-described embodiments can include the following:

1. A cargo aircraft, comprising:
    a fuselage defining a forward end, an aft end, a continuous interior cargo bay that spans a majority of a length of the fuselage from the forward end to the aft end, the aft end defining an aft opening into the continuous interior cargo bay; and
    a removable tailcone configured to be coupled to the aft end of the fuselage, the removable tailcone enclosing the aft opening into the continuous interior cargo bay.

2. The cargo aircraft of claim 1, wherein the removable tailcone, when coupled to the aft end of the fuselage, defines an aft terminal end of the fuselage cargo aircraft.

3. The cargo aircraft of claim 1 or claim 2,
    wherein the removable tailcone defines a forward opening and an interior cargo volume extending from the forward opening, and
    wherein the interior cargo volume of the removable tailcone is configured to form an aft region extending from the continuous interior cargo bay when the removable tailcone is coupled to the aft end of the fuselage such that the interior cargo volume defines an aft end of an extended cargo bay of the cargo aircraft, the extended cargo bay comprising both the interior cargo volume and the continuous interior cargo bay.

4. The cargo aircraft of claim 3, wherein the removable tailcone comprises two or more segments, at least one of the two or more segments defining at least a portion of the interior cargo volume of the removable tailcone.

5. The cargo aircraft of claim 4,
    wherein the two or more segments comprise at least a first segment and a second segment, the first segment including:
        a forward end configured to be coupled to the aft opening of the fuselage of the cargo aircraft; and
        an aft end,
        the first segment defining a first portion of a length of the interior cargo volume between the forward and aft ends of the first segment; and
    the second segment including:
        a forward end configured to be coupled to the aft end of the first segment;
    and an aft end,
        the second segment defining a second portion of the length of the interior cargo volume between the forward and aft ends of the second segment,
    wherein the aft end of the first segment and the forward end of the second segment each define complimentary openings into respective portions of the interior cargo volume.

6. The cargo aircraft of claim 5, wherein the aft end of the first segment is further configured to be coupled to a tailcone apex cap that encloses the complimentary opening of the first segment.

7. The cargo aircraft of claim 5 or claim 6,
    wherein the aft end of the second segment defines a second aft opening into the interior cargo volume, and
    wherein the aft end of the second segment is configured to be coupled to at least one of: a tailcone apex cap that encloses the second aft opening of the second segment or a third segment of the two or more segments, the third segment configured to extend the length of the interior cargo bay volume such that the interior cargo bay volume comprises a third portion of the length of the interior cargo volume, the third portion being between forward and aft ends of the third segment.

8. The cargo aircraft of any of claims 3 to 7,
   wherein the removable tailcone comprises one or more moveable segments that define at least a first configuration and a second configuration,
   wherein, in the first configuration, the interior cargo volume defines a first length along a longitudinal centerline of the extended cargo bay, and
   wherein, in the second configuration, the interior cargo volume defines a second length along the longitudinal centerline of the extended cargo bay, the second length being longer than the first length such that the extended cargo bay defines a maximum payload length in the second configuration that is longer than a maximum payload length in the first configuration.

9. The cargo aircraft of claim 8, wherein the one or more moveable segments define a telescopic arrangement.

10. The cargo aircraft of any of claims 3 to 9, wherein the interior cargo volume of the removable tailcone is sized and shaped to contain an end of a wind turbine blade disposed throughout the combined interior cargo bay.

11. The cargo aircraft of any of claims 3 to 10,
    wherein the continuous interior cargo bay defines a first maximum payload length, and
    wherein, when the removable tailcone is attached to the aft end of the fuselage, the extended cargo bay defines a second maximum payload length, the second maximum payload length being at least approximately 5% longer than the first maximum payload length.

12. The cargo aircraft of claim 11, wherein the second maximum payload length is at least about 90 meters.

13. The cargo aircraft of any of claims 1 to 12, further comprising:
    a tail coupler on a forward end of the removable tailcone; and
    a fuselage coupler on the aft end of the fuselage and about the aft opening into the continuous interior cargo bay,
    wherein the tail coupler and the fuselage coupler are configured to mate together to secure the removable tailcone to the fuselage of the cargo aircraft during flight.

14. The cargo aircraft of claim 13,
    wherein the removable tailcone comprises one or more indexing features configured to enable visual alignment of the tail coupler with the fuselage coupler.

15. The cargo aircraft of any of claims 1 to 14, wherein the aft opening into the continuous interior cargo bay is positioned to permit a payload extending through the aft opening to be disposed above or below a horizontal stabilizer of the cargo aircraft.

16. The cargo aircraft of any of claims 1 to 15, wherein a bottom surface of the removable tailcone comprises at least one of a wheel or a skid configured to safely contact the ground during a pitch-up maneuver.

17. The cargo aircraft of any of claims 1 to 16, wherein the removable tailcone is sized and shaped to, when coupled to the aft end of the fuselage, maintain an acceptable a tailstrike angle of the cargo aircraft such that a tailstrike does not occur.

18. The cargo aircraft of claim 17,
    wherein a bottom surface of the aft fuselage defines an upsweep angle, and
    wherein a bottom surface of the removable tailcone defines an upsweep angle equal to or greater than the upsweep angle of the aft fuselage.

19. The cargo aircraft of any of claims 1 to 18, wherein the fuselage comprises a lifting system configured to assist in a removal or attachment operation of the removable tailcone.

20. A cargo system, comprising:
    a cargo aircraft including a fuselage defining a forward end, an aft end, a continuous interior cargo bay that spans a majority of a length of the fuselage from the forward end to the aft end, the aft end defining an aft opening into the continuous interior cargo bay;
    a first removable tailcone configured to be coupled to the aft end of the fuselage, the removable tailcone enclosing the aft opening into the continuous interior cargo bay; and
    a second removable tailcone configured to be coupled to the aft end of the fuselage, the second removable tailcone enclosing the aft opening into the continuous interior cargo bay, wherein the second removable tailcone defines a forward opening and an interior cargo volume extending from the forward opening, and
    wherein the interior cargo volume of the second removable tailcone is configured to form an aft region extending from the continuous interior cargo bay when the second removable tailcone is coupled to the aft end of the fuselage such that the interior cargo volume defines an aft end of an extended cargo bay of the cargo aircraft, the extended cargo bay comprising both the interior cargo volume and the continuous interior cargo bay.

21. The cargo system of claim 20, wherein the second removable tailcone, when coupled to the aft end of the fuselage, defines an aft terminal end of the fuselage of the cargo aircraft.

22. The cargo system of claim 20, wherein the second removable tailcone comprises two or more segments, at least one of the two or more segments defining at least a portion of the interior cargo volume of the second removable tailcone.

23. The cargo system of claim 22,
    wherein the two or more segments comprise at least a first segment and a second segment, the first segment including:
      a forward end configured to be coupled to the aft opening of the fuselage of the cargo aircraft; and
      an aft end,
      the first segment defining a first portion of a length of the interior cargo volume between the forward and aft ends of the first segment; and
    the second segment including:
      a forward end configured to be coupled to the aft end of the first segment;
      and an aft end,
      the second segment defining a second portion of the length of the interior cargo volume between the forward and aft ends of the second segment,
    wherein the aft end of the first segment and the forward end of the second segment each define complimentary openings into respective portions of the interior cargo volume.

24. The cargo system of claim 23, wherein the aft end of the first segment is further configured to be coupled to a tailcone apex cap that encloses the complimentary opening of the first segment.

25. The cargo system of claim 23 or claim 24,
    wherein the aft end of the second segment defines a second aft opening into the interior cargo volume, and
    wherein the aft end of the second segment is configured to be coupled to at least one of: a tailcone apex cap that encloses the second aft opening of the second segment or a third segment of the two or more segments, the third segment configured to extend the length of the interior cargo bay volume such that the interior cargo bay volume comprises a third portion of the length of the interior cargo volume, the third portion being between forward and aft ends of the third segment.

26. The cargo system of any of claims 22 to 25,
wherein the second removable tailcone comprises one or more moveable segments that define at least a first configuration and a second configuration,
wherein, in the first configuration, the interior cargo volume defines a first length along a longitudinal centerline of the extended cargo bay, and
wherein, in the second configuration, the interior cargo volume defines a second length along the longitudinal centerline of the extended cargo bay, the second length being longer than the first length such that the extended cargo bay defines a maximum payload length in the second configuration that is longer than a maximum payload length in the first configuration.

27. The cargo system of claim 26, wherein the one or more moveable segments define a telescopic arrangement.

28. The cargo system of any of claims 22 to 27, wherein the interior cargo volume of the second removable tailcone is sized and shaped to contain an end of a wind turbine blade disposed throughout the combined interior cargo bay.

29. The cargo system of any of claims 22 to 28,
wherein the continuous interior cargo bay defines a first maximum payload length, and
wherein, when the second removable tailcone is attached to the aft end of the fuselage, the extended cargo bay defines a second maximum payload length, the second maximum payload length being at least approximately 5% longer than the first maximum payload length.

30. The cargo system of claim 30, wherein the second maximum payload length is at least about 90 meters.

31. The cargo system of any of claims 20 to 30, further comprising:
a tail coupler on a forward end of the second removable tailcone; and
a fuselage coupler on the aft end of the fuselage and about the aft opening into the continuous interior cargo bay,
wherein the tail coupler and the fuselage coupler are configured to mate together to secure the second removable tailcone to the fuselage of the cargo aircraft during flight.

32. The cargo system of claim 31,
wherein the second removable tailcone comprises one or more indexing features configured to enable visual alignment of the tail coupler with the fuselage coupler.

33. The cargo system of any of claims 20 to 32, wherein the aft opening into the continuous interior cargo bay is positioned to permit a payload extending through the aft opening to be disposed above or below a horizontal stabilizer of the cargo aircraft.

34. The cargo system of any of claims 20 to 33, wherein a bottom surface of the second removable tailcone comprises at least one of a wheel or a skid configured to safely contact the ground during a pitch-up maneuver.

35. The cargo system of any of claims 20 to 34, wherein the second removable tailcone is sized and shaped to, when coupled to the aft end of the fuselage, maintain an acceptable a tailstrike angle of the cargo aircraft such that a tailstrike does not occur.

36. The cargo aircraft of claim 35,
wherein a bottom surface of the aft fuselage defines an upsweep angle, and
wherein a bottom surface of the second removable tailcone defines an upsweep angle equal to or greater than the upsweep angle of the aft fuselage.

37. The cargo system of any of claims 20 to 36, wherein the fuselage comprises a lifting system configured to assist in a removal or attachment operation of either of the first and second removable tailcones.

38. A cargo aircraft, comprising:
a fuselage defining a forward end, an aft end, a continuous interior cargo bay that spans a majority of a longitudinal centerline length of the fuselage from the forward end to the aft end, the aft end comprising:
an extendible tailcone defining an aft end of the continuous interior cargo bay, the extendible tailcone having one or more moveable segments that define at least a first configuration and a second configuration,
wherein, in the first configuration, the aft end continuous interior cargo bay defines a first length along a longitudinal centerline of the extendible tailcone, and
wherein, in the second configuration, the aft end continuous interior cargo bay defines a second length along the longitudinal centerline, the second length being longer than the first length.

39. A removable aircraft tailcone, comprising:
a body having a forward end and an aft end, the forward end defining an opening into an interior cargo region contained in the body; and
a coupler configured to removeably secure the forward end of the body to an aft end of an cargo aircraft fuselage such that when the body is coupled to the cargo aircraft fuselage, an interior cargo bay of the cargo aircraft fuselage extends into the interior cargo region of the body and the aft end of the body defines a terminal aft end of the cargo aircraft fuselage.

40. A removable aircraft tailcone kit, comprising:
a first removable aircraft tailcone, comprising:
a body having a forward end and an aft end, the forward end defining an opening into an interior cargo region contained in the body; and
a coupler configured to removeably secure the forward end of the body to an aft end of an cargo aircraft fuselage such that when the body is coupled to the cargo aircraft fuselage, an interior cargo bay of the cargo aircraft fuselage extends into the interior cargo region of the body and the aft end of the body defines a terminal aft end of the cargo aircraft fuselage; and
a second removable tailcone configured to be coupled to an aft end of a fuselage of a cargo aircraft, the second removable tailcone configured to an aft opening into a continuous interior cargo bay of a cargo aircraft when coupled to the aft end of the fuselage.

41. The removable aircraft tailcone kit of claim 40, further comprising:
a third removable tailcone configured to be coupled to an aft end of a cargo aircraft fuselage, the third removable tailcone enclosing the aft opening into the continuous interior cargo bay when coupled to the aft end of the fuselage,
wherein the third removable tailcone defines a forward opening and an interior cargo volume extending from the forward opening, and
wherein the interior cargo volume of the third removable tailcone is configured to form an aft region extending from the continuous interior cargo bay when the third removable tailcone is coupled to the aft end of the fuselage such that the interior cargo volume defines an aft end of an extended cargo bay of the cargo aircraft, the extended cargo bay comprising both the interior cargo volume and the continuous interior cargo bay.

42. A method of attaching a removable tailcone to a cargo aircraft, the method comprising:
coupling a forward end of a body of a removable tailcone to an aft end of a fuselage of the cargo aircraft, the removable tailcone enclosing an aft opening into a continuous interior cargo bay of the fuselage, the removable tailcone being configured to be separable from the fuselage without causing damage to either the fuselage or the removable tailcone.

43. The method of claim 42, further comprising:
lifting the removable tailcone using a lifting mechanism disposed about the aft end of the fuselage, the lifting disposing the forward end of the body of the removeable tailcone approximately adjacent to the aft end of the fuselage of the cargo aircraft.

44. The method of claim 43, further comprising:
coupling one or more pivot features located a bottom portion of the forward end of the removable tailcone to one or more corresponding features located at the aft end of the fuselage; and
after the coupling, pivoting the removable tailcone about the one or more pivot features until the forward end of the body of the removable tailcone is approximately in a position to undergo the coupling of the forward end of the body to the aft end of the fuselage.

45. The method of claim 42, further comprising:
removing the removable tailcone from the aft end of the fuselage of the cargo aircraft; and
coupling a forward end of a body of a second removable tailcone to the aft end of a fuselage of the cargo aircraft, the removable tailcone defining a cargo region that forms an aft region extending from the continuous interior cargo bay of the fuselage.

What is claimed is:

1. A cargo aircraft, comprising:
a fuselage defining a forward end, an aft end, a continuous interior cargo bay that spans a majority of a longitudinal centerline length of the fuselage from the forward end to the aft end, the aft end comprising:
an extendible tailcone defining an aft end of the continuous interior cargo bay, the extendible tailcone having one or more moveable segments that define at least a first configuration and a second configuration,
wherein, in the first configuration, the aft end continuous interior cargo bay defines a first length along a longitudinal centerline of the extendible tailcone, and
wherein, in the second configuration, the aft end continuous interior cargo bay defines a second length along the longitudinal centerline, the second length being longer than the first length.

2. The cargo aircraft of claim 1, wherein the one or more moveable segments comprise at least a first segment, the first segment slidably coupled to the aft end of the fuselage and configured to translate into and out of the aft end of the fuselage to move between the first configuration and the second configuration, wherein the first segment is at least partially disposed inside the fuselage in the first configuration.

3. The cargo aircraft of claim 2, wherein the one or more moveable segments comprise at least the first segment and a second segment, the second segment slidably coupled to an the first segment and configured to translate into and out of the first segment to move between the first configuration and the second configuration.

4. The cargo aircraft of claim 3, wherein the second segment is at least partially disposed inside the first segment in the first configuration.

5. The cargo aircraft of claim 1, wherein the one or more moveable segments define a telescopic arrangement.

6. The cargo aircraft of claim 1, wherein the aft end of the continuous interior cargo bay is positioned to permit a payload extending through the aft opening to be disposed above or below a horizontal stabilizer of the cargo aircraft.

7. The cargo aircraft of claim 1, wherein the extendible tailcone is, in the first and second position, sized and shaped to not change a tailstrike angle of the cargo aircraft.

8. An extendible aircraft tailcone, comprising:
a body comprising one or more moveable segments slidably coupled to an aft end of a fuselage of a cargo aircraft, the body having a forward end and an aft end, the forward end defining an opening into a continuous interior cargo region contained in the body and the opening defining a junction between an interior cargo bay of the cargo aircraft and the continuous interior cargo region of the body such that the interior cargo bay of the cargo aircraft extends into the continuous interior cargo region of the body,
wherein the one or more moveable segments are translatable into and out of the aft end of the fuselage between a first configuration when the body is maximally disposed within the fuselage and a second configuration when the body is minimally disposed within the fuselage, and
wherein, in the second configuration, the continuous interior cargo region and the interior cargo bay together define a second maximum payload length of the cargo aircraft that is longer than a first maximum payload length of the cargo aircraft fuselage in the first configuration.

9. The extendible aircraft tailcone of claim 8, wherein the one or more moveable segments comprises a first segment and a second segment, the first segment including:
a forward end coupled to the aft opening of the fuselage of the cargo aircraft; and
an aft end,
the first segment defining a first portion of a length of the continuous interior cargo region between the forward and aft ends of the first segment; and
the second segment including:
a forward end coupled to the first segment;
and an aft end,
the second segment defining a second portion of the length of the continuous interior cargo region between the forward and aft ends of the second segment,
wherein the aft end of the first segment and the forward end of the second segment each define complimentary openings into respective portions of the continuous interior cargo region.

10. The extendible aircraft tailcone of claim 8, wherein the body comprises two or more moveable segments in a telescopic configuration.

11. The extendible aircraft tailcone of claim 8, wherein the aft end of the body defines a terminal aft end of the cargo aircraft fuselage.

12. The extendible aircraft tailcone of claim 8, wherein the continuous interior cargo region of the body is sized and shaped to contain an end of a wind turbine blade disposed throughout the interior cargo bay of the aircraft.

\* \* \* \* \*